US008339484B2

(12) United States Patent (10) Patent No.: US 8,339,484 B2
Ishiga (45) Date of Patent: Dec. 25, 2012

(54) IMAGE PROCESSING METHOD

(75) Inventor: Kenichi Ishiga, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/345,249

(22) Filed: Jan. 6, 2012

(65) Prior Publication Data

US 2012/0147225 A1 Jun. 14, 2012

Related U.S. Application Data

(63) Continuation of application No. 12/458,953, filed on Jul. 28, 2009, now Pat. No. 8,120,679.

(30) Foreign Application Priority Data

Aug. 1, 2008 (JP) ................................ 2008-199319
Aug. 1, 2008 (JP) ................................ 2008-199320
Aug. 27, 2008 (JP) ................................ 2008-217929
Jul. 24, 2009 (JP) ................................ 2009-172975
Jul. 24, 2009 (JP) ................................ 2009-172976

(51) Int. Cl.
*H04N 5/208* (2006.01)
*H04N 5/217* (2011.01)
*H04N 9/64* (2006.01)
*H04N 1/38* (2006.01)
*G06K 9/40* (2006.01)
*G06K 15/00* (2006.01)

(52) U.S. Cl. ........ 348/252; 348/241; 348/243; 382/266; 382/275; 382/263; 382/264; 358/2.1; 358/463

(58) Field of Classification Search .................. 348/241, 348/243, 252, 470, 533, 597, 625; 382/266, 382/263, 264, 167, 240, 275, 254; 358/2.1, 358/3.15, 3.27, 463
See application file for complete search history.

(56) References Cited

U.S. PATENT DOCUMENTS

| 4,523,230 | A | 6/1985 | Carlson et al. |
| 5,051,842 | A | 9/1991 | Shimazaki |
| 5,081,692 | A | 1/1992 | Kwon et al. |
| 5,467,404 | A | 11/1995 | Vuylsteke et al. |
| 5,526,446 | A | 6/1996 | Adelson et al. |
| 5,666,443 | A | 9/1997 | Kumashiro |
| 5,739,922 | A | 4/1998 | Matama |

(Continued)

FOREIGN PATENT DOCUMENTS

JP A-2005-353102 12/2005

(Continued)

OTHER PUBLICATIONS

Choudhury et al., "The Trilateral Filter for High Contrast Images and Meshes," The Eurographics Symposium on Rendering, 2003, pp. 1-11.

(Continued)

*Primary Examiner* — Nhan T Tran
*Assistant Examiner* — Marly Camargo
(74) *Attorney, Agent, or Firm* — Oliff & Berridge, PLC

(57) ABSTRACT

An image processing method for executing edge enhancement for an original image includes: extracting edge components based upon the original image; correcting the extracted edge components by attenuating the individual edge components so that a frequency distribution related to intensity of the edge components approximates a Gaussian distribution assuming a specific width; and executing edge enhancement for the original image based upon the corrected edge components.

16 Claims, 13 Drawing Sheets

U.S. PATENT DOCUMENTS

| | | | |
|---|---|---|---|
| 5,799,112 A * | 8/1998 | de Queiroz et al. | 382/254 |
| 6,055,340 A | 4/2000 | Nagao | |
| 6,373,992 B1 | 4/2002 | Nagao | |
| 6,628,842 B1 * | 9/2003 | Nagao | 382/266 |
| 6,754,398 B1 * | 6/2004 | Yamada | 382/260 |
| 6,766,062 B1 | 7/2004 | Donoho et al. | |
| 6,813,335 B2 | 11/2004 | Shinbata | |
| 6,891,977 B2 | 5/2005 | Gallagher | |
| 6,937,772 B2 | 8/2005 | Gindele | |
| 6,937,775 B2 | 8/2005 | Gindele et al. | |
| 7,916,187 B2 * | 3/2011 | Tsuruoka | 348/241 |
| 2003/0161548 A1 * | 8/2003 | Vuylsteke | 382/274 |
| 2008/0089601 A1 | 4/2008 | Ishiga | |
| 2008/0095431 A1 | 4/2008 | Ishiga | |
| 2008/0123999 A1 | 5/2008 | Ishiga | |
| 2008/0152253 A1 * | 6/2008 | Thompson | 382/264 |
| 2008/0199100 A1 * | 8/2008 | Ishiga | 382/263 |
| 2009/0021611 A1 * | 1/2009 | Utsugi | 348/241 |
| 2009/0040386 A1 | 2/2009 | Ishiga | |
| 2009/0046943 A1 | 2/2009 | Ishiga | |
| 2009/0290808 A1 * | 11/2009 | Ishiga | 382/261 |
| 2010/0066874 A1 * | 3/2010 | Ishiga | 348/252 |

FOREIGN PATENT DOCUMENTS

| | | |
|---|---|---|
| WO | WO 2006/064913 A1 | 6/2006 |
| WO | WO 2006/068025 A1 | 6/2006 |
| WO | WO 2006/106919 A1 | 10/2006 |
| WO | WO 2007/114363 A1 | 10/2007 |
| WO | WO 2007/116543 A1 | 10/2007 |
| WO | WO 2008/093835 A1 | 8/2008 |
| WO | WO 2008/093836 A1 | 8/2008 |
| WO | WO 2008/105268 A1 | 9/2008 |

OTHER PUBLICATIONS

Tomasi et al., "Bilateral Filtering for Gray and Color Images," IEEE International Conference on Computer Vision, 1998, Bombay India, pp. 1-8.

U.S. Appl. No. 12/461,913, filed Aug. 27, 2009 in the name of Kenichi Ishiga.

U.S. Appl. No. 12/458,855, filed Jul. 24, 2009 in the name of Kenichi Ishiga.

U.S. Appl. No. 12/458,640, filed Jul. 17, 2009 in the name of Kenichi Ishiga.

* cited by examiner

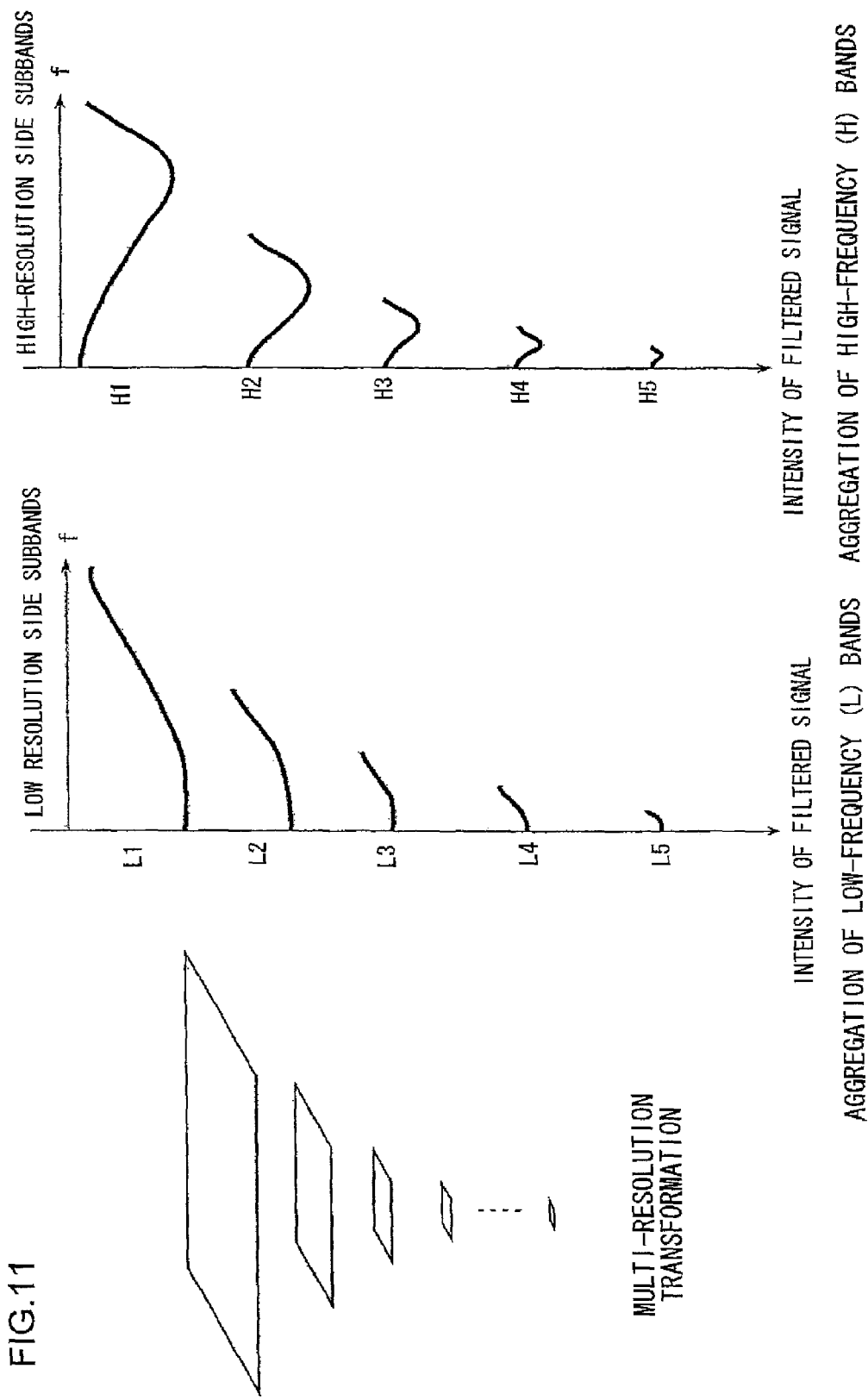

FIG.12

| | LUMINANCE PLANE | CHROMINANCE PLANES |
|---|---|---|
| EDGE EXTRACTED FROM LOW-FREQUENCY (L) BANDS | CONTRAST (TIGHTNESS OF BLACK, RICHER GRADATION) | COLORFULNESS (HIGH SATURATION) |
| EDGE EXTRACTED FROM HIGH-FREQUENCY (H) BANDS | SHARPNESS (OUTLINES AND TEXTURAL DETAILS) | COLOR CONTRAST (COLOR BLEEDING CORRECTION, COLOR STRUCTURE RESTORATION) |

IMAGE PROCESSING METHOD

This is a Continuation of application Ser. No. 12/458,953 filed Jul. 28, 2009. The disclosure of the prior application is hereby incorporated by reference herein in its entirety.

INCORPORATION BY REFERENCE

The disclosures of the following priority applications and applications are herein incorporated by reference:
Japanese Patent Application No. 2008-199319 filed Aug. 1, 2008;
Japanese Patent Application No. 2008-199320 filed Aug. 1, 2008;
Japanese Patent Application No. 2008-217929 filed Aug. 27, 2008;
Japanese Patent Application No. 2008-261827 filed Oct. 8, 2008;
Japanese Patent Application No. 2009-172975 filed Jul. 24, 2009; and
Japanese Patent Application No. 2009-172976 filed Jul. 24, 2009.

BACKGROUND OF THE INVENTION

1. Field of the Invention

The present invention relates to an image processing method that may be adopted in edge enhancement processing and noise removal processing executed on an image.

2. Description of Related Art

The technologies for enhancing edges through multi-resolution representation proposed in the related art include that disclosed in U.S. Pat. No. 6,754,398. Through the art disclosed in U.S. Pat. No. 6,754,398, an edge enhancement effect is achieved by subjecting the signals in LH, HL and HH high-frequency subbands obtained through multi-resolution transformation, e.g., wavelet transformation, to nonlinear gradation conversion with the input/output characteristics thereof expressed as a monotonously increasing function, such as that shown in FIG. 9 included in U.S. Pat. No. 6,754,398 so as to extract edge components from the signals, synthesize the LH, HL and HH edge components and add the synthesized edge components to the original image. In addition, the technology disclosed by the inventor of the present invention in International Publication No. 2007/114363 pamphlet represents an example of edge enhancement whereby the original image is projected into frequency spaces that include the LL low-frequency subbands in addition to the LH, HL and HH high-frequency subbands forming a complete system, thus allowing for more redundancy and assuring a higher level of freedom, edge detection is executed in the individual subbands and the edges in the original image are enhanced based upon the edge component generated by synthesizing the edge components detected in the various subbands.

The regular edge enhancement processing executed in the real space, such as unsharp mask processing, is known to be inherently prone to a problematic phenomenon called "ringing" induced by overshoot or undershoot, which occurs readily near an edge. This issue is addressed in, for instance, Japanese Laid Open Patent Publication No. 2005-353102 by first executing nonlinear conversion with the input/output characteristics thereof expressed as a monotonously increasing function on the high-frequency component data and then incorporating the high-frequency component data having undergone the nonlinear conversion into a smoothed image, as indicated in FIGS. 5 and 13 and expressions 23 and 23' included in the publication. In addition, U.S. Pat. No. 5,666,443 discloses a technology whereby limiter processing is executed so as to ensure that the values of the image signals having undergone the edge enhancement fall within the range defined by the largest value and the smallest value of local image signals in the pre-edge enhancement state.

In another edge enhancement method of the related art, an edge component is extracted from the difference between an edge-enhanced image and the original image, an ultimate edge component is calculated by multiplying the extracted edge component by a weighting coefficient that will apply greater weight over an edge area and the edges in the original image are enhanced by adding the ultimate edge component to the original image, as disclosed in U.S. Pat. No. 6,628,842. In the edge enhancement method disclosed in U.S. Pat. No. 6,373,992, a component containing an edge component and a noise component in combination is extracted from the difference between an edge-enhanced image and a smoothed image, the edge component is extracted by multiplying the component having been extracted by a noise fluctuation inhibition coefficient corresponding to edge intensity having been detected elsewhere and the edges are enhanced by adding the extracted edge component into the smoothed image. Namely, these publications each disclose a technology whereby the weighting coefficient is set so as to apply greater weight on the edge component only around edges, in order to minimize the presence of the noise component in the edge component.

U.S. Pat. No. 6,754,398 discloses expression (21) as shown below, which represents a process for achieving edge enhancement and noise removal simultaneously. The expression indicates that the noise component contained in the edge component is reduced by executing nonlinear conversion on noise components extracted at various resolution levels prior to multi-resolution synthesis during the process of generating a noise component SN1 so as to apply a greater extent of attenuation on each component with significant noise amplitude and generate an synthesized noise component SNp1 constituted with components having only small noise amplitudes and eliminating the synthesized noise component SNp1 from the edge component.

$$Sproc = Sorg + \beta(Sorg)*(SH1-SNp1) - \alpha(Sorg)*SN1$$

The technologies in the related art that enable edge enhancement or edge enhancement combined with noise removal include a method whereby edge components having been extracted based upon multi-resolution representation are synthesized and the synthesized edge component is added into the original image as disclosed in U.S. Pat. No. 6,754,398 and International Publication No. 2007/114363 pamphlet (filed by the inventor of the present invention). In the technology disclosed in U.S. Pat. No. 6,754,398, the target data are directly processed in the gradation space in which the original image is expressed and the edge component to be added to the original image is first multiplied by a weighting coefficient corresponding to the brightness level of the original image. In the art disclosed in International Publication No. 2007/114363 pamphlet, more advanced noise component/edge component extraction performance is assured for purposes of noise removal and edge enhancement by converting the target data to data in a uniform color•uniform noise space assuming gradation characteristics different from those of the input image, executing noise removal or edge enhancement and then converting the data back to data in the initial color space.

Japanese Laid Open Patent Publication No. 2005-353102, on the other hand, discloses a dynamic range compression technology in a field other than edge enhancement or noise removal, i.e., compression of the dynamic range of x-ray images in radiology. In the technology disclosed in Japanese Laid Open Patent Publication No. 2005-353102, the high-frequency component in the original image is obtained, the high-frequency component is converted in conformance to the pixel values indicated in the original image and the slope of the gradation conversion curve and then the converted high-frequency component is incorporated in the original image. Namely, in order to improve the visibility of the effective information concerning the subject constituted of a low-frequency component buried in noise present in, particularly, a dark area, gradation density distribution width is adjusted with flexibility while inhibiting noise emphasis.

Another technology in the related art that enables noise removal and edge enhancement through multi-resolution representation is disclosed in U.S. Pat. No. 6,754,398. In the technology disclosed in U.S. Pat. No. 6,754,398, noise components and edge components are extracted from high-frequency subband images expressed in multi-resolution representation, e.g., the LH, HL and HH high-frequency subband images obtained through wavelet transformation, an synthesized noise component and an synthesized edge component are generated by synthesizing the extracted noise components and edge components through multi-resolution synthesis, noise removal is executed by subtracting the noise component from the original image and edge enhancement is achieved by adding the edge component to the original image. Since the individual noise components are extracted by projecting the target data into frequency spaces corresponding to the high-frequency subbands LH, HL and HH appearing to constitute a complete system, gaps may be formed between the frequency bands depending upon the noise removal filters used in conjunction with the various subbands. The presence of such gaps is bound to cause incomplete extraction of noise components.

This issue is addressed in International Publication No. 2007/116543 pamphlet filed by the inventor of the present invention, which discloses a method for preventing incomplete noise extraction by executing noise extraction in redundant frequency spaces with the data also projected into frequency spaces of low-frequency subbands LL that are generated sequentially and synthesizing the two types of noise components, one corresponding to the low-frequency subbands and the other corresponding to the high-frequency subbands. The publication discloses that the extent of loss of image structure attributable to the noise removal should be minimized by adjusting the noise removal intensity in correspondence to the characteristics of the frequency distribution in the luminance component plane and the characteristics of the frequency distribution in the chrominance component planes which are different from each other, so as to execute high-intensity noise removal for the high-frequency subbands and low-intensity noise removal for the low-frequency subband in the luminance component plane, so as to execute low-intensity noise removal for the high-frequency subbands and high-intensity noise removal for the low-frequency subband in the chrominance component planes.

International Publication No. 2007/114363 pamphlet filed by the inventor of the present invention discloses that the weighting coefficient k ($0 \leq k \leq 1$) used to adjust the noise removal intensity level for the low-frequency (L) subbands and the high-frequency (H) subbands may be set to k:1:1:1 for LL, LH HL and HH in the luminance component plane for purposes of noise component synthesis. The value assumed for k, via which the noise frequency characteristics can be altered freely, greatly affects the appearance of the image resulting from the noise removal. Since the preferred extent of noise removal varies from person to person, the art disclosed in the publication allows the user to select a value for this parameter through a user interface. In addition, as is the noise removal, the edge enhancement is executed by synthesizing edge components extracted both from the low-frequency subbands and the high-frequency subbands while adjusting the edge enhancement intensity for the low-frequency subbands and the edge enhancement intensity for the high-frequency subbands via a weighting coefficient that can be altered freely during the synthesis processing.

SUMMARY OF THE INVENTION

While FIG. 6 included in Japanese Laid Open Patent Publication No. 2005-353102 indicates that although the measures disclosed therein taken to prevent ringing achieve moderate success, some ringing component remains, as shown in the figure. A similar issue exists with regard to the nonlinear conversion characteristics in the art disclosed in U.S. Pat. No. 6,754,398, which are the characteristics of a monotonously increasing function, as are the characteristics disclosed in Japanese Laid Open Patent Publication No. 2005-353102. In standard unsharp mask processing such as that executed in the real space, such a slight ringing component is not noticeable enough to become a problem. However, in the case of edge enhancement executed based upon multi-resolution representation, the discreteness of the data expressed through the multi-resolution representation and the greater effective areas assumed in multi-resolution representation allow the incidence of ringing, which is inherent to edge enhancement, to become noticeable and manifest as a halo ranging over a large area or as a tiled howling area.

The limiter processing executed on image signals as disclosed in U.S. Pat. No. 5,666,443 tends to flatten the image structure at certain signal levels and thus fails to provide a natural-looking image. Namely, the measures taken to prevent ringing through the limiter processing does not provide a high-quality image. The appearance of the image is compromised even more when the limiter processing is adopted in conjunction with multi-resolution representation.

In addition, the methods disclosed in U.S. Pat. No. 6,628,842 and U.S. Pat. No. 6,373,992 do not assure precise extraction of the edge component and the noise component at the correct levels or assure accurate separation of the edge component and the noise component, since the level of the noise component contained in the edge component cannot be uniformly estimated based upon the edge detection results alone. Furthermore, the edge detector disclosed in either publication detects the edge component by measuring local standard deviation elsewhere and thus references a quantity that includes both the edge and the noise. This gives rise to a concern that insufficient edge enhancement may be executed over an image area requiring high-intensity edge enhancement or that the noise in an image area with significant noise presence may be amplified through the edge enhancement.

While the noise component is used to eliminate a noise component with a small amplitude from the edge component in the method disclosed in U.S. Pat. No. 6,754,398, there is still an issue to be addressed in the technology in that a large noise component contained in the edge component cannot be completely eliminated. For this reason, the edge enhancement processing may actually have an adverse effect of making the noise more noticeable.

Since successful separation of the edge component and the noise component is always a challenge, an even more advanced performance level must be assured in the edge enhancement processing and the edge enhancement processing coupled with noise removal disclosed in U.S. Pat. No. 6,754,398 and International Publication No. 2007/114363 pamphlet. However, the technology disclosed in Japanese Laid Open Patent Publication No. 2005-353102, intended to achieve a different object, does not provide a solution with regard to specifically how a higher level of performance may be assured.

In addition, in the methods disclosed in International Publication No. 2007/116543 pamphlet and International Publication No. 2007/114363 pamphlet, a noise removal intensity parameter that provides a fluctuation width threshold value used to distinguish the noise from the edge structure when applying a noise removal filter in the related art and a noise removal rate parameter that determines the true rate at which the extracted noise component is to be subtracted from the original image are used in addition to the newly added parameter that determines the ratio with which the L/H frequencies are to be combined. In other words, the user is required to adjust three parameters but may not be able to easily ascertain how to adjust the parameters in order to obtain the optimal image with noise removed to the desired extent. A similar concern also exists in the case of edge enhancement.

According to the 1st aspect of the present invention, an image processing method for executing edge enhancement for an original image, comprises: extracting edge components based upon the original image; correcting the extracted edge components by attenuating the individual edge components so that a frequency distribution related to intensity of the edge components approximates a Gaussian distribution assuming a specific width; and executing edge enhancement for the original image based upon the corrected edge components.

According to the 2nd aspect of the present invention, an image processing method, comprises: generating a plurality of band-limited images assuming sequentially lowered resolution levels by filtering an original image; extracting edge components in each band-limited image; correcting the edge components by attenuating the edge components having been extracted from each band-limited image so that a frequency distribution related to intensity of the edge components approximates a Gaussian distribution assuming a specific width inherent to each corresponding band; synthesizing the edge components corresponding to the individual band-limited images having been thus corrected to generate synthesized edge components assuming a resolution matching the resolution level of the original image; correcting the synthesized edge components by attenuating the synthesized edge components so that a frequency distribution related to intensity of the synthesized edge components approximates a Gaussian distribution assuming a specific width; and executing edge enhancement for the original image based upon the corrected synthesized edge components.

According to the 3rd aspect of the present invention, in the image processing method according to the 1st aspect, it is preferred that the specific width assumed for the Gaussian distribution matches a width of a noise fluctuation index value set for the original image.

According to the 4th aspect of the present invention, in the image processing method according to the 1st aspect, it is preferred that each processing is executed in a uniform noise space or a uniform color•uniform noise space.

According to the 5th aspect of the present invention, an image processing method for executing edge enhancement for an original image, comprises: generating a plurality of band-limited images assuming sequentially lowered resolution levels, which include sets of a low-frequency subband image and a high-frequency subband image by filtering the original image; extracting edge components through edge detection individually executed on the band-limited images; sequentially synthesizing the edge components having been extracted from two types of band-limited images of the low-frequency subband image and the high-frequency subband image so as to generate synthesized edge components assuming a resolution level matching the resolution of the original image; correcting the synthesized edge components by attenuating individual edge components so that a frequency distribution related to intensity of the synthesized edge components approximates a Gaussian distribution with a specific width; and executing edge enhancement for the original image based upon the corrected edge components.

According to the 6th aspect of the present invention, an image processing method for executing edge enhancement for an original image that contains noise components represented by a predetermined noise fluctuation index value, comprises: extracting edge components from the original image; comparing the extracted edge components with the noise fluctuation index value so as to extract weak edge components each assuming a level substantially matching levels of the noise components; and executing edge enhancement for the original image based upon the weak edge components having been thus extracted.

According to the 7th aspect of the present invention, an image processing method for executing edge enhancement for an original image, comprises: generating a plurality of band-limited images assuming sequentially lowered resolution levels by filtering the original image; extracting an edge component from each band-limited image; estimating a quantity of a false edge component contained in the edge component based upon a level of the edge component having been extracted from the band-limited image; extracting a true edge component of the each band-limited image by excluding the false edge component from the extracted edge component based upon estimation results; synthesizing the true edge component extracted from the each band-limited image so as to generate a synthesized edge component assuming a resolution level matching the resolution of the original image; estimating a quantity of a false edge component contained in the synthesized edge component based upon the level of the synthesized edge component; extracting a true edge component by excluding the false edge component from the synthesized edge component based upon estimation results; and executing edge enhancement for the original image based upon the extracted true edge component.

According to the 8th aspect of the present invention, a computer-readable computer program product comprises an image processing program enabling a computer or an image processing apparatus to execute an image processing method according to the 1st aspect.

According to the 9th aspect of the present invention, an image processing apparatus, comprising a control device capable of executing an image processing method according to the 1st aspect.

According to the 10th aspect of the present invention, an electronic camera, comprising a control device capable of executing an image processing method according to the 1st aspect.

According to the 11th aspect of the present invention, an image processing method for executing edge enhancement for an original image, comprises: extracting a noise component and an edge component based upon the original image; estimating a ratio of a residual noise component contained in the edge component to be more significant if an absolute value of the extracted noise component is greater; extracting a true edge component by eliminating the estimated residual noise component from the edge component; and executing edge enhancement for the original image based upon the extracted true edge component.

According to the 12th aspect of the present invention, in the image processing method according to the 11th aspect, it is preferred that: a plurality of band-limited images assuming sequentially lowered resolution levels are generated by filtering the original image; a noise component and an edge component are extracted in each band-limited image; a ratio of a residual noise component contained in the extracted edge component is estimated to be more significant if an absolute value of the corresponding extracted noise component is greater, in each band-limited image; a true edge component is extracted by eliminating the estimated residual noise component from the extracted edge component in each band-limited image; the true edge component extracted in each band-limited image is synthesized so as to generate an synthesized edge component assuming a resolution level matching a resolution of the original image; and the edge enhancement is executed for the original image based upon the synthesized true edge component.

According to the 13th aspect of the present invention, in the image processing method according to the 11th aspect, it is preferred that: a plurality of band-limited images assuming sequentially lowered resolution levels are generated by filtering the original image; a noise component and an edge component are extracted in each band-limited image; the noise component and the edge component having been extracted in each band-limited images are synthesized so as to generate a synthesized noise component and a synthesized edge component assuming a resolution level matching a resolution of the original image; a ratio of a residual noise component contained in the synthesized edge component is estimated to be more significant if an absolute value of the synthesized noise component is greater; a true edge component is extracted by excluding the estimated residual noise component from the synthesized edge component; and the edge enhancement for the original image is executed based upon the extracted true edge component.

According to the 14th aspect of the present invention, in the image processing method according to the 12th aspect, it is preferred that: the noise component extracted in each band-limited image is synthesized to generate a synthesized noise component assuming a resolution level matching a resolution of the original image; a ratio of a residual noise component contained in the synthesized edge component is estimated to be more significant if an absolute value of the synthesized noise component is greater; a synthesized true edge component is extracted by eliminating the estimated residual noise component from the synthesized edge component; and the edge enhancement for the original image is executed based upon the synthesized true edge component having been extracted.

According to the 15th aspect of the present invention, in the image processing method according to the 11th aspect, it is preferred that a ratio of the true edge component present in the extracted edge component is estimated through a Gaussian distribution function in which an absolute value of the extracted noise component is used as an argument.

According to the 16th aspect of the present invention, in the image processing method according to the 11th aspect, it is preferred that the ratio of the residual noise component contained in the edge component is estimated by comparing the absolute value of the noise component extracted at each pixel position with a noise fluctuation index value used when extracting the noise component from the original image.

According to the 17th aspect of the present invention, in the image processing method according to the 13th aspect, it is preferred that the ratio of the residual noise component contained in the edge component is estimated by comparing the absolute value of the synthesized noise component at each pixel position with a noise fluctuation index value used when extracting the noise component from the original image.

According to the 18th aspect of the present invention, an image processing method for executing edge enhancement for an original image, comprises: separating the original image into a noise component and a noise-free image; extracting an edge component of the original image based upon the noise-free image; extracting a true edge component by eliminating a residual noise component contained in the edge component from the edge component based upon a level of the noise component; and executing edge enhancement for the original image based upon the true edge component having been extracted.

According to the 19th aspect of the present invention, in the image processing method according to the 18th aspect, it is preferred that: a plurality of band-limited images assuming sequentially lowered resolution levels are generated by filtering the original image; each band-limited image is separated into a noise component and a noise-free image; an edge component of each band-limited image is extracted from the corresponding noise-free band-limited image having undergone noise removal; the noise component having been separated from the each band-limited image is synthesized to generate a synthesized noise component assuming a resolution level matching a resolution of the original image; the edge component having been extracted from the each band-limited image is synthesized to generate a synthesized edge component assuming a resolution level matching the resolution of the original image; a true edge component is extracted by eliminating a residual noise component contained in the synthesized edge component from the synthesized edge component based upon a level of the synthesized noise component; and the edge enhancement for the original image is executed based upon the extracted true edge component.

According to the 20th aspect of the present invention, an image processing method for executing noise removal and edge enhancement for an original image, comprises: extracting a noise component and an edge component based upon the original image; extracting a true noise component by excluding a residual edge component contained in the noise component from the noise component based upon the extracted edge component and extracting a true edge component by eliminating a residual noise component contained in the edge component from the edge component based upon the extracted noise component; and executing noise removal and edge enhancement for the original image based upon the extracted true noise component and the extracted true edge component.

According to the 21st aspect of the present invention, in the image processing method according to the 20th aspect, it is preferred that: a plurality of band-limited images assuming sequentially lowered resolution levels are generated by filtering the original image; a noise component and an edge component are extracted in each band-limited image; the noise component and the edge component having been extracted in the each band-limited image are synthesized so as to generate a synthesized noise component and a synthesized edge component assuming a resolution level matching a resolution of the original image; a true noise component is extracted by excluding a residual edge component contained in the synthesized noise component from the synthesized noise component based upon the synthesized edge component and a true edge component is extracted by eliminating a residual noise component contained in the synthesized edge component from the synthesized edge component based upon the synthesized noise component; and the noise removal and the edge enhancement for the original image are executed based upon the extracted true noise component and the extracted true edge component.

According to the 22nd aspect of the present invention, in the image processing method according to the 22nd aspect, it is preferred that the plurality of band-limited images include sets of a high-frequency subband image and a low-frequency subband image assuming sequentially lowered resolution levels and the noise component and the edge component extracted at each resolution level assumed for each of two types of band-limited images are synthesized so as to generate the synthesized noise component and the synthesized edge component.

According to the 23rd aspect of the present invention, in the image processing method according to the 11th aspect, it is preferred that each processing is executed in a uniform noise space or in a uniform color uniform noise space.

According to the 24th aspect of the present invention, a computer-readable computer program product comprises an image processing program enabling a computer or an image processing apparatus to execute an image processing method according to the 11th aspect.

According to the 25th aspect of the present invention, an image processing apparatus comprises a control device capable of executing an image processing method according to the 11th aspect.

According to the 26th aspect of the present invention, an electronic camera comprises a control device capable of executing an image processing method according to the 11th aspect.

According to the 27th aspect of the present invention, an image processing method for executing edge enhancement for an original image, comprises: converting the original image in an input color space to an image in a work color space assuming specific gradation characteristics; extracting an edge component through edge detection executed in the work color space; adding the extracted edge component to the original image so as to create an edge-enhanced image based upon the original image; converting the edge-enhanced image in the work color space to an image in an output color space assuming gradation characteristics different from the gradation characteristics in the work color space; amplifying or attenuating the extracted edge component by designating a specific brightness level as a switch-over point based upon a function for a differential ratio of the gradation characteristics in the output color space and the gradation characteristics in the work color space, which changes in correspondence to a brightness level of the original image.

According to the 28th aspect of the present invention, in the image processing method according to the 27th aspect, it is preferred that if the original image is expressed with luminance component, the extracted edge component is amplified or attenuated by designating a brightness level of the original image corresponding to an exposure reference point or an average luminance level of the original image as the switch-over point.

According to the 29th aspect of the present invention, in the image processing method according to the 27th aspect, it is preferred that if the original image is expressed with chrominance component, the extracted edge component is amplified or attenuated by designating a brightness level of the original image corresponding to a saturation reference point as the switch-over point.

According to the 30th aspect of the present invention, in the image processing method according to the 27th aspect, it is preferred that the extracted edge component is further amplified or attenuated based upon an intensity level of the edge component.

According to the 31st aspect of the present invention, an image processing method for executing edge enhancement for an original image, comprises: converting the original image in an input color space to an image in a work color space assuming specific gradation characteristics; extracting an edge component through edge detection executed in the work color space; adding the extracted edge component to the original image so as to create an edge-enhanced image based upon the original image; converting the edge-enhanced image in the work color space to an image in an output color space assuming gradation characteristics different from the gradation characteristics in the work color space; and amplifying or attenuating the extracted edge component in correspondence to a brightness level of the original image by designating a specific brightness level as a switch-over point based upon a difference between the gradation characteristics in the output color space and the gradation characteristics in the work color space, and the specific brightness level selected for the original image expressed with luminance component is different from the specific brightness level selected for the original image expressed with chrominance component.

According to the 32nd aspect of the present invention, in the image processing method according to the 31st aspect, it is preferred that: if the original image is expressed with luminance component, the extracted edge component is amplified or attenuated by designating a brightness level of the original image corresponding to an exposure reference point or an average luminance level of the original image as the switch-over point; and if the original image is expressed with chrominance component, the extracted edge component is amplified or attenuated by designating a brightness level of the original image corresponding to a saturation reference point as the switch-over point.

According to the 33rd aspect of the present invention, an image processing method for executing noise removal and edge enhancement for an original image, comprises: converting the original image in an input color space to an image in a work color space assuming specific gradation characteristics; extracting a noise component and an edge component in the original image in the work color space; executing image processing for noise removal by subtracting the noise component from the original image and for edge enhancement by adding the edge component; converting the image having undergone the image processing in the work color space to an image in an output color space assuming gradation characteristics different from the gradation characteristics in the work color space; and amplifying or attenuating the extracted noise component and the extracted edge component in a similar manner in correspondence to a brightness level of the original image by designating a specific brightness level as a switch-over point based upon a difference between the gradation characteristics in the output color space and the gradation characteristics in the work color space.

According to the 34th aspect of the present invention, in the image processing method according to the 33rd aspect, it is preferred that the extracted noise component and the extracted edge component are further amplified or attenuated based also upon an intensity of the edge component.

According to the 35th aspect of the present invention, an image processing method for executing edge enhancement for an original image, comprises: converting the original image in an input color space to an image in a work color space assuming specific gradation characteristics; extracting an edge component through edge detection executed in the work color space; adding the extracted edge component to the original image so as to create an edge-enhanced image based upon the original image; converting the edge-enhanced image in the work color space to an image in an output color space assuming gradation characteristics different from the gradation characteristics in the work color space; and amplifying or attenuating the extracted edge component in correspondence to a brightness level of the original image by designating a specific brightness level as a switch-over point based upon an intensity of the edge component and a difference between the gradation characteristics in the output color space and the gradation characteristics in the work color space.

According to the 36th aspect of the present invention, an image processing method for executing edge enhancement for an original image, comprises: extracting an edge component through edge detection executed on the original image; and executing edge enhancement processing by adding to the original image the edge component with an intensity thereof amplified or attenuated in correspondence to a luminance level at each pixel in an area where the intensity of the extracted edge component is relatively high.

According to the 37th aspect of the present invention, an image processing method for executing edge enhancement for an original image, comprises: extracting an edge component through edge detection executed on the original image; and executing edge enhancement processing to create an edge enhanced image by adding to the original image the edge component with an extent of change in an intensity thereof relative to a brightness level at each pixel increased by a greater degree in an area where the intensity of the extracted edge component is higher.

According to the 38th aspect of the present invention, in the image processing method according to the 37th aspect, it is preferred that the edge enhancement processing is executed so that as the intensity of the edge component becomes lower, the intensity of the edge component is made to change relative to the brightness level with more uniformity instead of adjusting the intensity of the edge component to change relative to the brightness level to varying extents.

According to the 39th aspect of the present invention, in the image processing method according to the 37th aspect, it is preferred that: the edge-enhanced image is created by executing the edge enhancement in a work color space assuming specific gradation characteristics and then converting the image to an image in an output color space assuming gradation characteristics different from the gradation characteristics in the work color space; and the extent of change in the intensity of the edge component relative to the brightness level is set based upon a difference between the gradation characteristics in the work color space and the gradation characteristics in the output color space.

According to the 40th aspect of the present invention, a computer-readable computer program product comprises an image processing program enabling a computer or an image processing apparatus to execute an image processing method according to the 27.

According to the 41st aspect of the present invention, an image processing apparatus comprises a control device capable of executing an image processing method according to the 27.

According to the 42nd aspect of the present invention, an electronic camera comprises a control device capable of executing an image processing method according to the 27.

According to the 43rd aspect of the present invention, an image processing method comprises: generating, based upon an original image, at least one set of a low-frequency band-limited image and a high-frequency band-limited image; extracting a low-frequency edge component and a high-frequency edge component with an edge extraction filter applied to each band-limited image; generating a single edge component by combining the low-frequency edge component and the high-frequency edge component; executing edge enhancement for the original image based upon the generated edge component; and adjusting a combining ratio with which the low-frequency edge component and the high-frequency edge component are combined in correspondence to an intensity of the edge enhancement.

According to the 44th aspect of the present invention, in the image processing method according to the 43rd aspect, it is preferred that if the original image is expressed with luminance component, the combining ratio of the low-frequency edge component to the high-frequency edge component is lowered as the intensity of the edge enhancement increases.

According to the 45th aspect of the present invention, in the image processing method according to the 43rd aspect, it is preferred that if the original image is expressed with chrominance component, the combining ratio of the high-frequency edge component to the low-frequency edge component is lowered as the intensity of the edge enhancement increases.

According to the 46th aspect of the present invention, in the image processing method according to the 44th aspect, it is preferred that as the intensity of the edge enhancement decreases, the combining ratio for the low-frequency edge component and the high-frequency edge component is adjusted so that the low-frequency edge component and the high-frequency edge components are combined at substantially equal rates.

According to the 47th aspect of the present invention, in the image processing method according to the 43rd aspect, it is preferred that: a noise component is extracted from the original image; and if executing the edge enhancement coupled with noise removal executed for the original image based upon the extracted noise component, the combining ratio for the low-frequency edge component and the high-frequency edge component is further adjusted in correspondence to the intensity of the noise removal.

According to the 48th aspect of the present invention, in the image processing method according to the 47th aspect, it is preferred that if the original image is expressed with luminance component, the combining ratio of the low-frequency edge component to the high-frequency edge component is lowered as the intensity of the noise removal increases.

According to the 49th aspect of the present invention, in the image processing method according to the 47th aspect, it is preferred that if the original image is expressed with chrominance component, the combining ratio of the high-frequency edge component to the low-frequency edge component is lowered as the intensity of the noise removal increases.

According to the 50th aspect of the present invention, in the image processing method according to the 48th aspect, it is preferred that as the intensity of the noise removal decreases, the combining ratio for the low-frequency edge component and the high-frequency edge component is adjusted so that the low-frequency edge component and the high-frequency edge component are combined at substantially equal rates.

According to the 51st aspect of the present invention, an image processing method, comprises: generating, based upon an original image, at least one set of a low-frequency band-limited image and a high-frequency band-limited image; extracting a low-frequency noise component and a high-frequency noise component with a noise removal filter applied to each band-limited image; generating a single noise component by combining the low-frequency noise component and the high-frequency noise component; executing noise removal for the original image based upon the generated noise component; and adjusting a combining ratio with which the low-frequency noise component and the high-frequency noise component are combined in correspondence to an intensity of the noise removal.

According to the 52nd aspect of the present invention, in the image processing method according to the 51st aspect, it is preferred that if the original image is expressed with luminance component, the combining ratio of the low-frequency noise component to the high-frequency noise component is lowered as the intensity of the noise removal decreases.

According to the 53rd aspect of the present invention, in the image processing method according to the 51st aspect, it is preferred that if the original image is expressed with chrominance component, the combining ratio of the high-frequency noise component to the low-frequency noise component is lowered as the intensity of the noise removal decreases.

According to the 54th aspect of the present invention, in the image processing method according to the 52nd aspect, it is preferred that the combining ratio for the low-frequency noise component and the high-frequency noise component is adjusted so that the low-frequency noise component and the high-frequency noise component are combined at substantially equal rates as the intensity of the noise removal increases.

According to the 55th aspect of the present invention, an image processing method, comprises: inputting an original image constituted with a plurality of pixels; generating low-frequency images assuming sequentially lowered resolution levels and high-frequency images assuming sequentially lowered resolution levels by decomposing the original input image; generating a low-frequency edge component and a high-frequency edge component respectively corresponding to the low-frequency images and the high-frequency images by extracting an edge component through an edge extraction filter applied to each of the low-frequency images and the high-frequency images; modulating weights to be applied to the edge component corresponding to different frequency bands by multiplying at least either the low-frequency edge component or the high-frequency edge component having been generated by a weighting coefficient; synthesizing in sequence the low-frequency edge component and the high-frequency edge component resulting from modulation so as to generate a single synthesized edge component with a resolution level thereof raised in corresponding sequence; adjusting an intensity of the synthesized edge component by multiplying the synthesized edge component by an edge enhancement rate; and executing edge enhancement for the original image by adding the adjusted edge component to the original image, and a value of the weighting coefficient used to modulate the weights applied to the edge components corresponding to the different frequency bands is adjusted in correspondence to the edge enhancement rate.

According to the 56th aspect of the present invention, in the image processing method according to the 55th aspect, it is preferred that the value of the weighting coefficient used to modulate the weights applied to the edge component corresponding to the different frequency bands is adjusted so that a difference between the weights applied to the low-frequency edge component and the high-frequency edge component increases when a greater value is assumed for the edge enhancement rate and that the difference becomes smaller when a smaller value is assumed for the edge enhancement rate.

According to the 57th aspect of the present invention, in the image processing method according to the 55th aspect, it is preferred that if the original image is expressed with luminance component, the value of the weighting coefficient used to modulate the weights applied to the edge component corresponding to the different frequency bands is adjusted so that the weight applied to the low-frequency edge component becomes smaller as a greater value is assumed for the edge enhancement rate and that the weight applied to the low-frequency edge component becomes greater as a smaller value is assumed for the edge enhancement rate.

According to the 58th aspect of the present invention, in the image processing method according to the 55th aspect, it is preferred that if the original image is expressed with chrominance component, the value of the weighting coefficient used to modulate the weights applied to the edge component corresponding to the different frequency bands is adjusted so that the weight applied to the high-frequency edge component becomes smaller as a greater value is assumed for the edge enhancement rate and that the weight applied to the high-frequency edge component becomes greater as a smaller value is assumed for the edge enhancement rate.

According to the 59th aspect of the present invention, an image processing method, comprises: inputting an original image constituted with a plurality of pixels; generating low-frequency images assuming sequentially lowered resolution levels and high-frequency images assuming sequentially lowered resolution levels by decomposing the original input image; generating a low-frequency noise component and a high-frequency noise component respectively corresponding to the low-frequency images and the high-frequency images by extracting a noise component contained in each of the low-frequency images and the high-frequency images; modulating weights to be applied to the noise component corresponding to different frequency bands by multiplying at least either the low-frequency noise component or the high-frequency noise component having been generated by a weighting coefficient; synthesizing in sequence the low-frequency noise component and the high-frequency noise component resulting from modulation so as to generate a single synthesized noise component with a resolution level thereof raised in corresponding sequence; attenuating an intensity of the synthesized noise component by multiplying the synthesized noise component by a noise removal rate; and removing noise from the original image by subtracting the attenuated noise component from the original image, and a value of the weighting coefficient used to modulate the weights applied to the noise component corresponding to the different frequency bands is adjusted in correspondence to the noise removal rate.

According to the 60th aspect of the present invention, in the image processing method according to the 59th aspect, it is preferred that the value of the weighting coefficient used to modulate the weights applied to the noise component corresponding to the different frequency bands is adjusted so that a difference between the weights applied to the low-frequency noise component and the high-frequency noise component increases when a smaller value is assumed for the noise removal rate and that the difference becomes smaller when a greater value is assumed for the noise removal rate.

According to the 61st aspect of the present invention, in the image processing method according to the 59th aspect, it is preferred that if the original image is expressed with luminance component, the value of the weighting coefficient used to modulate the weights applied to the noise component corresponding to the different frequency bands is adjusted so that the weight applied to the low-frequency noise component becomes smaller as a smaller value is assumed for the noise removal rate and that the weight applied to the low-frequency noise component becomes greater as a greater value is assumed for the noise removal rate.

According to the 62nd aspect of the present invention, in the image processing method according to the 59th aspect, it is preferred that if the original image is expressed with chrominance component, the value of the weighting coefficient used to modulate the weights applied to the noise component corresponding to the different frequency bands is adjusted so that the weight applied to the high-frequency noise component becomes smaller as a smaller value is assumed for the noise removal rate and that the weight applied to the high-frequency noise component becomes greater as a greater value is assumed for the noise removal rate.

According to the 63rd aspect of the present invention, an image processing method, comprises: generating a plurality of band-limited images assuming sequentially lowered resolution levels by filtering an original image; extracting an edge component from each band-limited image; synthesizing the edge component extracted from the each band-limited image by weighting the edge component in correspondence to a resolution level thereof so as to generate a single synthesized edge component; and executing edge enhancement for the original image based upon the synthesized edge component, and a position of a gravitational center of the weights corresponding to the different resolution levels is adjusted based upon an intensity of the edge enhancement.

According to the 64th aspect of the present invention, in the image processing method according to the 63rd aspect, it is preferred that as the intensity of the edge enhancement intensity increases, the position of the gravitational center of the weights shifts toward a higher resolution side.

According to the 65th aspect of the present invention, in the image processing method according to the 64th aspect, it is preferred that an edge component in an area with low edge enhancement intensity is synthesized by weighting the edge component with the gravitational center of the weights set at an intermediate resolution level.

According to the 66th aspect of the present invention, in the image processing method according to the 63rd aspect, it is preferred that Poisson's distribution is adopted as a distribution function for the weights corresponding to the different resolution levels.

According to the 67th aspect of the present invention, in the image processing method according to the 66th aspect, it is preferred that distribution characteristics are altered so that an average value of the Poisson's distribution shifts monotonously toward a higher resolution side as the intensity of the edge enhancement increases.

According to the 68th aspect of the present invention, in the image processing method according to the 63rd aspect, it is preferred that a noise component is extracted from the original image; and if executing the edge enhancement coupled with noise removal for the original image executed based upon the extracted noise component, the gravitational center of the weights applied to the edge components corresponding to the different resolution levels is further adjusted in correspondence to an intensity of the noise removal.

According to the 69th aspect of the present invention, in the image processing method according to the 68th aspect, it is preferred that the position of the gravitational center of the weights shifts toward the higher resolution side as the intensity of the noise removal increases.

According to the 70th aspect of the present invention, a computer-readable computer program product comprises an image processing program enabling a computer or an image processing apparatus to execute an image processing method according to the 43rd aspect.

According to the 71st aspect of the present invention, an image processing apparatus comprises a control device capable of executing an image processing method according to the 43rd aspect.

According to the 72nd aspect of the present invention, an electronic camera comprises a control device capable of executing an image processing method according to the 43rd aspect.

BRIEF DESCRIPTION OF THE DRAWINGS

FIG. 7A shows the gamma characteristics assumed in the output color space and the work color space, whereas

FIG. 11 illustrates frequency spaces corresponding to multiple resolution levels; and FIG. 12 presents an at-a-glance chart of the enhancement effects.

DESCRIPTION OF PREFERRED EMBODIMENTS

-Basic Concept-

First, the background of, and the reason for adoption of the algorithms to be described in reference to the embodiments and the basic concept of the corresponding methods are described.

(Challenging Issues in Noise Removal Processing)

Noise removal processing is normally executed with a noise removal filter referred to as an edge-preserving smoothing filter that adaptively smooths the target image by distinguishing an edge structure manifesting a significant signal level variance from noise with a slight amplitude. A typical example of such a noise removal filter is a high-performance bilateral filter. The noise removal filter basically compares the pixel value level difference calculated for a specific pixel relative to nearby pixels with a noise fluctuation index value and sets a weighting coefficient used to determine whether or not the pixel is to be designated as a smoothing target pixel based upon their ratio.

Figure 10A:
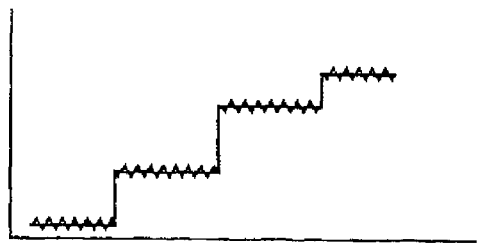
FIG. 10A~10D each indicate a signal to noise relationship that may be observed.
Figure 10B:
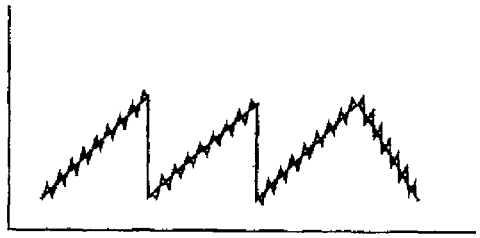
Figure 10C:
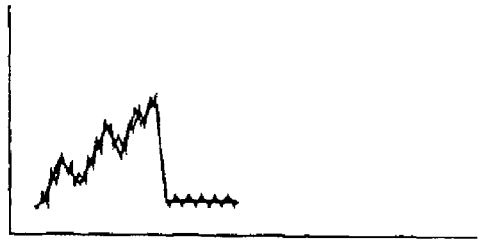
Figure 10D:
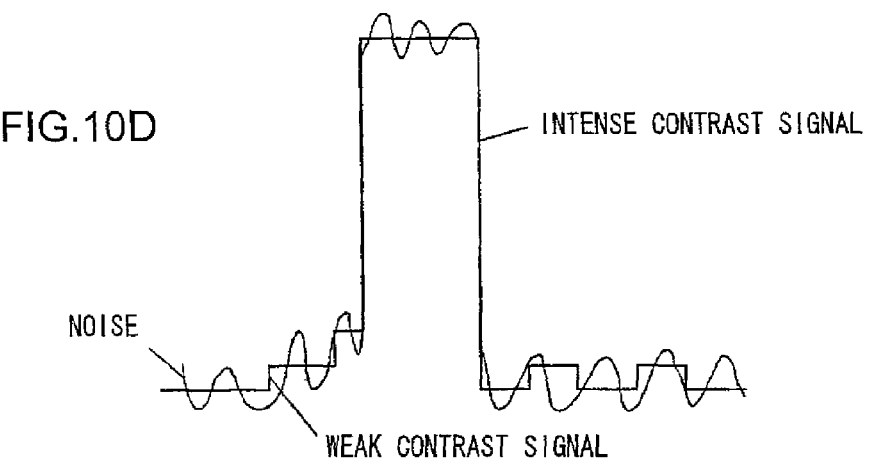

However, no matter how high the performance level of the noise removal filter, a weak edge with a signal level close to noise cannot be distinguished from the noise (see FIG. 10D). This leads to loss of texture through the noise removal (issue 1). In addition, the smoothing weighting coefficient, based upon which the edge and the noise can be successfully separated from each other over a standard flat image area or a monotonously inclined image area (see FIGS. 10A and 10B), is bound to induce dulling of the outline over an image area containing a steeply changed edge (see FIG. 10C), since the outline component of the steeply changed edge tends to be mistaken as a relatively slight edge due to steeply changing, to induce a situation similar to that described in reference to issue 1 and the edge thus tends to be designated as a smoothing target. Consequently, the outline becomes dulled through the noise removal (issue 2). FIGS. 10A~10D illustrate the situations described above.

While these issues are primarily phenomena occurring in relation to the luminance component noise removal processing, a fading phenomenon (issue 3) occurring over an image area where the color changes slightly and a color bleeding phenomenon (issue 4) occurring at a color boundary are challenges that must be cleared in the chrominance component noise removal processing. In addition, as the smoothing processing is executed through noise removal, local gradations are all adjusted to the average level and thus, a completely dark state with an average value of, for instance, 0 cannot be achieved and an undesirable phenomenon of black lifting whereby the black level becomes elevated occurs (issue 5). A similar phenomenon also occurs on the white side and overall, the smoothing processing reduces the range over which gradational expression is possible, to result in limited gradational representation.

In other words, in view of subjective expression and physical correlation, the issues that must be addressed in noise removal technologies can be summarized as follows.
(1) As the contrast at an outline is lowered due to dulling of the outline, the image loses sharp definition and depth (issue 2);
(2) the resolution becomes poorer as an edge structure with the signal level weak enough to be buried in noise is lost (issue 1);
(3) the black lifting phenomenon lowers the range of gradational expression (issue 5);
(4) as color becomes faded, the color reproducibility is compromised (issue 3); and
(5) color bleeding lowers the color resolution (issue 4).

These problems may also occur in images containing a great deal of high-sensitivity noise, even when no noise removal processing is executed. Namely, as noise with significant amplitude is added into a sharp, low-sensitivity image, the contrast at the outline of the true subject is subjected to a relative reduction attributable to the noise amplitude, which results in the image appearing less sharp than the low-sensitivity image.

Under such circumstances, the image texture cannot be distinguished from the noise, the noise amplitude raises the black level itself to result in the black lifting phenomenon and non-correlational fluctuations in the R, G and B data are superimposed as color mottling noise, which lowers the color discrimination/separation performance over the particular image area and lowers the accuracy of color recognition (color reproducibility). This, in turn, results in the image taking on the appearance of random color bleeding caused by color noise, occurring at color boundaries. The sequence of events described above may be summarily referred to as a reduction in the contrast caused by a noise overlay.
(Noise Removal Processing Concurrent with Edge Enhancement Processing)

In order to address the issues of the noise removal discussed above, edge enhancement processing for restoring the contrast at edges to an extent equivalent to the extent to which the edge contrast was lost through the noise removal, gradation correction processing for regaining the gradation reproducibility or contrast correction processing must be executed. In addition, even when no noise removal has been executed, processing equivalent to any of those listed above may be executed on a high-sensitivity photographic image so as to create an image with sharp definition similar to that of a low-sensitivity photographing image. Furthermore, by repairing a low-sensitivity photographic image so as to eliminate the adverse effect of lowered contrast attributable to noise overlay, an image achieving the intended sharpness, resolution, gradational expression and color reproducibility can be created.

Accordingly, edge enhancement processing may be executed based upon multi-resolution representation as disclosed in International Publication No. 2007/114363 pamphlet and International Publication No. 2007/116543 pamphlet, filed by the inventor of the present invention. The edge enhancement processing disclosed in the publications is fundamentally different from the edge enhancement processing through multi-resolution representation in the related art (see, for instance, U.S. Pat. No. 6,754,398) in that edge components extracted by projecting the target image into frequency spaces corresponding to the low-frequency subbands generated in sequence with redundancy are used in addition to edge components extracted by projecting the target image into frequency spaces corresponding to high-frequency subbands expressed through multi-resolution representation and forming a complete system and in that these edge components are combined with a high level of flexibility. FIG. 11 illustrates frequency spaces generated through multi-resolution representation. It is to be noted that the term "complete system" is used to refer to the group of images in specific frequency projection spaces, from which the complete original image can be reconstituted. While the complete system should include a single low-frequency subband at the lowest resolution level, the following discussion does not mention the low-frequency subband in the complete system.

Since the details of any advantages that may be realized as true physical effects through the edge enhancement processing in practical applications have not been clarified, a specific methodology through which the image enhancement processing effects may be further improved has not been proposed. Accordingly, the present invention examines the optimal method for providing the most natural-looking image possible through edge enhancement by clarifying the physical effects of the edge enhancement processing, assessing the challenges that still must be dealt with and assessing possible measures for overcoming these challenges.
(Clarifying the Physical Effects of Multi-resolution Edge Enhancement Processing)

First, the physical effects of edge enhancement achieved through redundant multi-resolution transformation are clarified. Tests were conducted to verify the edge enhancement effects in the frequency projection spaces generated through redundant multi-resolution representation, which includes two types of subbands, i.e., a set of low-frequency subbands and a set of high-frequency subbands. The test results indicate that the following outstanding image enhancement effects, different from each other, are achieved for the edge components extracted in the low-frequency subbands and the edge components extracted in the high-frequency subbands.

When the input image is constituted with luminance component data, edge enhancement executed by projecting the input image into the frequency spaces corresponding to the low-frequency subbands achieves a contrast enhancement effect of improving the tightness of black and the gradational expression. In other words, the edge enhancement processing executed by using the low-frequency subbands generated from the luminance component data through multi-resolution representation achieves advantages similar to those of gradation correction processing. The edge enhancement processing executed by projecting the luminance component data into frequency spaces corresponding to the high-frequency subbands achieves a sharp definition restoration effect of restoring textural details buried in noise by improving the contrast at the outlines.

When the input image is constituted with chrominance component data, edge enhancement executed by projecting the input image into the frequency spaces corresponding to the low-frequency subbands achieves a color vibrancy restoration effect of greatly improving the saturation in a large flat image area. In other words, the edge enhancement processing executed on the chrominance component data achieves advantages similar to those of saturation enhancement processing. The edge enhancement processing executed by projecting the chrominance component data into frequency spaces corresponding to the high-frequency subbands achieves a color contrast restoration effect of providing a clear definition at a color boundary by reducing the extent of color bleeding at the color boundary and restoring a color texture structure.

FIG. 12 provides an at-a-glance chart summarizing the enhancement effects. As the chart clearly indicates, the "contrast" is enhanced for the low-frequency bands of the luminance component data and is enhanced for the high-frequency subbands of the chrominance component data. This phenomenon is considered to be attributable to different frequency characteristics assumed in the initial luminance plane image structure and the initial chrominance plane image structure. Namely, while the luminance plane is bound to contain a great deal of high-frequency structure, the chrominance plane is most likely to contain a great deal of low-frequency structure. Thus, it can be safely assumed that the edge enhancement effect achieved for the luminance component data projected into the frequency spaces corresponding to the low-frequency subbands is more similar to the edge enhancement effect achieved for the chrominance component data projected into the frequency spaces corresponding to the high-frequency subbands.

In an experiment, an image was obtained by simply executing the noise removal processing, to be described in detail in reference to the first embodiment, alone on the original image and another image demonstrating an edge enhancement effect was also obtained by simply executing inverse multi-resolution transformation for edge components extracted in the various frequency projection planes in the first embodiment so as to generate a synthesized (or integrated) edge component and adding the synthesized edge component to a noise-free image. The results of the experiment indicates that when high-intensity edge enhancement processing was executed by actually using the low-frequency subbands of the luminance component data, an unusually evident black tightening effect was achieved in comparison to that in the noise-free image. In addition, the edge enhancement processing executed by using the high-frequency subbands achieved excellent restoration of texture structures such as dark spots and white spots in the background and the texture of hair and fur, which had been lost in the noise-free image. The effects indicated in FIG. 12 were also achieved in a similar manner for the chrominance component data.

(Optimization of the Multi-resolution Edge Enhancement Processing)

Once the individual physical effects have been clarified as described above, it becomes obvious that if some restrictions based upon specific rules are not imposed when combining the edge components having been extracted from the low-frequency subbands and the edge components having been extracted from the high-frequency subbands, it results in that the image may manifest an unnatural-looking edge enhancement effect far removed from the appearance of the original image. In addition, when noise removal is executed in conjunction with the edge enhancement processing, the intensity of the noise removal affects the subjective evaluations of any negative effects of the noise removal. Accordingly, the image will need to be restored in correspondence to the perceived extent to which image quality has been compromised. The restoration is attempted in the embodiments by interlocking with an edge enhancement rate or a noise removal rate.

(Challenges that the Multi-resolution Edge Enhancement Processing Must Overcome)

As is clear from the images obtained in the experiment described earlier, there is a risk inherent in multi-resolution edge enhancement in that halo formation or howling may occur over a large image area. While these phenomena occur for the same reasons as for the ringing phenomenon occurring near an edge, which is inherent to the standard unsharp mask processing, the negative effects become scaled up through the multi-resolution processing.

In an attempt devised in the related art to minimize the extent of ringing phenomenon, the extracted edge component is processed through a nonlinear conversion assuming characteristics whereby the output edge component changes in direct proportion to the input edge component near the origin point and the output edge component gently and monotonously increases elsewhere. However, these measures have proven insufficient in facilitating the pursuit of even higher quality multi-resolution edge enhancement processing. Namely, the problems of halo formation and howling must be completely resolved in order to assure successful multi-resolution edge enhancement in practical applications. Accordingly, the present invention enforces the measures discussed above by assuming a hypothesis defining the edge component in the most natural state, which achieves the most natural appearance in the image resulting from the edge enhancement processing and by adjusting the edge component so as to achieve the natural state.

(Challenges of Edge Enhancement Processing)

Another crucial requirement for edge enhancement is that the risk of amplifying the noise component through the edge enhancement be eliminated, in addition to effectively minimizing the ringing phenomenon described above. It is inevitable that the noise component extracted through the noise component extraction process during noise removal processing contains an edge component or the noise component extracted through the edge component extraction process during edge enhancement processing contains an edge component. The noise component and the edge component in these states may be schematically expressed as below.

$$N_{extracted} = N_{true} + e_{undistinguished}$$

$$E_{extracted} = E_{true} + n_{undistinguished}$$

As indicated in the flowchart for the second embodiment of the present invention, the presence of the noise component in the edge component is minimized by extracting the edge component from a noise-free image having undergone noise removal. However, the edge component cannot be completely free of a noise component in reality. In addition, as has been described in reference to the challenging issues for the noise removal filters, an edge component that cannot be distinguished or separated and discriminated through the noise removal filter is bound to be included in the noise component. The presence of the edge component mixed in the noise component causes the problems described as the challenging issues of noise removal, whereas the noise component mixed in the edge component becomes amplified through the edge enhancement. The image resulting from such noise removal or edge enhancement is bound to fail to reproduce the textural quality of the subject.

(Modified Edge Enhancement Processing)

Accordingly, based upon the hypothesis on the natural state of the edge component mentioned earlier, edge self-refining processing for taking impurities out of the extracted edge component to increase the purity of the edge component is executed in the present invention by adjusting the edge component to achieve a state close to the natural state. In addition, a similar hypothesis defining the desirable state of the noise component can be assumed for the noise component and accordingly, noise self-refining processing for taking out impurities from the noise component to raise the purity thereof based upon the hypothesis is executed as well. In the description of the embodiments, the processing for eliminating impurities contained in the edge component or the noise component to improve the purity of the component is referred to as "refine processing".

However, it is still difficult to completely separate impurities through such operations. Namely, even when the extracted edge component is actually made up, in large part, of a noise component, the behavior of the noise component may be similar to that of the edge component in its natural state and, under such circumstances, the noise component cannot be distinguished from the edge component. A similar problem may occur with regard to an edge component present in the noise component. In order to address these problems, the following hypothesis may be further assumed so as to estimate the quantity of a significant impurity component contained in the edge component or the noise component by referencing the levels of the noise component and the edge component relative to each other.

Namely, over a local area where the edge component assumes large values, there is a high likelihood of the edge component, erroneously extracted as a noise component during the noise extraction process and making up most of the extracted noise component. Over a local area where the noise component assumes large values, there is a high likelihood of the noise component, erroneously extracted as an edge component during the edge extraction process, making up most of the extracted edge component. Accordingly, the levels of the edge component and the noise component relative to each other may be referenced and mutual refine processing may be executed for the edge component and the noise component so as to improve the levels of purity in both components. A prerequisite for this mutual refine processing is that the levels of purity of the noise component and the edge component already be raised to certain levels.

The self-refining processing and the mutual refine processing may be executed for the edge component and the noise component typically as indicated in the flowchart of the second embodiment. In the edge component/noise component extraction•synthesis processes executed in the first embodiment based upon the multi-resolution representation; the self-refining processing and the mutual refine processing are first executed once for each resolution level and then the synthesized edge component and the synthesized noise component further undergo the self-refining processing and the mutual refine processing for further scrutiny so as to maximize their purity and, at the same time, eliminate any howling component from the edge component with a high level of reliability.

(Higher Performance Edge Enhancement Processing)

However, no matter how high the purity levels of the edge component and the noise component may have been raised through these measures, they are each bound to contain part of the other component that has not been separated and the influence of their presence cannot be disregarded. Namely, challenging issues of noise amplification through edge enhancement, edges dulled through noise removal and the like still cannot be completely overcome.

Accordingly, such adverse effects are predicted according to the present invention so as to maximize the positive effects of the edge enhancement and the noise removal by minimizing the adverse effects through a method of a functional (a function that includes a variable expressed as a function) representation of the final edge enhancement rate and the final noise removal rate achieved based upon a contrast ratio function relative to the luminance indicated as the differential ratio of the gradation characteristics in the output color space and the gradation characteristics in the work color space.

The flowchart in reference to which the second embodiment is to be described indicates how this may be achieved. Namely, a first expression is modified into the second expression. λ, ζ, γ, Γ in the expressions respectively represent the noise removal rate, the edge enhancement rate, the gradation curve γ(Y) in the output color space relative to the linear gradation Y and the gradation curve Γ(Y) in the work color space relative to the linear gradation Y.

$$S'(\vec{x}) = S(\vec{x}) - \lambda \cdot N(\vec{x}) + \zeta \cdot E(\vec{x}) \qquad \text{[Expression 1]}$$

$$\lambda = const., \quad \zeta = const.$$

$$S'(\vec{x}) = S(\vec{x}) - \lambda(\vec{x}) \cdot N(\vec{x}) + \zeta(\vec{x}) \cdot E(\vec{x})$$

$$\lambda(\vec{x}) = \lambda_0 \cdot f\left(\frac{d\gamma}{d\Gamma}(S(\vec{x}))\right), \quad \zeta(\vec{x}) = \zeta_0 \cdot F\left(\frac{d\gamma}{d\Gamma}(S(\vec{x}))\right)$$

$$\lambda_0 = const., \quad \zeta_0 = const.$$

A contrast ratio functional representation may be achieved either by increasing/decreasing the edge enhancement rate and the noise removal rate relative to a specific reference point through the brightness level range assumed for the overall image or by increasing/decreasing the edge enhancement rate and the noise removal rate within the brightness level range assumed over a local area near an edge. The two approaches are adopted in combination in the present invention. One of the two concepts corresponds to the method of the standard gradation correction technology whereby the luminance over the entire image is adjusted by altering the tone curve through averaging (also referred to as the histogram equalization method) and the other concept corresponds to retinex processing, in which the contrast is enhanced around a local edge structure while allowing the brightness level in the local area to switch in relation to the brightness level in another area. The former method, which may be referred to as gamma control processing, and the latter method, which may be referred to as retinex processing, in terms of gradation correction processing technologies, respectively represent a gamma control version of edge enhancement or noise removal and a retinex version of edge enhancement or noise removal.

Namely, the contrast ratio functional representation of the edge enhancement rate adopted in the present invention for the gamma version processing assumes uniform characteristics over the entire image with regard to how the edge enhancement rate is increased/decreased relative to the brightness level. In the retinex version processing, on the other hand, the characteristics with which the edge enhancement rate is increased/decreased for the entire image is not uniform but the edge enhancement rate is uniformly increased/decreased near a local edge in conformance to a specific rule. It has been concluded that when the noise removal and the edge enhancement are executed simultaneously, the edge enhancement rate should be expressed through a functional representation identical to that for the noise removal rate in order to reproduce any edge component lost through the noise removal with accuracy and fidelity.

-First Embodiment- (Multi-resolution Version)

Figure 1:
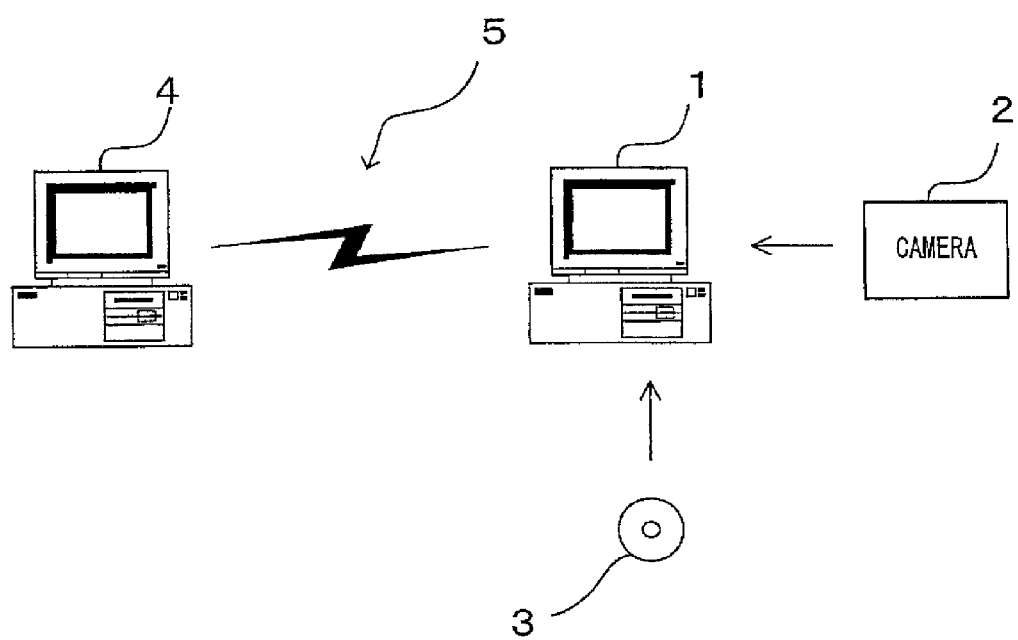
FIG. 1 shows an image processing apparatus achieved in an embodiment of the present invention.

An embodiment in which the noise removal and the edge enhancement are achieved simultaneously through multi-resolution representation is now described. FIG. 1 shows the image processing apparatus achieved in an embodiment of the present invention. The image processing apparatus is constituted with a personal computer 1. The personal computer 1, which is connected with a digital camera 2, a recording medium 3 such as a CD-ROM, another computer 4 and the like, is able to receive various types of image data. The personal computer 1 executes the image processing to be explained below on the image data provided thereto. The personal computer 1 is connected to the computer 4 via an electronic communication network 5, which may be the Internet.

Figure 2:
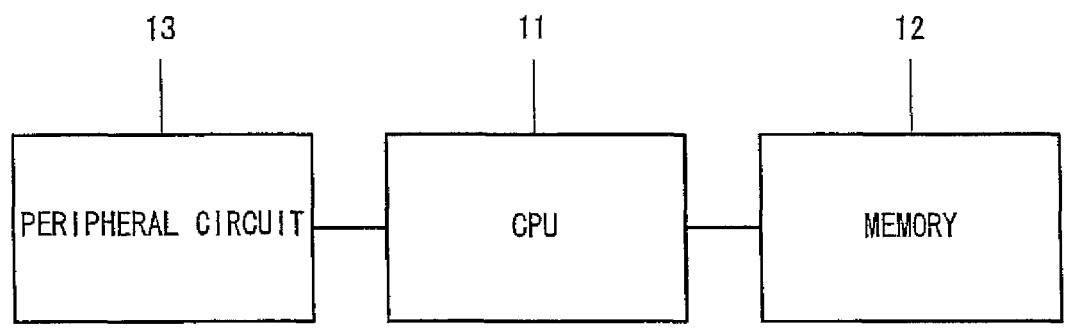
FIG. 2 shows the structure adopted in the personal computer.

The program that enables the computer 1 to execute the image processing is provided in a recording medium such as a CD-ROM or by another computer via the Internet or another electronic communication network connected to the personal computer in a manner similar to that shown in FIG. 1. The program thus provided is installed within the personal computer 1. FIG. 2 shows the structure of the personal computer 1. The personal computer 1 comprises a CPU 11, a memory 12 and a peripheral circuit 13 and the like. The installed program is executed by the CPU 11.

The program to be provided via the Internet or another electronic communication network is converted to and transmitted as a signal on a carrier wave transmitted through the electronic communication network, i.e., a transmission medium. Namely, the program can be distributed as a computer-readable computer program product adopting any of various modes including a recording medium and a carrier wave.

Figure 3:
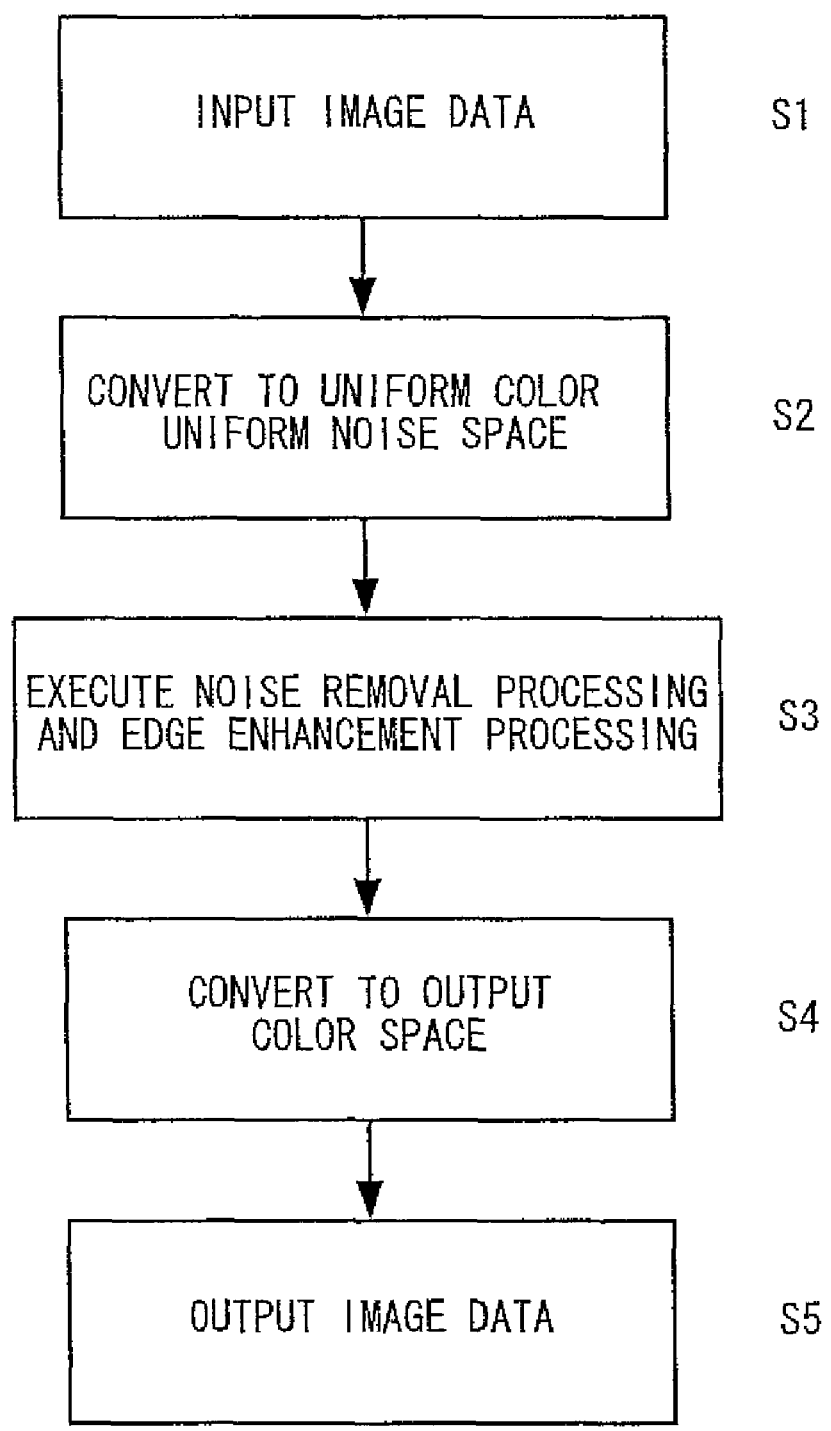
FIG. 3 presents a flowchart of the image processing executed by the personal computer 1 in a first embodiment.

The following is a description of the image processing executed in the personal computer 1. FIG. 3 presents a flowchart of the image processing executed by the personal computer 1 in the first embodiment. In step S1, image data are input. In step S2, the image data are converted to data in a uniform color uniform noise space. In step S3, noise removal processing and edge enhancement processing are executed. In step S4, color space reverse conversion is executed. In step S5, the image data resulting from the processing are output. The processing executed in the individual steps is now described in detail.

1. Color Space Conversion

After the image data (hereafter simply referred to as an image) are input in step S1, the input image undergoes color space conversion and thus is projected into an image processing space optimal for the noise removal processing in step S2. Such an image processing space may be, for instance, the uniform color•uniform noise space disclosed in International Publication No. 2006/064913 pamphlet (proposed by the inventor of the present invention). The input image is usually expressed in a standard color space such as the sRGB color space. Accordingly, the following explanation is provided by assuming that the input image is an sRGB image having undergone color correction processing, gamma correction processing and the like.

1-1 Reverse Gamma Correction

The gradation conversion, having been executed to achieve gamma characteristics conforming to the sRGB specifications or the unique gamma characteristics assumed by the camera manufacturer in conjunction with its proprietary image creation technology, is undone so as to convert the data back to the initial linear gradation data.

$$R_{sRGB}^{linear} = \gamma^{-1}(R_{sRGB})$$

$$G_{sRGB}^{linear} = \gamma^{-1}(G_{sRGB})$$

$$R_{sRGB}^{linear} = \gamma^{-1}(B_{sRGB}) \quad \text{[Expression 2]}$$

As an alternative, R, G and B signals assuming linear gradation obtained by executing demosaic processing on imaging signals output from an image sensor with color filters assuming specific spectral sensitivity distribution characteristics disposed in, for instance, a Bayer array, may be directly input.

1-2 Conversion from RGB Color Space to XYZ Color Space

The sRGB image having been converted back to linear gradation data may be connected to data in an XYZ space through the following standard conversion executed as expressed below.

$$\begin{pmatrix} X \\ Y \\ Z \end{pmatrix} = \begin{pmatrix} 0.4124 & 0.3576 & 0.1805 \\ 0.2126 & 0.7152 & 0.0722 \\ 0.0193 & 0.1192 & 0.9505 \end{pmatrix} \begin{pmatrix} R_{sRGB}^{linear} \\ G_{sRGB}^{linear} \\ B_{sRGB}^{linear} \end{pmatrix} \quad \text{[Expression 3]}$$

The RGB signals assuming the sensor spectral sensitivity distribution characteristics, having just undergone the demosaic processing, should be converted to data in the device-independent XYZ space by configuring matrices corresponding to their individual spectral sensitivity distribution characteristics.

1-3 Conversion from XYZ Color Space to Uniform Color—Uniform Noise Color Space (L^a^b^)

Next, the data in the XYZ space are converted to data in a nonlinear gradation L^a^b^ space representing a perceptive attribute with a pseudo-uniform color distribution. The L^a^b^ space is defined in the description of the embodiment as a space obtained by modifying the uniform color space L*a*b* in the related art in consideration of noise uniformity and, for the sake of convenience, is referred to as L^a^b^.

$$\hat{L} = 100 \cdot f\left(\frac{Y}{Y_0}\right) \quad \text{[Expression 4]}$$

$$\hat{a} = 500\left\{f\left(\frac{X}{X_0}\right) - f\left(\frac{Y}{Y_0}\right)\right\}$$

$$\hat{b} = 200\left\{f\left(\frac{Y}{Y_0}\right) - f\left(\frac{Z}{Z_0}\right)\right\}$$

The gradation characteristics used to achieve uniform color•uniform noise in this process are usually expressed as;

$$f(t) = \frac{\sqrt{t+\varepsilon} - \sqrt{\varepsilon}}{\sqrt{1+\varepsilon} - \sqrt{\varepsilon}} \quad \text{[Expression 5]}$$

X0, Y0 and Z0 in the expressions above each represent a value determined in correspondence to the illuminating light. For instance, X0, Y0 and Z0 may assume values 95.045, 100.00 and 108.892 respectively in a 2° visual field under standard light D65. While ε assumes a value dependant upon the specific sensor in use, a value very close to zero, for instance, will be assumed when a low sensitivity setting is selected and a value approximately equal to 0.25 will be assumed when a high sensitivity setting is selected.

The following is a description of the noise removal processing and edge enhancement processing executed in step S3.

2 Multi-resolution Image Representation

Figure 4A:
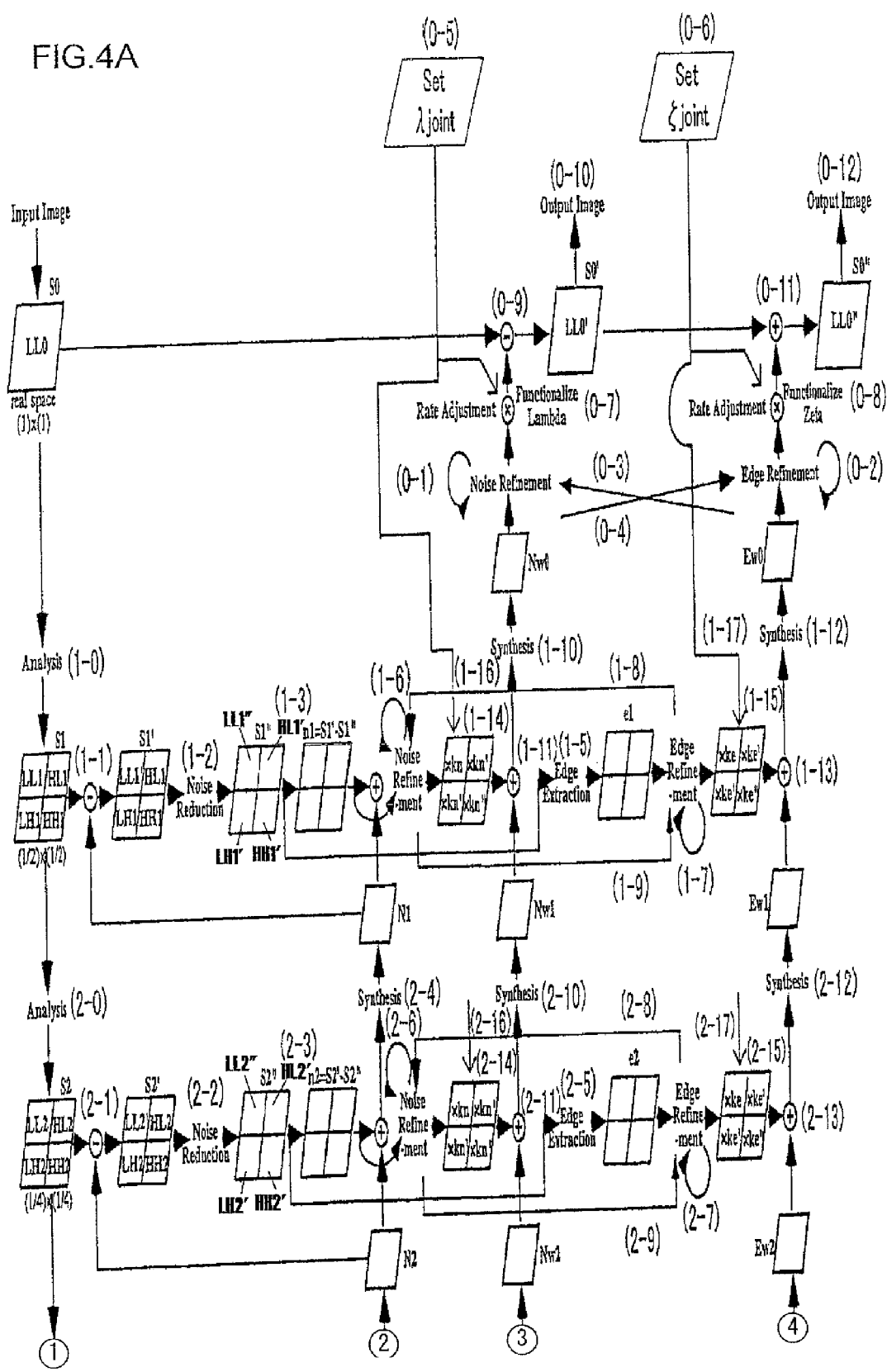
FIGS. 4A and 4B presents a flowchart of the noise removal processing and the edge enhancement processing executed based upon multi-resolution image representation.
Figure 4B:
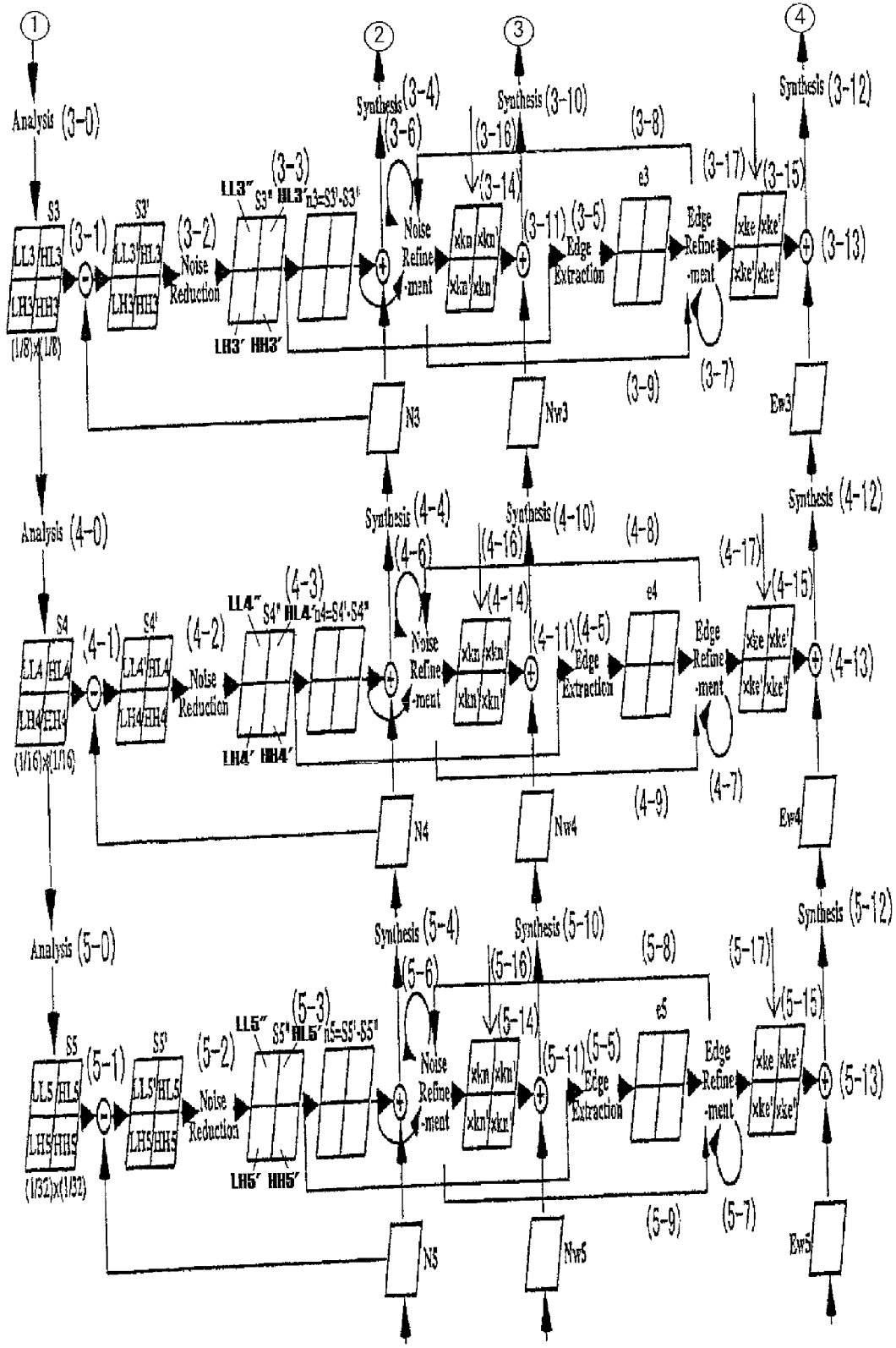

FIGS. 4A and 4B presents a flowchart of the noise removal processing and the edge enhancement processing executed based upon multi-resolution image representations. The original images corresponding to the luminance component L^, the chrominance components a^ and b^ are rendered in multiple resolution levels and then they individually undergo noise removal. The analysis phase of sequential wavelet transformation (processing (1-0) (2-0) (3-0) (4-0) (5-0)), through which subband images are generated by decomposing each original image into lower resolution images, is summarized in the expression below.

$$V_{ij}(\vec{x}) = \text{Wavelet}_{(i,j)}\{S(\vec{x})\}, \quad \text{[Expression 6]}$$

i=1,2,...,5(resolution)

j=LL, LH, HL, HH

S(x, y) generates the subband image Vij(x, y) for each of the L^, a^ and b^ planes.

It is also to be noted that in the wavelet transformation, through which an image (image data) is converted to frequency component data, the frequency component in the image is divided into a high-pass component and a low-pass component. Data made up of the high-pass component are referred to as a high-frequency subband, whereas data made up of the low-pass component are referred to as a low-frequency subband. The LL component data are low-frequency subband data, whereas the LH, HL and HH data are high-frequency subband data. Also, a low-frequency subband may be referred to as a low-frequency image and a high-frequency subband may be referred to as a high-frequency image. Furthermore, each subband may be referred to as a frequency band-limited image. A low-frequency subband is an image with band limits imposed upon the frequency band of the original image toward the low-frequency side, whereas a high-frequency subband is an image with band limits imposed upon the frequency band of the original image toward the high-frequency side.

While only the high frequency subbands, obtained by sequentially decomposing the low-frequency subband LL component, are simply retained in the standard multi-resolution transformation, both the low-frequency subbands LL and the high-frequency subbands LH, HL and HH are used in the processing executed in the embodiment, so as to ensure that the noise component is always extracted seamlessly from one subband frequency range to another.

The wavelet transformation may be executed by using, for instance, the 5/3 filter described below.

(Wavelet Transformation: Analysis/decomposition Process)

high-pass component: $d[n] = x[2n+1] - (x[2n+2] + x[2n])/2$ low-pass component: $s[n] = x[2n] + (d[n] + d[n-1])/4$ The one-dimensional wavelet transformation defined as described above is executed along the horizontal direction and the vertical direction independently through two-dimensional separation filter processing so as to achieve wavelet decomposition. The coefficient s is directed onto the L plane, whereas the coefficient d is directed onto the H plane.

(Inverse Wavelet Transformation: Synthesis/Reconstruction Process)

$x[2n] = s[n] - (d[n] + d[n-1])/4$ $X[2n+1] = d[n] + (x[2n+2] + x[2n])/2$

It is to be noted that a signal expressing the image is input to be used as the x value in the wavelet transformation, that the noise component contained in the wavelet transformation coefficients s and d having been generated is extracted and that the values of the extracted noise component are set as s and d for substitution in the inverse wavelet transformation so as to generate a noise image x, as shown in FIGS. 4A and 4B. The edge component is utilized for generation of the edge image in a similar manner.

While the multiple resolution levels are achieved through the five-stage wavelet transformation in the example described above, the number of stages over which the wavelet transformation is executed may be adjusted in correspondence to the size of the initial input image. In addition, instead of the orthogonal wavelet transformation described above, Laplacian pyramid representation, steerable pyramid representation or the like may be adopted to achieve multiple resolution levels.

3 Noise Extraction Processing Through Virtual Noise Removal 3-1 Noise Extraction Processing with Noise Removal Filter 3-1-1 Noise Removal Processing While the noise removal processing may be executed on the individual subbands at each resolution level by using any noise removal filter, the following explanation focuses on a modified bilateral filter such as that disclosed in International Publication No. 2006/06825 pamphlet (disclosed by the inventor of the present invention), achieved by improving on a well-known high-performance bilateral filter (processing (1-2) (2-2) (3-2 (4-2) (5-2)).

$$V'_{ij}(\vec{x}) = \frac{\int_{|\vec{x}'-\vec{x}| \leq 2r_{th}} V_{ij}(\vec{x}') \exp\left(-\frac{|V_{ij}(\vec{x}') - V_{ij}(\vec{x})|^2}{\sigma_{thij}^2} \cdot \frac{|\vec{x}' - \vec{x}|^2}{r_{th}^2}\right) d\vec{x}'}{\int_{|\vec{x}'-\vec{x}| \leq 2r_{th}} \exp\left(-\frac{|V_{ij}(\vec{x}') - V_{ij}(\vec{x})|^2}{\sigma_{thij}^2} \cdot \frac{|\vec{x}' - \vec{x}|^2}{r_{th}^2}\right) d\vec{x}'} \quad \text{[Expression 7]}$$

i and j in the expression are symbols used to identify the subband. i indicates the specific resolution level, whereas j indicates LL, LH, HL or HH.

The threshold value $\sigma_{th\ ij}$ is set in correspondence to an expected noise fluctuation width in each subband and the noise component is extracted by distinguishing noise from edges. It is generally understood that once the noise fluctuation index value $\sigma_{th}$ in the real space is determined, the optimal value of $\sigma_{th\,ij}$ for each subband plane can be automatically calculated by using the wavelet transformation-defining expression based upon the law of propagation of errors. The optimal $\sigma_{th\,ij}$ value can be automatically calculated by evaluating the quantity of fluctuation propagated to the individual subband signals through the wavelet transformation expression based upon the law of propagation of errors. $\sigma_{th}$ is set so as to assume a greater value as the ISO sensitivity rises. For instance, $\sigma_{th}$ may be set to a value of approximately 10 in correspondence to 256 gradation levels at ISO 6400.

The threshold value rth should assume a value in a range of, for instance, 0.5~3.0 pixels so as to ensure that the ranges of the noise removal filters at different resolution levels overlap. In addition, the integrating range should be set so that the range is equivalent to double or triple the rth value in order to ensure that the coefficient assumes a small enough value. A satisfactory level of noise removal effect can be normally achieved with another type of noise removal filter, as long as it executes filter processing on subband images expressed through multiple resolution levels by referencing pixel signals within a pixel range of 3×3~9×9.

3-1-2 Noise Extraction Processing

Noise extraction processing is executed for each subband as expressed below (processing (1-3) (2-3) (3-3) (4-3) (5-3)).

$$n_{ij}(\vec{x}) = V_{ij}(\vec{x}) - V_{ij}'(\vec{x}) \qquad \text{[Expression 8]}$$

3-2 Sequential Noise Extraction

It is difficult to extract the entire noise component seamlessly through noise removal filtering executed on each subband plane. Accordingly, noise is extracted sequentially by referencing the noise having been extracted at another resolution level so as to ensure that there will be no gap between the frequency bands separated from one another due to multi-resolution separation. While sequential noise removal may be executed either during the analysis phase or during the synthesis phase, the sequential noise removal is executed during the synthesis phase in the embodiment.

In addition, the noise removal is conceived as a two-phase process made up with two separate phases, i.e., a virtual noise removal phase and an actual noise removal phase in an attempt to ensure accurate noise component extraction. The specific processing executed in the virtual noise removal phase may be as follows. Virtual noise synthesis is executed (processing (2-4) (3-4) (4-4) (5-4)) for purposes of noise extraction, the synthesized noise component thus executed in correspondence to each hierarchical layer is subtracted from the LL subband plane (processing (1-1) (2-1) (3-1) (4-1) (5-1)), thereby setting the LL plane in a state in which the noise component can be extracted with ease, and then the noise removal filter processing described above is executed.

Namely, the virtual noise synthesis may be expressed as below.

$$N(\vec{x}) = \sum_{\substack{i=LL,LH,HL,HH \\ j=1,2,\ldots,5}} Wavelet^{-1}\{n_{ij}(\vec{x})\} \qquad \text{[Expression 9]}$$

However, the noise component for the LL band in a higher hierarchical layer, having been generated by synthesizing the lower-layer noise is combined with the redundant noise component, which is extracted from the same subband plane through the "noise extraction processing", through addition executed on the same LL subband plane. The process of this addition is indicated by "+" in FIGS. 4A and 4B.

(Additional Explanation)

While FIGS. 4A and 4B clearly indicates the processing details, the processing in FIGS. 4A and 4B is equivalent to repeatedly executing a processing sequence whereby arithmetic processing expressed as $$N_M(\vec{x}) = \sum_{\substack{i=LL,LH,HL,HH \\ j=5,4,\ldots,M+1}} Wavelet^{-1}\{n_{ij}(\vec{x})\} \qquad \text{[Expression 10]}$$

$$V_{LL,j}'(\vec{x}) = V_{LL,j}(\vec{x}) - N_j(\vec{x})$$

is followed by the processing explained in 3-1-1 and 3-1-2. When M=5, the noise component synthesis is executed without any noise actually extracted and thus, N5(x, y)=0.

4 Edge Extraction

An edge component is extracted (processing (1-5) (2-5) (3-5) (4-5) (5-5)) as expressed below from each of the subband planes having undergone the virtual noise removal.

$$e_{ij}(\vec{x}) = \nabla^2 V_{ij}'(\vec{x}) \qquad \text{[Expression 11]}$$

The edge detection filter used in this process is a Laplacian filter. While the simplest Laplacian filter assuming a coefficient of 8 at the center and a coefficient of −1 at the periphery, defined in conjunction with a standard 3×3 filter, may be utilized, it is desirable to interlock the filtering range of the Laplacian filter with the filtering range of the noise removal filter so as to extract the residual edge remaining after the virtual noise removal with a high level of accuracy. For instance, in conjunction with a noise removal filter with the smoothing target range set at approximately 9×9, the filtering range of the Laplacian filter, too, should be set to the matching range of approximately 9×9. The Laplacian filter, modeled on a definition expressed as; {(original image)−(Gaussian smoothed image)}, may be expressed as follows. In the following expression, t represents a transposed matrix constituted with the product of one-dimensional separation filters.

$$\nabla^2 = 1 - (Gaussian)_{9\times 9} \qquad \text{[Expression 12]}$$
$$= 1 - {}^t(1\ 8\ 28\ 56\ 70\ 56\ 28\ 8\ 1)/256 \otimes$$
$$\quad (1\ 8\ 28\ 56\ 70\ 56\ 28\ 8\ 1)/256$$

Figures 5A, 5B:
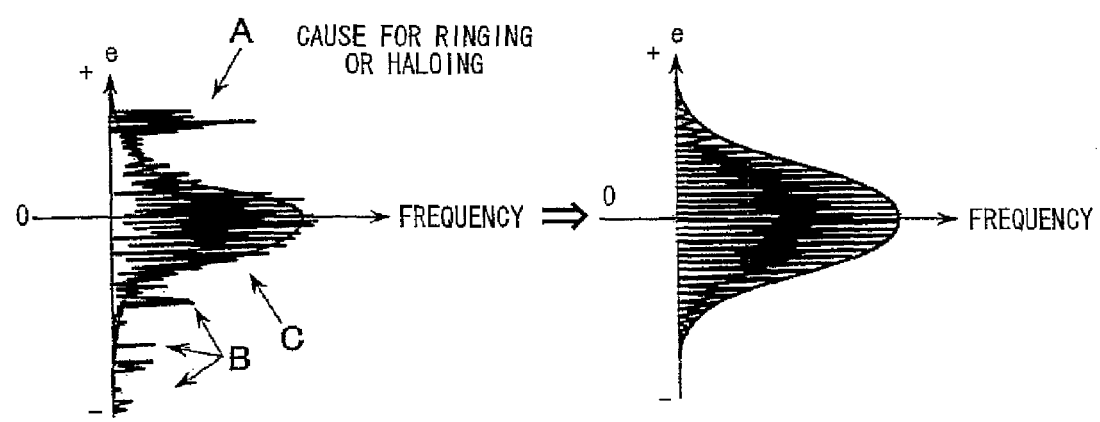
FIGS. 5A and 5B present illustrations provided to facilitate an explanation of how edge is refined in the first embodiment.

The edge component having been extracted through the process described above may assume a local edge intensity frequency distribution such as that shown in FIG. 5A. Even though edge structures that fluctuate to an extent substantially matching the noise fluctuation width have all been lost through the virtual noise removal prior to the edge extraction, a weak edge peaking at a point near the 0 point is extracted. The cause of this slight edge component extraction is most likely the trace of a weak edge structure remaining after the virtual noise removal and an image structure containing a significant level of edge component present in the vicinity, which, together, strongly suggest the presence of such a weak edge component in the particular area.

5 Noise Component Self-refining

It is not at all certain exactly what noise component is extracted through the noise removal filter. Depending upon the image structure condition, a singular component may be present in the extracted noise component. In addition, such a singular component may manifest in any way, depending upon the performance level of the noise removal filter.

Accordingly, bearing in mind that the noise component to be extracted or smoothed through the noise removal filter is random noise, it can be reasonably assumed that an error of a certain type has occurred at the noise removal filter unless the behavior of the extracted noise component demonstrates Gaussian distribution characteristics attributable to the Poisson's distribution along the gradation direction. Namely, the noise extraction results are statistically examined to determine whether or not they indicate behavior likely to be that of noise, so as to exclude any singular edge component contained in the extracted noise by error and to approximate the natural state of random noise (processing (1-6) (2-6) (3-6) (4-6) (5-6)).

$$n'_{ij}(\vec{x}) = n_{ij}(\vec{x}) \cdot \exp\left(-\frac{n_{ij}(\vec{x})^2}{\sigma^2_{nthij}}\right)$$ [Expression 13]

This hypothesis has validity only because the noise extraction is executed in a uniform noise space. Such smart processing cannot be executed in an image processing space where noise is amplified with varying rates in bright areas and dark areas, since the noise in such an image processing space assumes asymmetrical distribution instead of assuming the symmetrical Gaussian distribution at all brightness levels and the distribution of the noise at each brightness level cannot be accurately predicted.

$\sigma_{th\ ij}$ should assume a value approximately 6 times the noise fluctuation index value $\sigma_{th\ ij}$ used in conjunction with the noise removal filter. Namely, any noise indicating a value exceeding 6σ is judged to be a statistical anomaly.

6 Edge Component Self-refining

The edge component extracted through the edge extraction process contains a singular irregular component bound to induce ringing or haloing such as that shown in FIG. 5A, which does not fit into a normal frequency distribution pattern. In the related art, such an irregular component is attenuated by applying a function with characteristics whereby the output edge intensity monotonously increases relative to the input edge intensity. The monotonously increasing function is used based upon the principle that the extracted edge component should be handled with the utmost effectiveness, since no models or directions indicating how the extracted edge component may be judged to be a true edge or a false image have been in place. However, the risk of ringing cannot be eliminated completely as long as a limit to edge intensity values is imposed no matter how high the edge intensity.

In the embodiment, an edge component model that enables natural edge enhancement without inducing ringing is established and any components other than the edge component clearing criterion set forth by the edge component model are completely eliminated. This approach has been chosen because, as has been described in "Basic Concept", an edge component with intensity levels low enough to be buried in the noise component must be accurately estimated and restored in the embodiment. This means that no ringing component or haloing component must be extracted, since such components do not exist in the original image. This requirement must be satisfied in conjunction with all the subband images at the various resolution levels.

Figure 6:
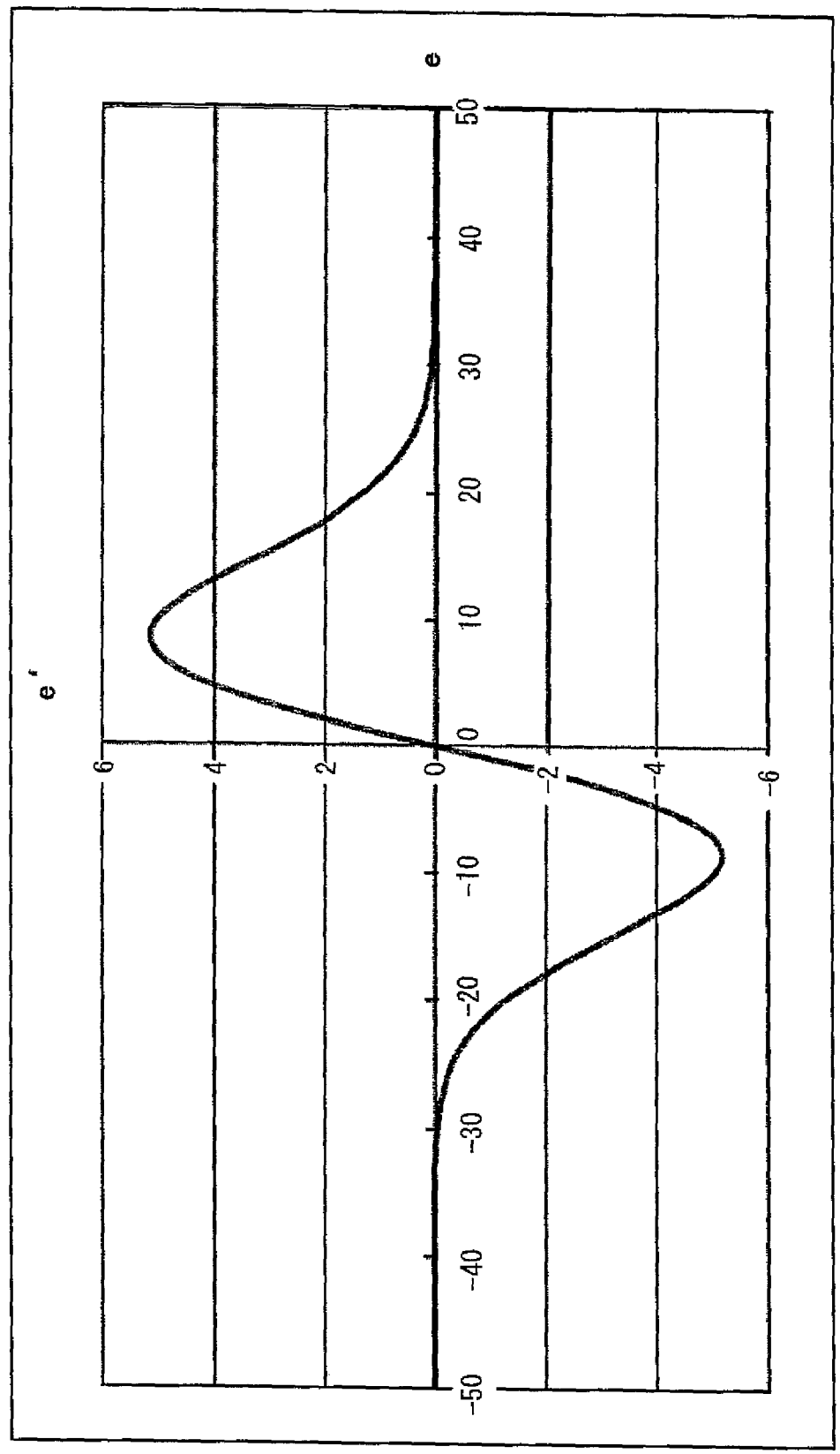
FIG. 6 shows a nonlinear function with intense attenuation characteristics.

Accordingly, the hypothesis surmises that the natural edge component extracted in an ideal uniform color uniform noise space assumes the Gaussian distribution. By applying a nonlinear function with intense attenuation characteristics that will completely eliminate edge component with amplitudes thereof matching or greater than a specific value, such as that shown in FIG. 6, to the extracted edge component, the edge component can be adjusted to approximate the state of the model edge component. The edge component self-refining process may be expressed as below (processing (1-7) (2-7) (3-7) (4-7) (5-7)).

$$e'_{ij}(\vec{x}) = e_{ij}(\vec{x}) \cdot \exp\left(-\frac{e_{ij}(\vec{x})^2}{\sigma^2_{ethij}}\right)$$ [Expression 14]

$\sigma_{e\ th\ ij}$ in the expression above must assume a value exactly equal to the value of the noise fluctuation index value $\sigma_{th\ ij}$ set for the noise removal filter. By setting exactly the same value for $\sigma_{e\ th\ ij}$, the ringing component can be removed, any weak edge component that cannot be distinguished at the noise removal filter and are thus likely to become lost through the noise removal can be restored as an edge component with an intensity level thereof matching the level of the edge component having become lost through the noise removal and the weak edge component thus restored can be extracted, thereby making it possible to recover the weak edge component, which is added through the process of edge enhancement. In addition, even if no noise removal is executed, an outline component assuming a level corresponding to the extent to which the edge contrast is lowered due to the noise overlay or a texture component assuming a level corresponding to the extent by which the texture becomes lost due to the noise overlay can be extracted with precision.

As described above, by processing the edge component and the noise component in the uniform color•uniform noise space based upon the premise that both components ideally assume a Gaussian frequency distribution within a local area, dulling of an outline, which would occur as an edge component present in the noise component is removed through the noise removal, and the occurrence of the halo phenomenon and the howling phenomenon attributable to the presence of ringing component in the edge component undergoing edge enhancement can be prevented effectively. In addition, since the model assuming a Gaussian distribution width matching the noise fluctuation index value is used, the contrast component at a weak edge or an outline assuming an amplitude close to the noise amplitude width can be extracted.

As described above, the edge component self-refining is executed by attenuating the individual sets of edge component data so as to adjust the edge component intensity frequency distribution to approximate a Gaussian distribution with a specific width corresponded to the noise fluctuation index value $\sigma_{tg\ ij}$. In addition, the noise fluctuation index value $\sigma_{th\ ij}$ is set in correspondence to the noise fluctuation width likely to be assumed for each subband at each resolution level, as explained earlier. As a result, the edge component data extracted from each subband (band-limited image) at a given resolution are corrected so that the edge component intensity frequency distribution for the particular subband approximates the Gaussian distribution with a specific width inherent to the particular resolution (band).

From a different perspective, the edge component self-refining process may be considered to be a process through which the level of a false edge component contained in the edge component data is estimated based upon the level of the edge component itself and the true edge component is extracted by excluding the false edge component from the edge component data extracted based upon the estimation results. The edge component having been refined through this process may assume a frequency distribution such as that shown in FIG. 5B.

7 Edge-based Noise Component Refining (Mutual Refining 1)

The levels of purity of the noise component and the edge component, having respectively undergone the processing described in 5 and the processing described in 6, will have been raised with a considerable degree of reliability. However, the noise component having undergone the self-refining process described in 5 still contains edge component data that behave similar to the noise component. Such an edge component can only be excluded by referencing highly reliable edge component data and estimating how much edge component data that can be reliably assumed to be true edge component data are likely to be contained in the noise component. Since the edge component present in the noise component expresses a textural structure or the like, which behaves with an intensity level close to that of noise, the textured area is often surrounded by a large edge structure in a fractal pattern. Accordingly, the quantity of such edge component data mixed in the noise component can be estimated by referencing the edge intensity in the surrounding area.

Namely, the noise component is refined based upon the following hypothesis. Namely, most of the noise component extracted from an area with a high edge component intensity level (absolute value) is very likely to be edge component data whereas most of the noise component extracted from a low edge component intensity level (absolute value) is very likely to be true noise component data. The following mutual refining process is executed (processing (1-8) (2-8) (3-8) (4-8) (5-8)) by assuming a Gaussian distribution in conjunction with this probability model as well. Since the model assumes the same Gaussian distribution, the mutual refining process does not deviate from the ideal noise model but rather achieves an even closer approximation of the ideal noise model.

$$n''_{ij}(\vec{x}) = n'_{ij}(\vec{x}) \cdot \exp\left(-\frac{e'_{ij}(\vec{x})^2}{\sigma^2_{nethij}}\right) \quad \text{[Expression 15]}$$

As for $\sigma_{n\ th\ ij}$ used in the processing described in 5, a value 6 times the noise fluctuation index value $\sigma_{th\ ij}$ should be set for $\sigma_{ne\ th\ ij}$. Namely, the edge component present in the noise component is excluded over an area that is statistically considered to be a perfect edge area.

8 Noise-based Edge Component Refining (Mutual Refining 2)

The edge component having undergone the self-refining process described in 6 still contains noise component data that behave similar to the edge component, in a manner similar to that described in 7. Such a noise component can only be eliminated by referencing highly reliable noise component data and estimating how much noise component data that can be reliably assumed to be true noise component data are likely to be contained in the edge component. The noise component data present in the edge component behave with an intensity level close to that of the extraction target edge component. Such noise component data mixed in the edge component will already have been extracted in the process described in 7 as the noise component indicating a similar intensity level.

Accordingly, the ratio with which the noise component is mixed in the edge component can be estimated based upon the following hypothesis. Namely, most of the edge component extracted from an area with a high noise component intensity level (absolute value) is very likely to be made up with noise component data, whereas most of the edge component extracted from a low noise component intensity level (absolute value) is very likely to be made up with true edge component data. The following mutual refining process is executed (processing (1-9) (2-9) (3-9) (4-9) (5-9)) by assuming a Gaussian distribution in conjunction with this probability model as well. Since the model assumes the same Gaussian distribution, the mutual refining process does not deviate from the ideal edge model but rather achieves an even closer approximation of the ideal noise model.

$$e''_{ij}(\vec{x}) = e'_{ij}(\vec{x}) \cdot \exp\left(-\frac{n''_{ij}(\vec{x})^2}{\sigma^2_{enthij}}\right) \quad \text{[Expression 16]}$$

As for $\sigma_{e\ th\ ij}$ used in the processing described in 6, a value equal to the noise fluctuation index value $\sigma_{th\ ij}$ should be set for $\sigma_{en\ th\ ij}$. By setting the value equal to the noise fluctuation index value, even the noise component corresponding to that extracted as part of the edge component can be eliminated. Consequently, noise does not become amplified through the edge enhancement processing.

In the processing described above, the ratio of the residual noise component contained in the edge component is estimated to be higher when the extracted noise component indicates a greater absolute value and the residual noise component thus estimated is then eliminated from the edge component. In other words, through the processing described above, the ratio at which the true edge component is present in the extracted edge component is estimated based upon a Gaussian distribution function that uses the absolute value of the extracted noise component as an argument and the quantity of the estimated true edge component is determined accordingly. To further rephrase this, the noise fluctuation index value used when extracting the noise component from the original image is compared with the absolute value of the noise component extracted at each pixel position so as to estimate the ratio at which the residual noise component is contained in the edge component.

9 True Noise Component Synthesis

After the entire noise component in each subband has been thoroughly extracted, the noise component signals having been refined to achieve a high level of purity are synthesized by applying optimal weights, each corresponding to a specific frequency band, so as to assure the highest possible noise removal effect while minimizing damage to the actual image.

The individual frequency bands are weighted by using a weight kn i assuming different weighting values for the low-frequency subbands and the high-frequency subbands and a weight kn j assuming different weighting values for various resolution levels. A combined weight kn ij determined by individually selecting values for the weights kn i and kn j is designated as the ultimate synthesized weight to be applied to the noise component in the corresponding subband. This concept may be expressed as;

$$k_{n\ ij} = k_{n\ i} \cdot k_{n\ j}\ (i=LL, LH, HL, HH; j=1, 2, \ldots, 5) \quad \text{[Expression 17]}$$

The weight kn ij (weight (1-14) (2-14) (3-14) (4-14) (5-14)) in FIGS. 4A and 4B includes the low-frequency subband/high-frequency subband weight kn i and the resolution level weight kn j.

9-1 Setting L/H Band Weights

According to International Publication No. 2007-114363 pamphlet and International Publication No. 2007/116543 pamphlet filed by the inventor of the present invention, an synthesized weight applied to the noise component should be selected for an original image constituted with luminance component data so as to minimize the damage to the actual image by ensuring that a greater weight is applied to the high-frequency subband noise and that a smaller weight is applied to the low-frequency subband noise. The publications also disclose that an synthesized weight applied to the noise component should be selected for the actual image constituted with chrominance component data so as to minimize the damage to the original image by ensuring that a greater weight is applied to the low-frequency subband noise and that a smaller weight is applied to the high-frequency subband noise, or a weight close to that applied to the low-frequency subband noise is applied to the high-frequency subband noise. In addition, since the weights set for the low-frequency subband noise and the high-frequency subband noise greatly affect the frequency characteristics of the synthesized noise component and thus greatly affect the visual effect achieved through the noise removal, the user is allowed to set the L/H band weights, particularly the L/H band weights for luminance component data, as a graininess-level setting parameter through a graphic user interface.

However, the user needs to set the level of unsharpness to be achieved through control of the noise removal rate $\lambda$ and the desired noise removal intensity level to be achieved through control of the noise fluctuation index value $\sigma_{th}$ set for the noise removal filter in addition to the parameter for controlling the graininess. A regular user who may not possess advanced technical knowledge may find the process of gaining the three-axis control and obtaining optimal results a laborious, time-consuming and challenging task. Accordingly, any parameter that does not need to be controlled completely independently is controlled in the embodiment through interlocked control in relation to the other parameters by taking into consideration the physical effects that these parameters may have on the final image quality, so as to achieve a noise removal effect providing high image quality with ease.

Noise removal executed by using low-frequency subbands of luminance component data is problematic in that it tends to result in an expressionless flat image, devoid of gradation detail. Noise removal executed by using high-frequency subbands of the luminance component data, on the other hand, from which a cleanly textured image tends to result, is less problematic. This means that the damage to the image expressed with luminance component data can be minimized by applying no weight at all to the low-frequency subband noise. However, under such circumstances, since no low-frequency subband noise is used, noise extraction is bound to be incomplete. While the damage to the image constituted with the chrominance component data can be minimized by lowering the weight applied to the high-frequency subband noise to a certain extent, the reduction in the weight applied to the high-frequency subband noise tends to allow projecting chromatic noise to remain.

The optimal solution reached by weighting all these factors is to give the top priority to prevention of any damage to the image when the noise removal rate is low, even if the noise extraction may be somewhat incomplete and to give the top priority to ensuring that the noise is extracted completely when the noise removal rate is high, even though the resulting image may be somewhat flattened and thus its quality somewhat compromised. In the embodiment, an overall noise removal rate $\lambda$ joint is used to enable interlocked batch control of the various parameters and the synthesized weights to be applied to the noise component data in the L/H bands are controlled as described below (processing (1-16) (2-16) (3-16) (4-16) (5-16)). While $\lambda$ joint is normally set so that $0 \leq \lambda$ joint $\leq 1$, the upper limit, e.g., 8, which is not subject to any specific restrictions, is assumed in the embodiment so that $0 \leq \lambda$ joint $\leq 8$ in order to accommodate the subsequent functionalization of the noise removal rate and the edge enhancement rate.

A specific value for $\lambda$ joint may be selected in a setting screen with a slide bar, brought up on display at the monitor (not shown) of the personal computer 1 (processing (0-5)). The user is able to set a specific value for $\lambda$ joint by moving the cursor in the slide bar in the setting screen to a desired position via a keyboard (not shown) or a mouse (not shown). In this manner, the user is able to set the $\lambda$ joint parameter with ease. It is to be noted that if the processing is executed in a camera, the camera manufacturer may determine and set values in advance in correspondence to varying noise removal intensity levels, e.g., "low", "medium" and "high", any one of which can be selected by the user of the camera.

Weights set for luminance component data $$k_{nLL} = \lambda_{joint}$$

$$k_{nLH} = 1$$

$$k_{nHL} = 1$$

$$k_{nHH} = 1 \quad \text{[Expression 18]}$$

Weights set for chrominance component data $$k_{nLL} = 1 \quad \text{[Expression 19]}$$
$$k_{nLH} = \frac{3 + \lambda_{joint}}{4}$$
$$k_{nLH} = \frac{3 + \lambda_{joint}}{4}$$
$$k_{nHH} = \frac{1 + \lambda_{joint}}{2}$$

It is to be noted that the weights must be set by ensuring that $0 \leq k_{ni} \leq 1$ (i=LL, LH, HL, HH).

The expressions above simply represent an example, and the weights may be set through another method. While LL is handled as a low-frequency subband and LH, HL and HH are handled as high-frequency subbands under normal circumstances, LH and HL images also manifest some low-frequency subband characteristics and accordingly, the weights applied to the noise in the LH and HL bands of the luminance component data, too, may be slightly lowered within a range around 1 by interlocking with the overall noise removal rate $\lambda$ joint.

9-2 Setting Weights for Different Resolution Levels

A noise component attributable to shot noise is normally regarded as white noise assuming a uniform distribution from the low-frequency range through the high-frequency range. Accordingly, the synthesized noise weights to be applied to the noise at various resolution levels are invariably set to 1, as expressed below.

$$k_{nj} = 1 \ (j=1,2,\ldots,5) \quad \text{[Expression 20]}$$

9-3 Synthesis Processing for Synthesizing True Noise Components

The noise components having been optimally weighted in correspondence to the various frequency bands so as to achieve the desirable noise removal effect while minimizing the problems of the noise removal, as described above, are synthesized as expressed below (processing (1-10) (2-10) (3-10) (4-10) (5-10)).

$$N_w(\vec{x}) = \sum_{\substack{i=LL,LH,HL,HH \\ j=1,2,\ldots,5}} Wavelet^{-1}\{k_{nij} \cdot n''_{ij}(\vec{x})\} \quad \text{[Expression 21]}$$

It is to be noted that as in the virtual noise synthesis described in 3, the two noise components, i.e., the noise component in the LL band obtained by synthesizing the noise components in the lower layer and the noise component already present in the LL band, having been extracted through the noise extraction for the LL band, are added together during the synthesis processing (processing (1-11) (2-11) (3-11) (4-11) (5-11)). Otherwise, the noise components are synthesized through inverse wavelet transformation processing.

The noise component is extracted as described above by combining the noise component data corresponding to the various frequency bands in conformance to the frequency characteristics of the original images constituted with the luminance plane data and the chrominance plane data. In other words, the frequency projection space optimal for the noise extraction is adjusted in correspondence to the characteristics of each original image. This also means that the frequency projection space is adjusted in correspondence to the noise removal rate.

10 True Edge Component Synthesis

After the weak edge component data buried in noise are extracted from the various subbands and then refined by removing the noise component and ringing component contained therein, the edge component data are synthesized with optimal weights applied in correspondence to the individual frequency bands so as to provide the most natural-looking image possible, fully benefiting from the edge enhancement, in which any contrast lost in the actual image due to noise overlay is restored and the problems attributable to the noise removal are minimized.

As do the weights applied to the noise component data, the individual frequency bands are weighted by using a weight ke i assuming different weighting values for the low-frequency subbands and the high-frequency subbands and a weight ke j assuming different weighting values for various resolution levels. A combined weight ke ij determined by individually selecting values for the weights ke i and ke j is designated as the ultimate synthesized weight to be applied to the noise component in the corresponding subband. This concept may be expressed as;

$$k_{e\,ij} = k_{e\,i} \cdot k_{e\,j} \quad (i=LL,LH,HL,HH; j=1,2,\ldots,5) \quad \text{[Expression 22]}$$

The weight ke ij (weight (1-15) (2-15) (3-15) (4-15) (5-15)) in FIGS. 4A and 4B includes the low-frequency subband/high-frequency subband weight ke i and the resolution level weight ke j.

10-1 Setting L/H Band Weights
10-1 Setting L/H Band Weights

Neither of the International Publications No. 2007/114363 and No. 2007/116543 pamphlets, filed by the inventor of the present invention, mentions a specific manner through which the weights applied to the data in different frequency bands may be adjusted. However, based upon the analysis of the quantized subjective perception and the physical effects provided at the beginning of the description of the embodiment, the optimal adjustment of the weights applied in correspondence to the individual frequency bands, which will give the most natural appearance to the image and achieve desirable enhancement effects may be devised as discussed below.

First, restoration of an image having been rendered unsharp by noise overlay occurring as the sensitivity of a high-sensitivity photographic image is raised and the noise fluctuation amplitude becomes heightened without executing noise removal, is considered. Prior to the edge enhancement, the original image is in a state such that it requires gradation contrast, having become a whitish blur due to the amplitude width of the luminance component noise, to be restored, textural details buried in noise to be restored, saturation (vibrancy) of color having become faded due the overlay of color noise in the chrominance component data, to be restored and blurring due to color bleeding at color boundaries, caused by superimposed color noise, to be repaired. In other words, the image requires all the advantages of the edge enhancement executed by decomposing the original image into low-frequency subbands and high-frequency subbands corresponding to two types of frequency bands allowing for redundancy in multi-resolution spaces and using edge component data extracted from the individual subbands.

However, it has been learned through experiment that as the edge enhancement rate is raised to a certain level, some of the redundant components induce a serious problem in the image. Namely, if the edge enhancement rate is raised to the maximum level of 100%, the contrast enhancement effect attributable to the low-frequency side synthesized edge component becomes excessive and halos manifest as white lifted image areas at the primary image boundaries in the luminance plane data, whereas the high-frequency side synthesized edge component induces excessive sharpening at color boundaries to result in similar coloration at the primary image boundary areas in the chrominance plane data. The low-frequency band in the luminance plane data and the high-frequency band in the chrominance plane data are extremely sensitive frequency bands in the respective planes, which require careful handling to ensure that the images are not irreparably damaged.

However, the image restoration executed by using the synthesized edge components in the other conjugate frequency bands do not produce particularly unnatural-looking images even if the edge enhancement rate is raised. Namely, the image expressed with luminance component data can be restored to take on a natural appearance through the textural detail recovery effect achieved by using the high-frequency side synthesized edge component, whereas the image expressed with chrominance component data can be restored to demonstrate a color saturation enhancement effect achieved by using the low-frequency side synthesized edge component even if the edge enhancement rate is linearly increased. It must be ensured that the level of the edge component data in the individual subband planes at various resolution levels never exceeds the level of the initial noise component data in the corresponding subband planes, in order to obtain such natural edge enhancement effects. Unless the edge component data are superimposed within the range in which the levels of the edge component data are small enough to be buried in the noise, the edge component data are bound to be visually recognized as a ringing phenomenon, a howling phenomenon or a halo phenomenon. Since the edge component is enhanced through multi-resolution representation, such undesirable phenomena are bound to seriously affect the quality of the image. Accordingly, the weights to be applied to the edge component data in the low-frequency bands and the high-frequency bands must be adjusted with the utmost care.

Exactly the same principle applies to image restoration executed in conjunction with noise removal. There is another factor that needs to be taken into consideration when executing image restoration coupled with noise removal. Namely, in order to achieve edge enhancement effects that provide a natural-looking image, the amplitudes of the edge component data must all be small enough so that the edge component data are buried in noise. However, as noise removal is executed, the noise fluctuation range is reduced and accordingly, the visually allowable range for the component that may affect the image to render an unnatural appearance through the edge enhancement needs to be narrower than that set when the image restoration is executed without noise removal. Thus, each sensitive frequency band that adversely affects the image as the edge enhancement rate is raised must be handled through a function that decreases monotonously relative to the edge enhancement rate but also must be handled through a function that decreases monotonously relative to the noise removal rate.

By executing the following control based upon these findings, images with the most natural appearance, fully benefiting from the edge enhancement, can be restored. Namely, it is necessary to give priority to both the contrast enhancement and the textural detail recovery for the luminance component data and priority to both the colorful impression recovery and the sharpening of the contrast at color boundaries for the chrominance component data when the edge enhancement rate is low. As the edge enhancement rate becomes higher, the contrast enhancement only needs to be achieved to a reasonable extent and the textural detail recovery becomes the primary focus for the luminance component data, whereas the contrast at the color boundaries only needs to be sharpened to a reasonable extent and the colorful impression—color saturation recovery should become the primary focus for the chrominance component data. Namely, edge enhancement rate-dependent control, whereby the coefficient to be applied to the edge data in a specific frequency band is lowered as the edge enhancement rate increases, is adopted.

In addition, as the noise removal rate increases and the noise component data, which allow edge component data to be buried therein in a visually natural manner decrease, the weight applied to the data in the frequency band, the weighting of which needs to be lowered, must be decreased to the extent of complete dissipation, in correspondence to the quantity of the lost noise component. In other words, a concept of noise removal rate-dependent control is adopted in the process of calculating the coefficient to be applied to the edge data.

Based upon the relationships outlined above, the synthesized weights to be applied to the edge component data in the L/H bands are controlled as expressed below. In the embodiment, an overall edge enhancement rate (joint is used. While (joint is normally set so that $0 \leq \zeta joint \leq 1$, an upper limit, e.g., 8, which is not subject to any specific restrictions, is assumed in the embodiment so that $0 \leq \zeta joint \leq 8$ in order to accommodate the subsequent functionalization of the edge enhancement rate. This process corresponds to the processing (1-17) (2-17) (3-17) (4-17) (5-17) in FIGS. 4A and 4B.

A specific value for $\zeta$ joint may be selected in a setting screen with a slide bar, brought up on display at the monitor (not shown) of the personal computer 1 (processing (0-6)). The user is able to set a specific value for $\zeta$ joint by moving the cursor in the slide bar in the setting screen to a desired position via a keyboard (not shown) or a mouse (not shown). In this manner, the user is able to set the $\zeta$ joint parameter with ease. It is to be noted that if the processing is executed in a camera, the camera manufacturer may determine and set values in advance in correspondence to varying edge enhancement intensity level settings, e.g., "low", "medium" and "high", for the edge enhancement to be executed in a new space given by a multi-resolution processing, any one of which can be selected by the user of the camera.

Weights set for luminance component data $$k_{eLL} = 1 - \frac{\text{MIN}(\zeta_{joint}, 1)}{2} - \frac{\text{MIN}(\lambda_{joint}, 1)}{2}$$ [Expression 23]

$$k_{eLH} = 1$$

$$k_{eHL} = 1$$

$$k_{eHH} = 1$$

Weights set for chrominance component data $$k_{eLL} = 1$$ [Expression 24]

$$k_{eLH} = 1 - \frac{\text{MIN}(\zeta_{joint}, 1)}{4} - \frac{\text{MIN}(\lambda_{joint}, 1)}{4}$$

$$k_{eLH} = 1 - \frac{\text{MIN}(\zeta_{joint}, 1)}{4} - \frac{\text{MIN}(\lambda_{joint}, 1)}{4}$$

$$k_{eHH} = 1 - \frac{\text{MIN}(\zeta_{joint}, 1)}{2} - \frac{\text{MIN}(\lambda_{joint}, 1)}{2}$$

It is to be noted that MIN ($\zeta$ joint, 1) indicates that either the $\zeta$ joint or 1, whichever is smaller, is taken.

It is to be noted that the weights must be set by ensuring that $0 \leq k_{ei} \leq 1$ (i=LL, LH, HL, HH). The expressions above simply represent an example, and the weights may be set through another method. While LL is handled as a low-frequency subband and LH, HL and HH are handled as high-frequency subbands under normal circumstances, LH and HL images also manifest some low-frequency subband characteristics and accordingly, the weights applied to the edge component in the LH and HL bands of the luminance component data, too, may be slightly lowered within a range around 1 by interlocking with the overall edge enhancement rate $\zeta$ joint.

Next, further adjustment of the weights to be applied to the edge component data in correspondence to the different frequency bands executed in order to achieve desirable edge enhancement effects through multi-resolution representation so as to provide a natural-looking image with regard to the data in the range in which the overall edge enhancement rate $\zeta$ joint takes on values between 1 and approximately 8, is examined. While a completely fine image can be obtained with weights applied as expressed above within the $\zeta$ joint range of 0~1, the edge component data start to become enhanced beyond the normally accepted noise fluctuation range once the edge enhancement rate exceeds 100%. Namely, since the edge component intensity is represented by the product of $\zeta$ joint*$ke_{ij}$, the sensitive frequency band in which image structures tend to be destroyed readily, controlled through the decelerated monotonously increasing function over the t joint range of 0~1, resumes undecelerated linear increasing characteristics over the $\zeta$ joint range of 1~8. For instance, the control for luminance LL component data, executed over the $\zeta$ joint range of 0~1, may be expressed as;

$$\zeta joint*(1-\zeta joint/2)=-(1/2)(\zeta joint-1)^2+(1/2)$$

It is to be noted that for purposes of simplification, the expression above does not include the control achieved through $\lambda$ joint. The expression above represents a cresting, decelerated monotonously increasing quadratic function effective over the ζ joint range of 0~1, which assumes the maximal value when ζ joint=1. When ζ joint≧1, however, the "ζ joint/2" expression is written as, that turns the function into a proportional function. It is to be noted that the term "sensitive frequency band" refers to a band with ζ joint dependency, e.g., the LL component data in the luminance component data and the LH component data, the HL component data and the HH component data in the chrominance component data.

In order to prevent such excessive emphasis of the edge component data, a mechanism whereby the contribution rate of the sensitive frequency band with the edge enhancement rate applied thereto is not allowed to exceed the value assumed when the edge enhancement rate is 100%, i.e., the highest allowable edge enhancement rate at which the edge enhancement is achieved within the noise fluctuation range is incorporated. However, the frequency bands in which natural edge enhancement is achieved even beyond the noise fluctuation range are controlled by allowing the ζ joint*$ke_{ij}$ product value to increase monotonously even when the edge enhancement rate exceeds 100%, so as to provide the maximum edge enhancement effects. The optimal expressions are provided below. It is to be noted that the allowable edge enhancement range must be restricted if noise removal is also executed in conjunction with the image restoration in this case.

Weights set for luminance component data

[Expression 25]

$$k_{eLL} = \left\{1 - \frac{\text{MIN}(\zeta_{joint}, 1)}{2} - \frac{\text{MIN}(\lambda_{joint}, 1)}{2}\right\} \times \text{MIN}\left(\frac{1}{\zeta_{joint} + \lambda_{joint}}, 1\right)$$

$$k_{eLH} = 1 \times \text{MIN}\left(\sqrt{\frac{1}{\zeta_{joint} + \lambda_{joint}}}, 1\right)$$

$$k_{eHL} = 1 \times \text{MIN}\left(\sqrt{\frac{1}{\zeta_{joint} + \lambda_{joint}}}, 1\right)$$

$$k_{eHH} = 1 \times \text{MIN}\left(\sqrt[4]{\frac{1}{\zeta_{joint} + \lambda_{joint}}}, 1\right)$$

Weights set for chrominance component data

[Expression 26]

$$k_{eLL} = 1 \times \text{MIN}\left(\frac{1}{\zeta_{joint} + \lambda_{joint}}, 1\right)$$

$$k_{eLH} = \left\{1 - \frac{\text{MIN}(\zeta_{joint}, 1)}{4} - \frac{\text{MIN}(\lambda_{joint}, 1)}{4}\right\} \times \text{MIN}\left(\frac{1}{\zeta_{joint} + \lambda_{joint}}, 1\right)$$

$$k_{eLH} = \left\{1 - \frac{\text{MIN}(\zeta_{joint}, 1)}{4} - \frac{\text{MIN}(\lambda_{joint}, 1)}{4}\right\} \times \text{MIN}\left(\frac{1}{\zeta_{joint} + \lambda_{joint}}, 1\right)$$

$$k_{eHH} = \left\{1 - \frac{\text{MIN}(\zeta_{joint}, 1)}{2} - \frac{\text{MIN}(\lambda_{joint}, 1)}{2}\right\} \times \text{MIN}\left(\frac{1}{\zeta_{joint} + \lambda_{joint}}, 1\right)$$

The LL component data in the luminance component data are defined as a low-frequency-side subband that manifests a marked contrast emphasizing effect (the sensitive frequency band) and accordingly, the LL component data are completely controlled so as not to deviate beyond the allowable range limit, in order to disallow any occurrence of haloing (locked at the value corresponding to the edge enhancement rate of 1). The LH component data are normally defined as high-frequency-side main band, but the LH component data partially assume the characteristics of a low-frequency side subband as well. Accordingly, the LH component data are suppressed to an extent that disallows a linear increase relative to the edge enhancement rate. As a result, any formation of vertical and horizontal streaks is prevented when the edge enhancement rate is 800%. In addition, the HH component data defined as a high-frequency-side main band assumes nonlinearly increasing characteristics whereby their level increases nonlinearly relative to the edge enhancement rate by factoring in the extent to which the LH component is suppressed so as to allow a smooth link with the LH component suppressing mechanism and recover natural looking textural details.

The LL component data defined as the main band, the HH component data defined as the subband and the LH component data and the HL component data in between in the chrominance component data are all controlled so as not to emphasize the edge data beyond the edge enhancement rate of 100%, i.e., they are not used for any further enhancement once the maximum color saturation enhancement and the maximum color contrast recovery are achieved, since any further edge enhancement on the chrominance data beyond the range corresponding to the noise fluctuation range will trigger an alteration in the hue of the image, which, in turn, could lead to destruction of the image (sensitive frequency bands).

In the optimal method described above, having been conceived through experiment, the optimal frequency projection space changes in correspondence to the noise removal rate set for the noise removal processing and the optimal frequency projection space changes in correspondence to the edge enhancement rate set for the edge enhancement processing in manners different from each other. This simply means that the data in either a high-frequency subband or a low-frequency subband, whichever plays the role of a subband, are made to monotonously increase or monotonously decrease relative to the noise removal rate or the edge enhancement rate. Both in the noise removal processing and the edge enhancement processing, the data in the main band, e.g., the luminance component high-frequency subband and the chrominance component low-frequency subband, must be utilized to the maximum extent at all times. The data on the subband side (the data in the sensitive frequency bands mentioned earlier) on the other hand, must be utilized under optimal control so as to prevent image destruction.

It is to be noted that while the weight ke ij (weight (1-15) (2-15) (3-15) (4-15) (5-15)) in FIGS. 4A and 4B appears to be dependent only upon the edge enhancement rate ζ joint, it is actually dependent upon the noise removal rate λ joint as well, as described earlier. Accordingly, there should also be arrows pointing to the weight from the noise removal rate ζ joint 10-2 Setting Weights in Correspondence to Different Resolution Levels Instead of setting all the synthesized edge weights corresponding to individual resolution levels invariably to 1, as in the case of the noise component data, the weights to be applied in correspondence to the various resolution levels are selected by taking into consideration their effect on human visual perception.

Images resulting from noise removal executed by uniformly handling the noise as white noise at various resolution levels show the adverse effect of the noise removal, attributable to the reduced contrast at edges, in varying extents. Medium frequency data or medium frequency component data slightly toward the high-frequency range, in particular, are visually perceived to be most adversely affected. The absence of the outlines renders an acute sense of loss of information in the initial image in the eye of the viewer. Accordingly, the noise removal processing must be executed by making the utmost effort to protect edge structures in the medium through slightly higher frequency range.

If the edge enhancement rate was uniformly set to 1 in correspondence to the individual resolution levels, the edge component picked up on the low resolution side would certainly affect a wide range of data, increasing the risk of the howling and the haloing phenomena. In addition, the Nyquist frequency edge component at the highest resolution level assumes certain characteristics that may readily make the edge component mistaken for noise component data. Accordingly, it is advisable to use these data with the weights applied thereto lowered relative to those applied to medium-frequency band data. For this reason, the frequency band requiring the maximum extent of protection during the noise removal processing and the frequency band that allows for the maximum extent of restoration through the edge enhancement processing, i.e., the frequency band requiring the maximum extent of restoration, exactly match each other.

Accordingly, from the viewpoint of the recovery of the visually perceived characteristics, it is desirable to set the weights for the synthesized edge component data in correspondence to the individual resolution levels by taking into consideration these factors. Poisson's distribution, assuming characteristics whereby the intensity is somewhat low on the high-frequency side of the highest resolution level, assuming the maximum intensity at a resolution level slightly toward the high-frequency side relative to the medium-frequency band and manifesting a rapid decrease of intensity on the low-frequency side at the lowest resolution level, may conveniently suit such an adjustment. In the example described below, an average value $\mu$ of Poisson's distribution gives the resolution level of 2.0, slightly toward the low-frequency side relative to the middle, in conjunction with a five-stage multi-resolution transformation. Under normal circumstances, the average value $\mu$ of the Poisson's distribution is set at the 40% position among all the resolution levels. Namely, the weights may be set as expressed below.

$$k_{ej} = P(j, \mu = 5 \times 0.4) \qquad \text{[Expression 27]}$$

$$P(j, \mu) = \frac{\mu^j}{j!} \exp(-\mu)$$

The specific numerical values that may be set are as follows. It is to be noted that although not clearly written in the expression above, standardization processing is executed at the maximum distribution intensity value having been set.

$k_{e\,0}=P(0,\mu=2.0)=0.500$ $k_{e\,1}=P(1,\mu=2.0)=1.000$ $k_{e\,2}=P(2,\mu=2.0)=1.000$ $k_{e\,3}=P(3,\mu=2.0)=0.667$ $k_{e\,4}=P(4,\mu=2.0)=0.33$ $k_{e\,5}=P(5,\mu=2.0)=0.133$ [Expression 28]

The peak intensity occurs between stage 1 and stage 2, slightly toward the high-frequency resolution side relative to the 2.0 resolution level corresponding to the average value.

Next, the optimal method for adjusting the weights to be applied in correspondence to the varying resolution levels when the edge enhancement rate exceeds 100% is examined. Once the edge enhancement rate exceeds 100%, the risk of the occurrence of howling or haloing attributable to the edge component picked up on the low resolution side increases. This tendency is observed with regard to medium resolution level edge component data as well. In other words, the edge component data picked on the high resolution side alone can be enhanced to provide the most natural-looking image without destroying the image. This means that image destruction cannot be avoided unless the edge enhancement effects achieved through multi-resolution representation, i.e., contrast enhancement, textural detail recovery, color saturation enhancement and color contrast recovery, are gradually and optimally linked to the edge enhancement processing executed in the real space on the luminance plane data alone.

The Poisson's distribution assumes extremely convenient characteristics for accommodating such control and the purpose of the control can be fulfilled simply by adjusting the Poisson's distribution average value closer to that corresponding to the resolution level of 1 or 0 as the edge enhancement rate increases. The following expression describes specifically how this control is executed. Namely, the Poisson's distribution average value is initially adjusted to the normal setting and once the edge enhancement rate exceeds 100%, the average value is adjusted closer to 1. Assuming that data at M resolution levels are currently being handled, the average value $\mu$ can be determined as expressed below. It is to be noted that the following expression is also applicable when the edge enhancement rate is equal to or less than 100%.

$$\mu_{normal} = M \times 0.4 \qquad \text{[Expression 29]}$$

$$\mu = \mu_{normal} MIN\left(\frac{1}{\zeta_{joint} + \lambda_{joint}}, 1\right)$$

Under extreme conditions, in which the edge enhancement rate is very high, well beyond 100%, the weight distribution among the various resolution levels shifts toward the high resolution side, as indicated below. It is assumed that M=5 stages. In this situation, too, the weight distribution is adjusted by taking into consideration the fact that the edge component appears greater relative to the noise fluctuation width when the noise removal rate is high, as well as when the edge enhancement rate is high.

$k_{e\,0}=P(0,\mu=1.0)=1.000$ $k_{e\,1}=P(1,\mu=1.0)=1.000$ $k_{e\,2}=P(2,\mu=1.0)=0.500$ $k_{e\,3}=P(3,\mu=1.0)=0.167$ $k_{e\,4}=P(4,\mu=1.0)=0.042$ $k_{e\,5}=P(5,\mu=1.0)=0.008$ [Expression 30]

As described above, when the edge enhancement rate exceeds 100%, the weight distribution among the various resolution levels, i.e., the gravitational center among weights applied in correspondence to the various resolution levels, is adjusted toward the high-resolution side in correspondence to the level of the edge enhancement rate. Through these measures, it is ensured that natural edge enhancement is achieved without destruction of the image structure even when the edge enhancement rate is at 800%.

Now, the difference between the standard edge enhancement processing executed in the real space by using an unsharp mask and the multi-resolution edge enhancement processing described in reference to the embodiment is clarified. In the edge enhancement achieved through the regular unsharp mask processing, a high-frequency component made up with the difference between the original image and an image smoothed with, for instance, a 7×7-pixel smoothing filter, is extracted at the resolution level LL0 in the real space, defined as the low-frequency subband, the howling component and the ringing component are primarily extracted after eliminating the coring component as a noise component and these data are first subjected to the process of scaling enhancement before being incorporated into the original image or the smoothed image. Namely, edge component data indicating a level low enough to be buried in noise are eliminated from the extracted edge component through base clip processing and this only the high-intensity edge component is ultimately extracted by allowing for a certain extent of ringing and howling.

The edge enhancement through multi-resolution representation significantly differs from the edge enhancement through regular unsharp mask processing with respect to how it functions and what it achieves, in that a coring component, the intensity of which substantially matches the extent of noise fluctuation, is extracted, the howling and ringing components are eliminated and the main focus of the processing executed on the luminance plane data is directed on the high-frequency subbands as the edge enhancement rate increases. In other words, the edge enhancement through multi-resolution representation is executed with a prerequisite that only edge component data the level of which is low enough to be buried in noise are extracted, and through the multi-resolution edge enhancement, the edge component with an intensity level close to that of the noise is successfully separated and extracted from the noise. As a result, a great improvement in the image quality can be achieved without amplifying the noise by handling the data through multi-resolution representation. In the multi-resolution edge enhancement, edge component data manifesting a slight fluctuation, to an extent small enough to be buried in noise, plays a vital role.

Accordingly, since the contrast, texture, color saturation and color contrast recovery functions achieved through the multi-resolution edge enhancement and the unsharp mask edge enhancement functions are independent of each other, the multi-resolution edge enhancement and the unsharp mask edge enhancement may be executed simultaneously in parallel without inducing any problems whatsoever.

10-3 Synthesis Processing for Synthesizing True Edge Components

The edge component data optimally weighted in correspondence to the various high-frequency bands so as to achieve edge enhancement effects providing an image with a natural appearance, as described above, are then synthesized as expressed below (processing (1-12) (2-12) (3-12) (4-12) (5-12)).

$$E_w(\vec{x}) = \sum_{\substack{i=LL,LH,HL,HH \\ j=1,2,\ldots,5}} Wavelet^{-1}\{k_{eij} \cdot e_{ij}(\vec{x})\} \quad \text{[Expression 31]}$$

It is to be noted that as in the true noise synthesis described in 9, the two edge components, i.e., the edge component in the LL band obtained by synthesizing the edge components in the lower layer and the edge component already present in the LL band, having been extracted through the edge extraction for the LL band, are added together during the synthesis processing (processing (1-13) (2-13) (3-13) (4-13) (5-13)). Otherwise, the edge components are synthesized through inverse wavelet transformation processing.

The edge component is extracted as described above by combining the edge component data corresponding to the various frequency bands in conformance to the frequency characteristics of the original images constituted with the luminance plane data and the chrominance plane data. In other words, the frequency projection space optimal for the contrast restoration through edge enhancement is adjusted in correspondence to the characteristics of each original image. This also means that the frequency projection space is adjusted in correspondence to the edge enhancement rate and the noise removal rate.

11 Synthesized Noise Component Self-refining

Next, based upon the concept described in 5, the synthesized noise component is subjected to a process of self-refining as expressed below (processing (0-1)). Namely, another verification is executed based upon the hypothesis so as to confirm that the ultimate synthesized noise component assuming a resolution level matching the true resolution level is distributed with the ideal noise distribution pattern, i.e., the Gaussian distribution, in the uniform color•uniform noise space.

$$N'_w(\vec{x}) = N_w(\vec{x}) \cdot \exp\left(-\frac{N_w(\vec{x})^2}{\sigma_{Nth}^2}\right) \quad \text{[Expression 32]}$$

In addition to the double verification described above, another important purpose is fulfilled through the noise self-refining process that the synthesized noise component undergoes. Namely, since the noise component data are extracted in frequency projection spaces that include two types of frequency subbands, i.e., the low-frequency subbands and the high-frequency subbands, allowing for redundancy instead of the frequency projection spaces constituting the complete system, the synthesized noise component with the frequency redundancy is not guaranteed to assume a Gaussian distribution again even though the noise component data having been extracted in the individual subbands assume a Gaussian distribution. Accordingly, it is extremely beneficial to adjust the noise component data so as to approximate a Gaussian distribution pattern yet again based upon the hypothesis for the ideal noise distribution.

Under normal circumstances $\sigma_{Nth}$ should assume a value approximately 6 times the noise fluctuation index value $\sigma_{th}$ used in the real space based upon the concept described in 5. Namely, any noise component data indicating a value exceeding 6 sigma, relative to the noise fluctuation index value, are statistically judged to be non-noise data with 100% certainty, are eliminated.

12 Synthesized Edge Component Self-refining

Next, based upon the concept described in 6, the synthesized edge component is subjected to a process of self-refining as expressed below (processing (0-2)). Namely, another verification is executed based upon the hypothesis so as to confirm that the ultimate synthesized edge component assuming a resolution level matching the real resolution level is distributed with the ideal edge distribution pattern, i.e., the Gaussian distribution, in the uniform color uniform noise space.

$$E'_w(\vec{x}) = E_w(\vec{x}) \cdot \exp\left(-\frac{E_w(\vec{x})^2}{\sigma_{Eth}^2}\right)$$ [Expression 33]

In addition to the double verification described above, another important purpose is fulfilled through the edge self-refining process that the synthesized edge component undergoes, as does the noise self-refining described in 11. Namely, since the edge component data are also extracted in frequency projection spaces that include two types of frequency subbands, the low-frequency subbands and the high-frequency subbands allowing for redundancy instead of the frequency projection spaces constituting the complete system, the synthesized edge component with the frequency redundancy is not guaranteed to assume a Gaussian distribution again even though the edge component data having been extracted in the individual subbands assume a Gaussian distribution. Accordingly, it is extremely beneficial to adjust the edge component data so as to better approximate a Gaussian distribution pattern yet again based upon the hypothesis for the ideal edge distribution.

$\sigma_{Eth}$ in the expression above should assume a value exactly equal to the value of the noise fluctuation index value $\sigma_{th}$ in the real space. By setting exactly the same value for $\sigma_{E\,th}$, the ringing component can be removed, any weak edge component that cannot be distinguished at the noise removal filter and is thus likely to become lost through the noise removal, can be restored as an edge component with an intensity level thereof matching the level of the edge component having become lost through the noise removal and the weak edge component thus restored can be extracted.

13 Synthesized Edge-based Synthesized Noise Component Refining (Mutual Refining 3)

Based upon the concept described in 7, the synthesized noise component is refined yet again through mutual refining processing executed by using the synthesized edge component as expressed below (processing (0-3)). Through this processing, the synthesized edge component having been obtained by factoring in the multi-fold correlations among the plurality of resolution levels is scrutinized again based upon a model whereby the probability of edge component data being mixed in the noise component extracted in an area with a high edge intensity value (absolute value) detected nearby is high, so as to examine the edge conditions in the surrounding area, which may not be detected through the edge component observed at a single resolution level, from a perspective taken in correspondence to another frequency band. Namely, $$N''_w(\vec{x}) = N'_w(\vec{x}) \cdot \exp\left(-\frac{E'_w(\vec{x})^2}{\sigma_{NEth}^2}\right)$$ [Expression 34]

Under normal circumstances $\sigma_{NEth}$ should assume a value approximately 6 times the fluctuation index value $\sigma_{th}$ used in the real space based upon the concept described in 7. Namely, any edge data that tend to be erroneously mixed in the noise component over an area indicating a value exceeding 6 sigma relative to the noise fluctuation index value, which are statistically judged to be edge data with 100% certainty are eliminated. In addition, since a noise/edge mix model assuming the same Gaussian distribution is used, the data undergoing the process of mutual refining do not deviate from the ideal noise model but rather the data are adjusted even closer to the ideal model through the process.

14 Synthesized Noise-based Synthesized Edge Component Refining (Mutual Refining 4)

Based upon the concept described in 8, the synthesized edge component is refined yet again through mutual refining processing executed by using the synthesized noise component as expressed below (processing (0-4)). Through this processing, the synthesized noise component having been obtained by factoring in the multi-fold correlations among the plurality of resolution levels is scrutinized again based upon a model whereby the probability is high that noise component data will be mixed in the edge component extracted in an area with a high noise intensity value (absolute value) detected nearby so as to examine the noise component distribution conditions in the surrounding area, which may not be detected through the noise component observed at a single resolution level, from a perspective taken in correspondence to another frequency band.

$$E''_w(\vec{x}) = E'_w(\vec{x}) \cdot \exp\left(-\frac{N''_w(\vec{x})^2}{\sigma_{ENth}^2}\right)$$ [Expression 35]

Under normal circumstances $\sigma_{EN\,th}$ should assume a value equal to the noise fluctuation index value $\sigma_{th}$ used in the real space based upon the concept described in 8. By setting such a value for $\sigma_{EN\,th}$, any noise component included in the edge component data, which should also be found in the extracted noise component, can be excluded. In addition, since a noise/edge mix model assuming the same Gaussian distribution is used, the data undergoing the process of mutual refining do not deviate from the ideal noise model but rather the data are adjusted even closer to the ideal model through the process.

It is to be noted that the concept of synthesized edge component refining executed by using the synthesized noise can be described by rephrasing the concept in a manner similar to that used in 8.

15 Generation of Virtual Noise-free Luminance Plane

In order to obtain a noise free reference luminance plane, to be described in detail in 16, a temporary virtual noise-free luminance plane is generated by using 100% of the noise component resulting from the true noise synthesis.

$$\tilde{L}(\vec{x}) = \hat{L}(\vec{x}) - N_w(\vec{x})$$ [Expression 36]

However, under certain circumstances, this processing may be skipped and in such a case, the luminance plane L^(x) (the first term in the right side of the expression above) of the original image that has not undergone noise removal should be used.

16 Actual Noise Removal Processing and Actual Edge Enhancement Processing

As has been described in "Basic Concept" at the beginning of the description of the embodiment, there is bound to be some noise component still present in the edge component and some edge component still present in the noise component, having remained in spite of the multifold self-refining and mutual refining having been repeatedly executed for the noise component and the edge component. In order to minimize the adverse effect of their presence on the noise removal processing and the edge enhancement processing and maximize the effects of the noise removal and the edge enhancement, measures devised by predicting the adverse effects and the positive effects in advance may be incorporated into the noise removal rate and the edge enhancement rate.

In the processing described thus far, the noise component data and the edge component data are extracted in a uniform color•uniform noise space and thus, uniform noise removal effects and edge enhancement effects should be obtained over the gradations corresponding to the full range of brightness levels in the uniform color•uniform noise space as a result of the noise removal and the edge enhancement executed at a uniform noise removal rate λ and a uniform edge enhancement rate ζ set for the entire image plane. However, as the data in the work color space are converted to data in the output color space, the noise removal effects and the edge enhancement effects may be substantially reduced over certain areas and the adverse effects of the noise removal and the edge enhancement may become more noticeable in other areas of the image viewed in the output space due to the difference between the gradation characteristics of the two spaces.

The visually perceived positive effects and adverse effects are considered to be adjustable primarily via the differential ratio of the gradation characteristics in the output color space and the gradation characteristics in the work color space. Accordingly, the following contrast ratio function relative to the luminance represented by the differential ratio of the gradation characteristics γ in the output color space and the gradation characteristics Γ in the work color space is defined. Y representing linear gradation characteristics is identical to Y in the XYZ space defined in 1.

Reference Contrast Ratio Function $$\frac{d\gamma}{d\Gamma}(S(\vec{x})) = \frac{\frac{d\gamma(Y)}{dY}}{\frac{d\Gamma(Y)}{dY}}(S(\vec{x})) = \frac{d\gamma}{d\hat{L}}(\hat{L}(\vec{x}))$$ [Expression 37]

Figure 7A:
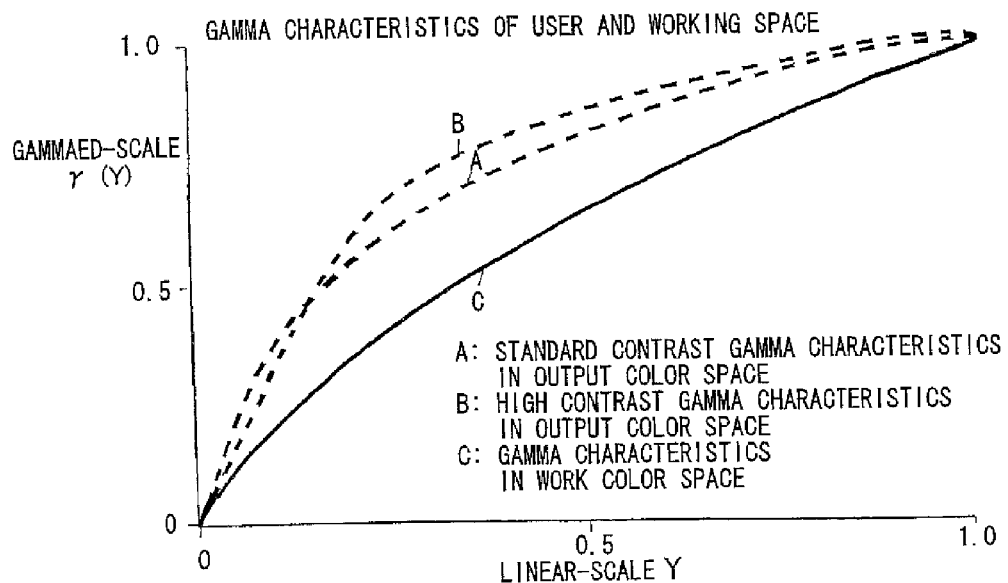

The gamma curve γ(Y) for the output color space in the numerator may be curve A or B in FIG. 7A. The gamma curve Γ(Y) for the work color space in the denominator may be curve C in FIG. 7A and Γ(Y) may be defined the same as the function f(t) in 1. In addition, since the brightness in the luminance plane alone is referenced as an argument of the contrast ratio function, referencing L^(x, y) resulting from the conversion having been described in I is equivalent to referencing the luminance S(x, y) of the original image.

Figure 7B:
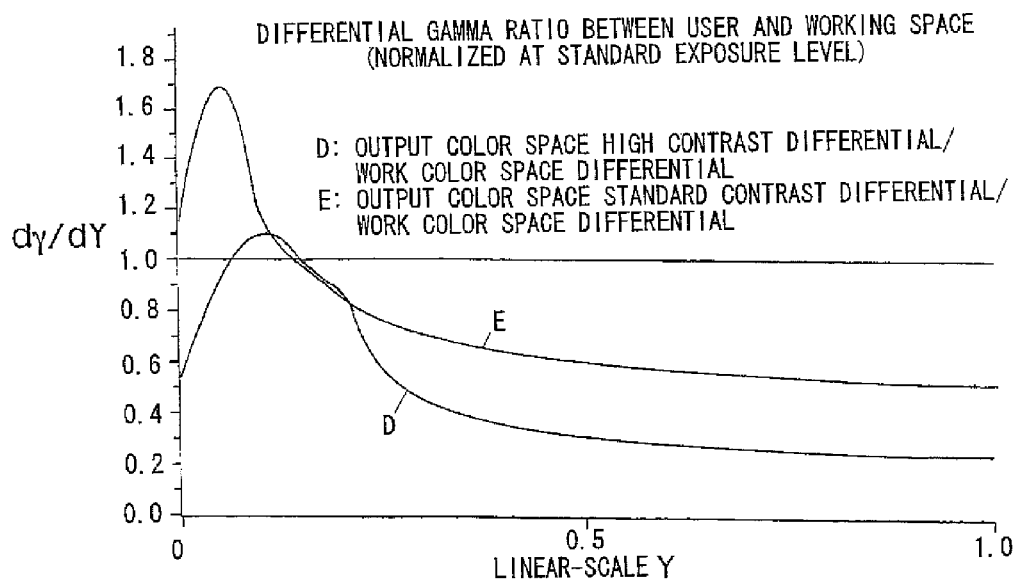
FIG. 7B presents a graph of the differential ratio of the gamma characteristics in the output color space and the gamma characteristics in the work color space in FIG. 7A.

The set of curves in FIG. 7B are obtained by using the second contrast ratio function expression as γ in conjunction with the curves A and B, whereas the straight line in FIG. 7B is obtained by using the second contrast ratio function expression as γ in conjunction with the curve C. Accordingly, the curves representing the first expression and the third expression of the true contrast ratio function can be plotted through scaling through Γ(Y) along the horizontal axis based upon the linear gradation Y. In other words, assuming that Γ(Y) is indicated along the horizontal axis, any dark image area is expanded and any bright area is contracted along the horizontal axis.

16-1 Functionalization Based Upon Contrast Ratio Function for Noise Removal Rate (processing (0-7))

1) Functionalization 1 (Gamma Version)

The primary object of functionalization of the noise removal rate is to achieve uniform noise removal effects in the output color space over the full luminance range while retaining a level of appearance comparable to that achieved through uniform noise removal executed in the work color space. By clearing this object, the appearance of noise amplified over an area where the gradation contrast at a given brightness level is more pronounced in the output color space is minimized and, at the same time, the appearance of unevenness attributable to a noise attenuation effect manifesting over a specific area where the gradation contrast is less pronounced in the output color space is minimized.

It is crucial to select the optimal reference point for increasing/decreasing the noise removal rate in correspondence to the output gamma characteristics. In the case of the luminance component data, it is desirable to set the reference point to the exposure reference point selected so as to achieve the average luminance level (around 128 in the 256 gradation range) in the output color space. This reference point normally corresponds to the brightness level of the gray chart reference subject in the ISO standard, which is referred to as 18% gray in linear gradation. By setting such a reference point, it is ensured that the luminance component data appear to sustain even noise removal effects on average over the entire luminance range. As a result, any reduction in the contrast attributable to noise overlay, which may otherwise occur over a dark area where noise amplification tends to occur as the data undergo gradation conversion to the output color space is prevented and clear noise removal effects are achieved.

For the chrominance component data, which normally require noise removal that is more intensive compared to the luminance component data, it is better not to adjust the noise removal rate as dynamically as for the luminance component. Rather, the extent of noise removal should be reduced over areas where the contrast can be retained without compromising the noise removal effects. In more specific terms, the noise removal rate is standardized at the saturation reference point present in an area over which the output gamma characteristics manifest as knee characteristics. A point at which output gradation characteristics of approximately 180~220 are achieved relative to the 256 gradations should be selected as the saturation reference point. As a result, the chrominance plane noise removal rate over a highlight area is lowered. Since a highlight image area normally corresponds to a high saturation area in the chrominance plane, color loss in the high saturation area is prevented and a superior color mottling noise removal effect assuring a high level of color fidelity is achieved. In addition, in a synergistic action achieved in conjunction with the dark area noise removal effect for the luminance component, any noise overlay or color mottling overlay in dark areas is completely eliminated to create a clearer image than the original image, completely devoid of cloudiness.

The function of the noise removal rate, through which the advantages described above are achieved, is expressed as follows by using the contrast ratio function for the noise removal rate. The luminance component data are normalized by substituting the contrast ratio based upon the exposure reference point explained earlier for the denominator in the corresponding expression. The chrominance component data are standardized by substituting the contrast ratio based upon the saturation reference point explained earlier for the denominator in the corresponding expression.

Luminance Component Data $$\lambda(\vec{x}) = \lambda_{joint} \cdot \left( \frac{\frac{d\gamma}{d\hat{L}}(\tilde{\hat{L}}(\vec{x}))}{\left. \frac{d\gamma}{d\hat{L}} \right|_{\substack{standard \\ arg\gamma(\hat{L})=exposure \\ level}}} \right)$$ [Expression 38]

Chrominance Component Data $$\lambda(\vec{x}) = \lambda_{joint} \cdot \left( \frac{\frac{d\gamma}{d\hat{L}}(\tilde{\hat{L}}(\vec{x}))}{\left. \frac{d\gamma}{d\hat{L}} \right|_{\substack{standard \\ arg\gamma(\hat{L})=saturation \\ level}}} \right)$$ [Expression 39]

when λ (vector x)=Min (λ(vector x), 1.0).

2) Functionalization 2 (Retinex Version)

The noise removal rate may be functionalized from another viewpoint. Namely, while the object of functionalization 1 is to achieve uniform noise removal effects through the entire brightness level range of the image, the noise removal rate may also be functionalized so as to achieve uniform noise removal effects through the brightness level range within an area near a local edge structure. The latter approach is devised based upon the premise that important image elements, which determine the image structures, tend to be concentrated near edges and that as long as uniform noise removal effects are achieved relative to the luminance around the edges, the benefit of the other aspect of the evening-out effect can be provided to the full extent over the local areas although the noise removal effects achieved for the overall image may be uneven.

Namely, by evening out the noise removal effects, another advantage is achieved in that the extent to which an edge structure is destroyed due to the edge component that has not been successfully separated from the noise component can be evened out among different brightness levels so as not to allow the presence of any area particularly badly affected to compromise the overall appearance of the image to result in a visually displeasing, uneven image. In other words, the visual manifestations of such edge structure destruction can be averaged at the minimum level. Accordingly, by taking these measures for minimizing the adverse effects of the noise removal, particularly around the edges, crucial image structure information can be retained in an effective manner.

In this case, too, since the gradation contrast in the work color space is most likely to be higher in a bright image area, the contrast of the edge component present in the area tends to be more intense and problems tend to occur readily in the area in the output color space assuming standard gradation characteristics. In the case of the luminance component data, structure information within a white image area plane tends to be lost readily, whereas in the case of chrominance component data, color information in a highly saturated area tends to be lost readily.

Accordingly, the following functional expression for the contrast ratio function may be adopted in conjunction with the noise removal rate. The optimal edge information that may be referenced is the synthesized edge component obtained by synthesizing the edge component data at multiple resolution levels, which allows the image structures to be scrutinized on all scales, both locally and globally. In addition, it is most desirable to use the synthesized edge component $E_w''(x, y)$ that includes the information in the visually crucial frequency bands from which the noise component and the ringing component have been dependably removed.

Luminance Component Data $$\lambda(\vec{x}) = \lambda_{joint} \cdot \left( \exp\left(-\frac{E_w''(\vec{x})^2}{\sigma_{gEth}^2}\right) \cdot 1 + \left(1 - \exp\left(-\frac{E_w''(\vec{x})^2}{\sigma_{gEth}^2}\right)\right) \frac{\frac{d\gamma}{d\hat{L}}(\tilde{\hat{L}}(\vec{x}))}{\frac{d\gamma}{d\hat{L}}\bigg|_{\text{arg}\gamma(\hat{L})=\text{exposure level}}^{\text{standard}}} \right)$$

[Expression 40]

when $\lambda(\vec{x}) = \text{Min}(\lambda(\vec{x}), 1.0)$

Chrominance Component Data $$\lambda(\vec{x}) = \lambda_{joint} \cdot \left( \exp\left(-\frac{E_w''(\vec{x})^2}{\sigma_{gEth}^2}\right) \cdot 1 + \left(1 - \exp\left(-\frac{E_w''(\vec{x})^2}{\sigma_{gEth}^2}\right)\right) \frac{\frac{d\gamma}{d\hat{L}}(\tilde{\hat{L}}(\vec{x}))}{\frac{d\gamma}{d\hat{L}}\bigg|_{\text{arg}\gamma(\hat{L})=\text{saturation level}}^{\text{standard}}} \right)$$

[Expression 41]

when $\lambda(\vec{x}) = \text{Min}(\lambda(\vec{x}), 1.0)$

The value of $\sigma_{gE\,th}$ in the expressions above should interlock with the noise fluctuation index value $\sigma_{th}$ set in the real space or should be set based upon the absolute edge intensity level. By assuming such a value for $\sigma_{gE\,th}$, a desirable edge intensity level that disallows edge•contrast reduction due to blurred outlines can be set.

3) Functionalization 3 (Combination Version)

Through noise removal rate functionalization 1 and the noise removal rate functionalization 2, different effects are achieved locally. Accordingly, these two approaches may be adopted in combination. In such a case, a functional expression that basically assumes the product of the two functional expressions should be used.

16-2 Functionalization Based Upon Contrast Ratio Function for Edge Enhancement Rate (Processing (0-8))

1) Functionalization 1 (Gamma Version)

The edge enhancement rate functionalization is similar to the noise enhancement rate functionalization in that its primary object is to achieve uniform edge enhancement effects in the output color space over the full luminance range while retaining a level of appearance comparable to that achieved through uniform edge enhancement executed in the work color space. By clearing this object, insufficient edge enhancement attributable to the edge component extracted at a low contrast level in the work color space over an area where the gradation contrast at a given brightness level is more pronounced in the output color space, is prevented and an uneven appearance due to excessive edge enhancement attributable to the edge component extracted at a high contrast level in the work color space over a specific area where the gradation contrast is less pronounced in the output color space is minimized. Namely, the edge component contrast must be raised in advance over each gradation area where the contrast is lower in the work color space than in the output color space, whereas the edge component contrast must be lowered in advance over each area where the contrast in the work color space is higher than in the output color space.

It is crucial to select the optimal reference point for increasing/decreasing the edge enhancement rate in correspondence to the output gamma characteristics. In the case of the luminance component data, it is desirable to set the reference point to the exposure reference point selected so as to achieve the average luminance level (around 128 in the 256 gradation range) in the output color space, as in the case of the reference point for the noise removal rate. By setting such a reference point, it is ensured that the luminance component data appear to sustain even edge enhancement effects on average over the entire luminance range. As a result, any occurrence of the black lift phenomenon attributable to insufficient gradation correction in dark areas where the edge contrast tends to become insufficient after the gradation conversion to the output color space is prevented and an image benefiting from clear edge enhancement, with pure black and better gradational expression than that of the original image, can be provided.

The chrominance component data normally require more intense edge enhancement than the luminance component data if edge enhancement effects comparable to those achieved in the work color space are to be replicated in the output color space, since edge component data cannot be extracted as easily from the chrominance component data, which typically do not contain many high-frequency edge structures but contain a great deal of gently changing edge structures. Accordingly, the edge enhancement rate should not be dynamically adjusted as is the luminance component data and instead, the edge enhancement intensity for areas where the contrast can be sustained without compromising the edge enhancement effects alone should be lowered.

In more specific terms, the edge enhancement rate is standardized in reference to the saturation reference point present in an area over which the output gamma characteristics manifest as knee characteristics, as is the case with the noise removal rate. As a result, the chrominance plane edge enhancement rate over a highlight area is lowered. Since a highlight image area normally corresponds to a high saturation area in the chrominance plane, the edge component can be extracted with ease. Furthermore, since the contrast is higher in the work color space than in the output color space, the colorful impression is bound to be increased excessively if the edge component is used directly. Accordingly, the edge enhancement rate over the highlight area is lowered so as to disallow extreme colorful impression enhancement over the highly saturated area and create edge enhancement effects with a high level of overall color reproducibility while striking the optimal balance between the color contrast in the other darker areas and the colorful impression restoration. In addition, in a synergistic action achieved in conjunction with the dark area edge enhancement effects for the luminance component data, any black lift due to noise overlay in the dark areas and color bleeding from one area into a dark area are completely eliminated to create a clear and crisp image with better black reproducibility than the original image.

The function of the edge enhancement rate, through which the advantages described above are achieved, is expressed as follows by using the contrast ratio function for the edge enhancement rate. As in the case of the noise removal rate functionalization, luminance component data are standardized by substituting the contrast ratio based upon the exposure reference point explained earlier for the denominator in the corresponding expression. The chrominance component data are standardized by substituting the contrast ratio based upon the saturation reference point explained earlier for the denominator in the corresponding expression.

Luminance Component Data $$\zeta(\vec{x}) = \zeta_{joint} \cdot \left( \frac{\frac{d\gamma}{d\hat{L}}(\tilde{\hat{L}}(\vec{x}))}{\frac{d\gamma}{d\hat{L}}\bigg|_{arg\gamma(\hat{L})=exposure\ level}^{standard}} \right)$$

[Expression 42]

Chrominance Component Data $$\zeta(\vec{x}) = \zeta_{joint} \cdot \left( \frac{\frac{d\gamma}{d\hat{L}}(\tilde{\hat{L}}(\vec{x}))}{\frac{d\gamma}{d\hat{L}}\bigg|_{arg\gamma(\hat{L})=saturation\ level}^{standard}} \right)$$

[Expression 43]

The clipping processing expressed below is executed for the chrominance component data in order to prevent any alteration of the hue.

ζ(vector x)=Min(ζ(vector x), 1.0)

2) Functionalization 2 (Retinex Version)

The edge enhancement rate may, too, be functionalized from another viewpoint. Namely, while the object of functionalization 1 is to achieve uniform edge enhancement effects through the entire brightness level range of the image, the edge enhancement rate may also be functionalized so as to achieve uniform edge enhancement effects through the brightness level range within an area near a local edge structure. The latter approach is devised based upon the premise that important image elements, which determine the image structures, tend to be concentrated near edges and that as long as uniform edge enhancement effects are achieved relative to the luminance around the edges, the benefit of the other aspect of the evening-out effect can be provided to the full extent over the local areas although the edge enhancement effects achieved for the overall image may be uneven.

Namely, by evening out the edge enhancement effects, another advantage is achieved in that the extent of noise amplification attributable to the noise component that has not been successfully separated from the edge component can be evened out among different brightness levels so as not to allow the presence of any area particularly badly affected to compromise the overall appearance of the image to result in a visually displeasing, uneven image. In other words, the visual manifestations of undesirable noise amplification can be averaged at the minimum level. Accordingly, by taking these measures for minimizing the adverse effects of the edge enhancement particularly around the edges, the contrast in crucial image structure areas can be effectively retained intact without allowing it to be adversely affected by noise overlay.

In this case, too, since the gradation contrast in the work color space is most likely to be higher in a bright image area, the contrast of the noise component present in the area tends to be more intense and the area tends to be adversely affected by noise overlay in the output color space assuming standard gradation characteristics. In the case of the luminance component data, structure information within a white image area plane tends to be readily buried in noise, whereas in the case of chrominance component data, color information in a highly saturated area tends to be readily buried in noise.

Accordingly, the following functional expression for the contrast ratio function may be adopted in conjunction with the edge enhancement rate. The optimal edge information that may be referenced is the synthesized edge component obtained by synthesizing the edge component data at multiple resolution levels, which allows the image structures to be scrutinized on all scales, both locally and globally. In addition, it is most desirable to use the synthesized edge component Ew" (x, y) that includes the information in the visually crucial frequency bands from which the noise component and the ringing component have been dependably removed.

Luminance Component Data $$\zeta(\vec{x}) = \zeta_{joint} \cdot \left\{ \exp\left(-\frac{E_w''(\vec{x})^2}{\sigma_{gEth}^2}\right) \cdot 1 + \right.$$ [Expression 44]

$$\left. \left(1 - \exp\left(-\frac{E_w''(\vec{x})^2}{\sigma_{gEth}^2}\right)\right) \frac{\frac{d\gamma}{d\hat{L}}(\tilde{\hat{L}}(\vec{x}))}{\frac{d\gamma}{d\hat{L}}\bigg|_{arg\gamma(\hat{L})=exposure\,level}^{standard}} \right\}$$

The clipping processing expressed below is executed for the chrominance component data in order to prevent any alteration of the hue.

ζ(vector x)=MIN(ζ(vector x), 1.0)

Chrominance Component Data $$\zeta(\vec{x}) = \zeta_{joint} \cdot \left\{ \exp\left(-\frac{E_w''(\vec{x})^2}{\sigma_{gEth}^2}\right) \cdot 1 + \right.$$ [Expression 45]

$$\left. \left(1 - \exp\left(-\frac{E_w''(\vec{x})^2}{\sigma_{gEth}^2}\right)\right) \frac{\frac{d\gamma}{d\hat{L}}(\tilde{\hat{L}}(\vec{x}))}{\frac{d\gamma}{d\hat{L}}\bigg|_{arg\gamma(\hat{L})=exposure\,level}^{standard}} \right\}$$

The value of $\sigma_{gE\,th}$ in the expressions above should interlock with the noise fluctuation index value $\sigma_{th}$ set in the real space or set based upon the absolute edge intensity level. By assuming such a value for $\sigma_{gE\,th}$, a desirable edge intensity level that disallows contrast reduction due to noise overlay can be set.

3) Functionalization 3 (Combination Version)

Through the edge enhancement rate functionalization 1 and the edge enhancement rate functionalization 2, different effects are achieved locally. Accordingly, these two approaches may be adopted in combination. In such a case, a functional expression that basically assumes the product of the two functional expressions should be used.

16-3 Execution of Noise Removal Processing and Edge Enhancement Processing

The actual noise removal processing and edge enhancement processing are executed based upon the noise removal rate and the edge enhancement rate expressed as functionals so as to maximize the noise removal effects and the edge enhancement effects and minimize the problems thereof.

1) Executing Noise Removal Processing Only

If executing the noise removal processing alone, noise removal expressed below is executed (processing (0-9)) and the resulting noise-free image is output (processing (0-10)).

$$S'(\vec{x}) = S(\vec{x}) - \lambda(\vec{x}) \cdot N_w''(\vec{x})$$ [Expression 46]

2) Executing Edge Enhancement Processing Only

If executing the edge enhancement processing alone, edge enhancement (not shown in FIG. 4A) is executed as expressed below without executing the processing (0-9) in FIG. 4A and the resulting edge-enhanced image is output (not shown).

$$S'(\vec{x}) = S(\vec{x}) + \zeta(\vec{x}) \cdot E_w''(\vec{x})$$ [Expression 47]

3) Simultaneously Executing Noise Removal Processing and Edge Enhancement Processing If simultaneously executing the noise removal processing and the edge enhancement processing, the standalone noise removal processing (processing (0-9)) is first executed and then the edge enhancement processing is executed (processing (0-11)). Subsequently, the resulting noise-free, edge-enhanced image is output (processing (0-12)). The integrated processing through which both the noise removal processing and the edge enhancement processing are executed may be summarized as in the expression below $$S'(\vec{x}) = \lambda(\vec{x}) \cdot N_w''(\vec{x}) \cdot E_w''(\vec{x})$$ [Expression 48]

If the edge enhancement is executed in order to correct blurring of outlines to an extent substantially matching the extent to which the outlines have become blurred through the noise removal, the noise removal rate and the edge enhancement rate should be set as expressed below.

$$\zeta_{jo\,int} = \lambda_{joint}$$ [Expression 49]

By selecting such settings, high-performance noise removal that allows textural details buried in the noise removed through the noise removal to be restored is enabled while adhering to the principle with regard to the image quality whereby the noise removal effects become more intense as the noise removal rate λ joint is raised.

If, on the other hand, the absence of sharpness attributable to noise in the original image at each ISO sensitivity level is to be corrected without executing the noise removal, λ joint and ζ joint should be respectably set so that; λ joint=0 and ζ joint≠0.

It is important to note that the optimal solution to the noise removal rate expressed as a functional and the optimal solution to the edge enhancement rate expressed as a functional, each having been determined by scrutinizing the physical phenomena as explained earlier, coincidentally match each other. From the viewpoint of minimizing the amplification of noise component data mixed in the extracted edge component, which cannot be successfully separated from the edge component, the functional of the edge enhancement rate may be expressed as the reciprocal of the functional of the noise removal rate. However, through true testing, it has been proven that advantages justifying the risk of noise component amplification are achieved by adopting the matching functionals, giving solid ground for a conclusion that as the noise component data are effectively eliminated from the extracted edge component and thus refining the edge component data to a state closer to that of the true edge component data, it becomes possible to process the edge component as pure edge component data without having to worry about noise component amplification. Accordingly, the processing onus of having to create individual functionals independent of each other is eliminated. In addition, the physical significance of this coincidence may be related to the fact that the form of the function, based upon which an edge structure having been lost through noise removal, is restored to its initial state as an edge structure assuming exactly the same behavior as the initial edge structure, is identical to the form of the function based upon which the noise removal is executed. Although the noise removal and the edge enhancement are separate matters completely independent of each other, identical characteristics manifest along the gradational direction. However, their characteristics do not match in the frequency projection spaces used in the processing executed in step S10.

17 Conversion to Output Color Space

Next, in step S4 in FIG. 2, the noise-free, edge-enhanced image in the image processing space is converted to an image in the output color space. The image can be converted to that in an output color space identical to the input color space through reverse conversion processing by executing "1" in the reverse sequence. The image should be converted to an output color space different from the input color space through conversion executed in compliance with the specifications of the standard color spaces used as the input color space and the output color space. For instance, the input color space may be Adobe RGB color space and the output color space may be the sRGB color space. In addition, the output image may have undergone gradation correction as well. Such gradation correction may be executed by adjusting the gamma curve characteristics applied to the image. Under such circumstances, information indicating these characteristics should be provided in advance to the side where the processing described in 16-1 and the processing described in 16-2 are executed, so as to enable it to calculate the contrast ratio functions in advance.

18 Image Output

In step S5 in FIG. 2, the image data having undergone the noise removal and the edge enhancement as described above are output.

The following advantages are achieved with regard to the quality of the image resulting from the edge enhancement processing described above. Firstly, by executing the edge enhancement processing on an image photographed at a high sensitivity level, in which the edge contrast is lowered due to noise overlay and the phenomenon of black lift manifests, crisp outlines are restored, a desirable level of contrast is rendered over textured structures assuming an amplitude close to that of noise so as to create a sharp image with three-dimensional depth, the tightness of black is improved to eliminate any clouding due to noise overlay, richer gradational expression is achieved to improve the clarity, color bleeding at color boundaries is corrected to improve the color contrast and loss of color saturation attributable to noise overlay is prevented so as to improve the colorful impression of the overall image.

In addition, by concurrently executing the edge enhancement processing on a noise-free image resulting from the noise removal processing, edge structures having been lost through the noise removal can be restored. Namely, the appearance of sharpness having been compromised through the noise removal is recovered, grainy noise is reduced while restoring textural details with the fluctuation width thereof substantially matching the fluctuation width of the noise having been eliminated through the noise removal, and color mottling noise removal through which color mottling is removed without allowing significant color bleeding or significant loss of gently changing color structures in flat linage areas is realized by suppressing noise in dark areas, preventing noise overlay in bright areas and thus improving the gradation characteristics.

Furthermore, image enhancement through edge enhancement and noise suppression through noise removal can be achieved cohesively while retaining a natural appearance in the image, in correspondence to the levels, i.e., the intensity levels, of the edge enhancement and the noise removal set as the edge enhancement rate and the noise removal rate. In other words, it is guaranteed that the enhancement effects on an image photographed at a high sensitivity setting resulting in even better image quality than that of the original image are evident in the natural appearance of the enhanced image, which is closer to that of an image photographed at a low sensitivity setting.

Consequently, through the edge enhancement and the noise removal, a high level of reproducibility with regard to the physical quantities such as the resolution, the color separation and the effective gradation bandwidth, as well as a high level of reproducibility with regard to subjectively-perceived elements such as sharp definition and crispness, the sense of depth and the sense of clarity, is assured.

It has been confirmed through testing that similar enhancement effects are achieved for an image photographed at low sensitivity, which is almost certain to contain noise.

-Second Embodiment- (Real Space Version)

In the second embodiment, the noise removal and the edge enhancement are executed simultaneously in the real spatial plane.

Figure 8:
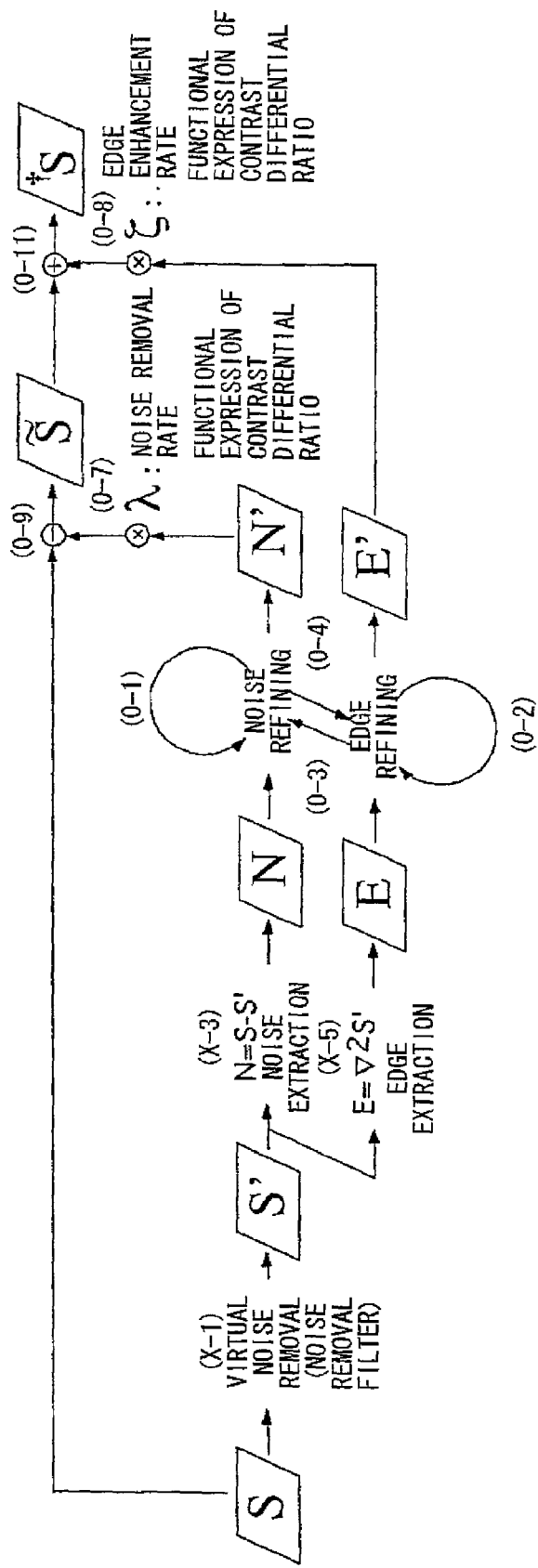
FIG. 8 presents a flowchart of the noise removal processing and the edge enhancement processing executed in a second embodiment.

Since the image processing apparatus achieved in the second embodiment assumes a structure identical to that shown in FIG. 1 in reference to which the first embodiment has been described, a repeated explanation is not provided. In addition, since the flow of the image processing executed by the personal computer 1 in the second embodiment is similar to that in the flowchart presented in FIG. 3, a repeated explanation is not provided. The following explanation focuses on the differences from the processing executed in the first embodiment. FIG. 8 presents a flowchart of the noise removal processing and the edge enhancement processing executed in the second embodiment.

1 Color Space Conversion

Processing similar to that described in reference to the first embodiment in (1) is executed.

2 Noise Extraction Through Virtual Noise Removal 2-1 Noise Removal Processing

Since the true spatial plane is represented by S(x, y), processing similar to that executed on the subband plane V(x, y) in the first embodiment should be executed simply by substituting S for V. However, a greater integrating range must be assumed.

While the noise removal processing may be executed through any processing method in order to create the smoothed plane S' by using a σ filter, an ε filter or the like as the noise removal filter, the noise removal processing in the embodiment is executed by using the modified bilateral filter expressed below, as in the first embodiment.

$$S'(\vec{x}) = \frac{\int_{|\vec{x}'-\vec{x}|\leq 2r_{th}} S(\vec{x}') \exp\left(-\frac{|S(\vec{x}')-S(\vec{x})|^2}{\sigma_{th}^2} \cdot \frac{|\vec{x}'-\vec{x}|^2}{r_{th}^2}\right) d\vec{x}'}{\int_{|\vec{x}'-\vec{x}|\leq 2r_{th}} \exp\left(-\frac{|S(\vec{x}')-S(\vec{x})|^2}{\sigma_{th}^2} \cdot \frac{|\vec{x}'-\vec{x}|^2}{r_{th}^2}\right) d\vec{x}'}$$

[Expression 50]

While it is desirable to assume a value of, for instance, 50 for rth and select a filtering range of approximately 101×101 pixels in order to achieve a truly clean noise removal effect, the following explanation is provided by assuming, for purposes of simplification, that rth=12 and that the integration is executed over a pixel range of 25×25. However, if the processing is executed by using a σ filter or an ε filter that is not affected by any spatial factor, there is no parameter equivalent to rth and thus, only the integrating range needs to be set.

2-2 Noise Extraction Processing

The noise extraction processing is executed as expressed below (processing (x-3)).

$$N(\vec{x}) = S(\vec{x}) - S'(\vec{x}) \quad \text{[Expression 51]}$$

3 Edge Extraction

The edge component is extracted (processing (x-3)) from the data in the real spatial plane having undergone the virtual noise removal.

$$E(\vec{x}) = \nabla^2 S'(\vec{x}) \quad \text{[Expression 52]}$$

A Laplacian filter is used as the edge detection filter in this process. While a Laplacian filter assuming a 9×9 pixel range, identical to that in the first embodiment, may be used, it is more desirable to set the filtering range to approximately 25×25, since the filtering range of the smoothing filter is set to 25×25. A 25×25 Laplacian filter can be created simply by determining the difference between a smoothed image resulting from three applications of a 9×9 Gaussian filter and the original image. Such a 25×25 Laplacian filter may be expressed as below.

$$\nabla^2 = 1 - (\text{Gaussian})_{25 \times 25} \quad \text{[Expression 53]}$$
$$= 1 - (\text{Gaussian})_{9 \times 9} \otimes (\text{Gaussian})_{9 \times 9} \otimes (\text{Gaussian})_{9 \times 9}$$

4 Noise Component Self-refining

Noise component self-refining processing (processing (0-1)) is executed as has been described in reference to the first embodiment by using the same expression. However, Nw in the expression should be replaced with N for the processing in this embodiment.

5 Edge Component Self-refining

Edge component self-refining processing (processing (0-2)) is executed as has been described in 12 in reference to the first embodiment by using the same expression. However, Ew in the expression should be replaced with E for the processing in this embodiment.

6 Edge-based Noise Component Refining (Mutual Refining 1)

Noise component refining processing (processing (0-3)) is executed by using edge data as has been described in 13 in reference to the first embodiment by using the same expression. However, Nw and Ew in the expression should be replaced with N and E respectively for the processing in this embodiment.

7 Noise-based Edge Component Refining (Mutual Refining 2)

Edge component refining processing (processing (0-4)) is executed by using noise data as has been described in 14 in reference to the first embodiment by using the same expression. However, Nw and Ew in the expression should be replaced with N and E respectively for the processing in this embodiment.

8 Actual Noise Removal Processing and Edge Enhancement Processing

The processing is executed as has been described in 16 in reference to the first embodiment (processing (0-7) (0-8) (0-9) (0-11)) by using the same expression. However, Nw and Ew in the expression should be replaced with N and E respectively for the processing in this embodiment. In addition, the processing equivalent to that described in 15 in reference to the first embodiment is omitted for expediency.

9 Conversion to Output Color Space

Processing identical to that described in 17 in reference to the first embodiment is executed.

Through the image processing described above, advantages similar to those of the first embodiment except for the advantage resulting from the optimal frequency projection space selection are achieved, i.e., the noise removal effects and the edge enhancement effects assuring a high-quality image by separating the noise component and the edge component from each other with a high level of accuracy and minimizing the adverse effects of impurities in the noise component and the edge component.

—Variations—

It is to be noted that while the embodiments are described above on the premises that both the noise removal processing and the edge enhancement processing are offered as options and that either or both options can be selected freely prior to the actual execution, the edge enhancement processing only may be executed at higher speed by dispensing with the smoothing processing with a significant processing load, which is executed via the noise removal filters. In such a case, the edge component may be directly extracted from the sub-band images expressed through multi-resolution representation and the edge component may be extracted in the second embodiment directly from the original image through unsharp mask processing as simplified alternatives.

(2) It is to be noted that the noise component/edge component self/mutual refining processing having been described in 5~8 and 11~15 in reference to the first embodiment and the arithmetic operations executed based upon the noise removal rate and edge enhancement rate expressed as functionals, as has been described in 16, can be actually executed in software simply by using lookup tables and, therefore, the true processing time is short enough to be disregarded.

(3) It is to be noted that while the image processing space described in reference to the embodiments is the optimal color space, i.e., a uniform color uniform noise space, the present invention may also be adopted in a standard uniform color space by defining a similar contrast ratio function. For instance, the present invention may be adopted in the CIE-defined L*a*b* space, the L*u*v* space or the CIECAM02 space. The optimal contrast ratio function should be determined in correspondence to each space based upon the gradation characteristics defined for the particular work color space and the gradation characteristics of the output color space.

(4) It is also to be noted that while the high-performance modified bilateral filter is used as the edge-preserving smoothing filter in the first embodiment, the Laplacian noise removal filter disclosed by the applicant of the present invention in WO2006/106919, which does not provide edge/noise separation performance as good as that of the modified bilateral filter but assures better speed and simplicity, may be used as an alternative. Since the levels of purity of the noise component and the edge component extracted via such Laplacian filters are lower than those of the noise component and the edge component extracted through modified bilateral filters, even more marked improvement will be achieved through the noise component/edge component self/mutual refining functions defined in the description of the embodiment.

Noise removal processing on luminance plane $$V'(\vec{x}) = V(\vec{x}) - \nabla^2 V(\vec{x}) \cdot \exp\left(-\frac{|\nabla^2 V(\vec{x})|^2}{\sigma_{th}^2}\right) \quad \text{[Expression 54]}$$

$$V''(\vec{x}) = V'(\vec{x}) + \nabla^2 V'(\vec{x}) \cdot \exp\left(-\frac{|\nabla^2 V'(\vec{x})|^2}{\sigma_{th}^2}\right)$$

-continued $$V'''(\vec{x}) = V''(\vec{x}) - \nabla^2 V''(\vec{x}) \cdot \exp\left(-\frac{|\nabla^2 V''(\vec{x})|^2}{\sigma_{th}^2}\right)$$

$$V^{(4)}(\vec{x}) = V'''(\vec{x}) + \nabla^2 V'''(\vec{x}) \cdot \exp\left(-\frac{|\nabla^2 V'''(\vec{x})|^2}{\sigma_{th}^2}\right)$$

Noise removal processing on chrominance planes $$V'(\vec{x}) = V(\vec{x}) - \nabla^2 V(\vec{x}) \cdot \exp\left(-\frac{|\nabla^2 V(\vec{x})|^2}{\sigma_{th}^2}\right)$$ [Expression 55]

$$V''(\vec{x}) = V'(\vec{x}) - \nabla^2 V'(\vec{x}) \cdot \exp\left(-\frac{|\nabla^2 V'(\vec{x})|^2}{\sigma_{th}^2}\right)$$

It is to be noted that if the Laplacian filters defined above are to be utilized in conjunction with multi-resolution representation, they may assume the simplest 3×3 configuration.

(5) In the five-stage wavelet transformation described in reference to the first embodiment, the resolution levels of the low-frequency subband images and the high-frequency subband images are set as j=1, 2, ..., 5. As an alternative, the resolution in the real space may be handled as; j=0, corresponding to a specific low-frequency subband image among the low-frequency subband images. In such a case, noise extraction processing and edge extraction processing similar to those executed at the resolution level j=1 may also be executed and the extracted noise component and edge component may be respectively added to the synthesized noise component and the synthesized edge component at the final stage. The weights to be applied in correspondence to the different resolution levels under these circumstances should include; knj=1 in correspondence to the resolution level j=0 for the noise component, which is white noise, and kej taking on the numerical value provided in 10-2 by expecting this situation.

(6) It is to be noted that while the color processing space described in reference to the embodiments represents the most desirable color space, the advantages of the present invention can be equally effectively realized through the noise removal processing and the edge enhancement processing executed in a color space in the related art. For instance, the noise removal processing and the edge enhancement processing may be executed in the latest uniform color space, i.e., the CIECAM02. It is also to be noted that the noise removal processing and the edge enhancement processing may be executed either in a uniform noise space or in a uniform color space.

(7) In the embodiments described above, the edge component self-refining is achieved through arithmetic operation executed based upon an exponential function so as to adjust the frequency distribution related to the edge component intensity to approximate a Gaussian distribution pattern assuming a specific width, which is calculated based upon the noise fluctuation index value $\sigma_{th\ ij}$. However, instead of executing the processing by referencing the Gaussian distribution, the edge component self-refining processing may be executed as threshold value decision-making processing expressed below. In addition, the noise-based edge component refining, the noise component self-refining and edge-based noise component refining, too, may be likewise executed as threshold value decision-making processing.

$$e'_{ij}(\vec{x}) = e_{ij}(\vec{x}) \text{ if } |e_{ij}(\vec{x})| \leq \sigma_{ethij}$$

$$e'_{ij}(\vec{x}) = 0 \text{ otherwise}$$ [Expression 56]

Figure 9:
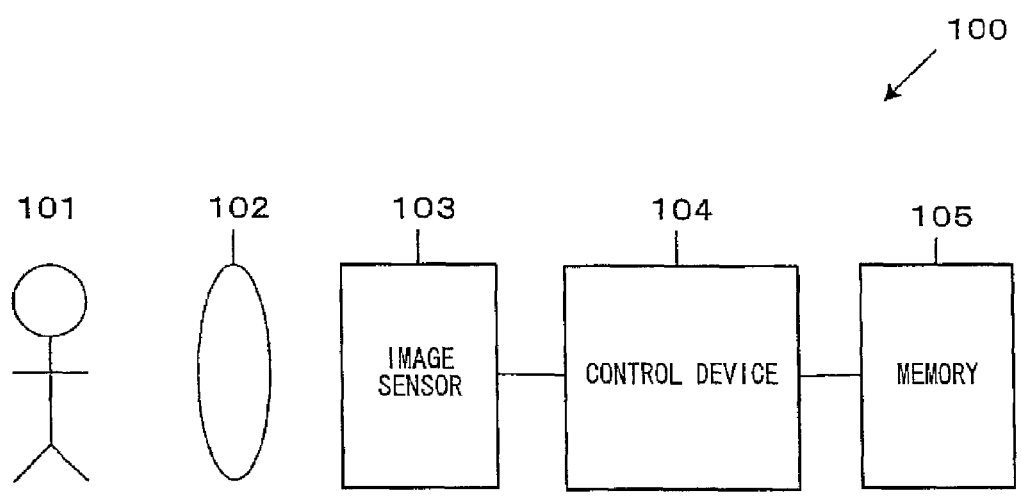
FIG. 9 shows the structure adopted in the digital camera 100.

(8) An explanation has been given above in reference to the embodiments on an example in which the image processing apparatus is constituted with a personal computer 1. However, the noise removal processing executed in the personal computer 1 in the description provided above may instead be executed in a digital camera (electronic camera). FIG. 9 shows the structure of such a digital camera 100. The digital camera 100 includes a photographic lens 102, an image sensor 103 constituted with a CCD or the like, a control device 104 constituted with a CPU and peripheral circuits, a memory 105 and the like.

The image sensor 103 photographs (captures an image of) a subject 101 via the photographic lens 102 and outputs image data obtained through the photographing operation to the control device 104. This processing is equivalent to the image data input executed in step S1 in FIG. 3 in reference to which the first embodiment has been described. The control device 104 executes the noise removal processing in any of the embodiments or their variations having been described earlier on the image data obtained through the photographing operation executed at the image sensor 103 and stores the image data resulting from the optimal noise removal and edge enhancement into the memory 105 as needed. The control device 104 executes the noise removal processing and the edge-enhancing processing described earlier based upon a specific program stored in a ROM (not shown) or the like.

As described above, processing that renders natural edge enhancement effects by preventing the occurrence of the ringing phenomenon attributable to edge enhancement is enabled in the digital camera 100 and the image data resulting from the optimal edge enhancement can then be stored into the memory 105 and recorded into a recording medium such as a detachable memory card.

The advantages of the embodiments and variations described above may be summarized as follows.

(1-1) Edge component data are extracted based upon the original image, the individual sets of extracted edge component data are attenuated so that the frequency distribution related to the edge component intensity better approximates a Gaussian distribution having a specific width. Then, edge enhancement is executed for the original image based upon the corrected edge component. Namely, the edge component data having been extracted through edge detection filters are adjusted so as to approximate data achieving a frequency distribution with Gaussian distribution characteristics, which are assumed to create a natural appearance when incorporated into the original image. As a result, edge enhancement free of ringing is enabled. Through this edge enhancement processing, weak edge component data, the level of which is low enough to be buried in noise, can be restored in a very natural manner without inducing noise amplification.

(1-2) A plurality of subbands (band-limited images) assuming sequentially or gradually lowered resolution levels are generated (wavelet transformation) by filtering an original image, an edge component in each subband (band-limited image) is extracted, the edge component having been extracted from each subband (band-limited image) is attenuated for correction so that the frequency distribution related to the edge component intensity approximates a Gaussian distribution assuming a specific width inherent to the particular band, the edge component data corresponding to the individual subbands (band-limited images) having been thus corrected, are then synthesized to generate an edge component assuming a resolution matching the resolution of the original image, correction is executed again by attenuating the individual sets of edge component data so that the frequency distribution related to the intensity of the synthesized edge component approximates a Gaussian distribution assuming a specific width and then, edge enhancement for the original image is executed based upon the corrected synthesized edge component. By executing the edge enhancement processing as described above through multi-resolution representation, the occurrence of large scale ringing phenomenon can be reliably prevented and optimal edge enhancement/contrast enhancement effects can be achieved to create an image devoid of haloing or howling manifesting over a large area.

(1-3) The specific width assumed for the Gaussian distribution mentioned above matches the width of the noise fluctuation index value set for the original image. Thus, weak edge component data, the level of which is low enough to be buried in noise, can be restored in a very natural manner without inducing noise amplification.

(1-4) The individual phases of the refining processing described above are executed in a uniform noise space or a uniform color•uniform noise space. However, the individual band-limited images generated through multi-resolution representation of the original image are each assumed to have a fluctuation width matching the fluctuation width inherent to the particular band-limited image in the initial image. In other words, the assumption represents a hypothesis that allows the synthesized model embodying the basic refining concept to be designed with ease, simply because the noise extraction is executed in a uniform noise space or a uniform color•uniform noise space.

(1-5) In the embodiments described above, the edge refining processing is executed at the individual resolution levels and also after the edge component data corresponding to the various resolution levels are synthesized. However, similar advantages may be achieved by skipping the refining processing at the individual resolution levels and simply executing the refining processing on the synthesized edge component. Namely, a plurality of band-limited images assuming sequentially lowered resolution levels, which include sets of subband images each made up with a low-frequency subband image and a high-frequency subband image, may be generated by filtering the original image, each band-limited image may be subjected to edge detection to extract edge component data in correspondence to the individual band-limited images, the edge component data having been extracted from the two types of band-limited images, i.e., the low-frequency subband images and the high-frequency subband images, may be sequentially synthesized so as to generate an synthesized edge component assuming a resolution level matching that of the original image, correction may be executed so as to attenuate the individual sets of edge component data so that the frequency distribution related to the intensity of the synthesized edge component approximates a Gaussian distribution with a specific width and edge enhancement may then be executed for the original image based upon the corrected edge component. Since frequency bands are defined with redundancy and some level of freedom in this alternative it is crucial to execute the edge refining processing on the synthesized edge component.

(1-6) In an image processing method adopted when executing edge enhancement for an original image containing a noise component represented by a predetermined noise fluctuation index value, an edge component extracted from the original image is compared with the noise fluctuation index value so as to extract weak edge component data in the edge component, assuming a level substantially matching that of the noise component and the edge enhancement for the original image is executed based upon the weak edge component data having been thus extracted. Through this edge enhancement processing, the weak edge component data assuming a level low enough to be buried in noise, which cannot normally be distinguished through a noise removal filter and thus becomes lost through noise removal processing, can be restored in a highly natural manner without inducing noise amplification.

(1-7) As an alternative, a plurality of subbands (band-limited images) assuming sequentially lowered resolution levels are generated by filtering the original image, an edge component is extracted from each subband (band-limited image), the quantity of a false edge component contained in the edge component is estimated based upon the level of the edge component itself having been extracted from the subband (band-limited image), a true edge component of the particular subband (band-limited image) is extracted by excluding the false edge component from the extracted edge component based upon the estimation results, the true edge component data extracted from the individual subbands (band-limited images) are synthesized so as to generate an synthesized edge component assuming a resolution level matching that of the original image, the quantity of a false edge component contained in the synthesized edge component is estimated again based upon the level of the synthesized edge component itself, a true edge component is extracted by excluding the false edge component from the synthesized edge component based upon the estimation results and the edge enhancement is executed for the original image based upon the extracted true edge component. Through this process, too, advantages similar to those described above are achieved.

(2-1) In an image processing method adopted when executing edge enhancement for an original image, a noise component and an edge component are extracted based upon the original image, the ratio of a residual noise component contained in the edge component is estimated to be more significant if the absolute value of the extracted noise component is greater, a true edge component is extracted by estimating the residual noise component thus estimated from the edge component and the edge enhancement is executed for the original image based upon the extracted true edge component.

In this image processing method, a plurality of band-limited images assuming sequentially lowered resolution levels are generated by filtering the original image, a noise component and an edge component are extracted from each band-limited image, the ratio of the residual noise component contained in the extracted edge component is estimated to be more significant if the absolute value of the noise component extracted from each band-limited image is greater, the estimated residual noise component from the extracted edge component in correspondence to each band-limited image, the individual sets of true edge component data having been extracted from the various band-limited images are synthesized to generate an synthesized edge component assuming a resolution level matching that of the original image, and the edge enhancement is executed for the original image based upon the synthesized true edge component.

(2-3) As an alternative, a plurality of band-limited images assuming sequentially lowered resolution levels are generated by filtering the original image, a noise component and an edge component are extracted from each band-limited image, the noise component data and the edge component data having been extracted from the individual band-limited images are synthesized so as to generate an synthesized noise component and an synthesized edge component assuming a resolution level matching that of the original image, the ratio of the residual noise component contained in the synthesized edge component is estimated to be more significant if the absolute value of the synthesized noise component is greater, a true edge component is extracted by eliminating the residual noise component thus estimated from the synthesized edge component and the edge enhancement for the original image is executed based upon the extracted true edge component.

(2-4) As a further alternative, the noise component data extracted from the individual band-limited images are synthesized to generate an synthesized noise component assuming a resolution level matching that of the original image, the ratio of the residual noise component contained in the synthesized edge component is estimated to be more significant if the absolute value of the synthesized noise component is greater, an synthesized true edge component is extracted by eliminating the residual noise component thus estimated from the synthesized edge component and the edge enhancement for the original image is executed based upon the synthesized true edge component having been extracted.

(2-5) In the processing described above, the ratio of the true edge component present in the extracted edge component is estimated through a Gaussian distribution function in which the absolute value of the extracted noise component is used as an argument.

(2-6) Furthermore, the ratio of the residual noise component contained in the edge component is estimated by comparing the absolute value representing the noise component extracted at each pixel position with a noise fluctuation index value used when extracting the noise component from the original image.

(2-7) As an alternative, the ratio of the residual noise component contained in the edge component is estimated by comparing the absolute value representing the synthesized noise component corresponding to each pixel position with a noise fluctuation index value used when extracting the noise component from the original image.

(2-8) In an image processing method adopted when executing edge enhancement for an original image, the original image is separated into a noise component and a noise-free image, an edge component of the original image is extracted based upon the noise-free image, a true edge component is extracted by eliminating a residual noise component contained in the edge component from the edge component based upon the level of the noise component and the edge enhancement for the original image is executed based upon the extracted true edge component.

(2-9) In this image processing method, a plurality of band-limited images assuming sequentially lowered resolution levels are generated by filtering the original image, each band-limited image is separated into a noise component and a noise-free image, an edge component of each band-limited image is extracted from the corresponding noise-free band-limited image having undergone noise removal, individual sets of noise component data having been separated from the various band-limited images are synthesized to generate an synthesized noise component assuming a resolution level matching that of the original image, individual sets of edge component data having been extracted from the various band-limited images are synthesized to generate an synthesized edge component assuming a resolution level matching that of the original image a true edge component is extracted by eliminating a residual noise component contained in the synthesized edge component based upon the level of the synthesized noise component from the synthesized edge component and the edge enhancement for the original image is executed based upon the extracted true edge component.

(2-10) In an image processing method adopted when executing noise removal and edge enhancement for an original image, a noise component and an edge component are extracted based upon the original image, a true noise component is extracted by excluding a residual edge component contained in the noise component from the noise component based upon the extracted edge component, a true edge component is extracted by eliminating a residual noise component contained in the edge component from the edge component based upon the extracted noise component and the noise removal and the edge enhancement for the original image are executed based upon the true noise component and the extracted true edge component.

(2-11) In this method, a plurality of band-limited images assuming sequentially lowered resolution levels are generated by filtering the original image, a noise component and an edge component are extracted from each band-limited image, the noise component data and the edge component data having been extracted from the individual band-limited images are synthesized so as to generate an synthesized noise component and an synthesized edge component assuming a resolution level matching that of the original image, a true noise component is extracted by eliminating a residual edge component contained in the synthesized noise component from the synthesized noise component based upon the synthesized edge component, a true edge component is extracted by excluding a residual noise component contained in the synthesized edge component from the synthesized edge component based upon the extracted synthesized noise component, and the noise removal and the edge enhancement for the original image are executed based upon the true noise component and the extracted true edge component.

(2-12) The plurality of band-limited images include sets of high-frequency subband images and low-frequency subband images assuming sequentially lowered resolution levels and the noise component data and the edge component data extracted at the various resolution levels assumed by the two types of band-limited images are synthesized so as to generate the synthesized noise component and the synthesized edge component.

(2-13) In addition, the individual phases of processing are executed either in a uniform noise space or in a uniform color•uniform noise space.

Through the measures described above, a great improvement is achieved in the accuracy with which the edge component to be used for edge enhancement and the noise component to be used in noise removal are separated from each other by extracting the edge component and the noise component with precision. As a result, edge enhancement that does not run the risk of noise amplification and noise removal with the minimum extent of outline dulling are achieved.

Furthermore, after the edge component and the noise component are first separated from each other accurately, the extent to which a noise component data are likely to be mixed in the edge component is immediately estimated by directly referencing the quantity of the noise component based upon the optimal noise mix model and, as a result, the accuracy with which the edge component and the noise component are separated from each other is improved greatly. Moreover, based upon the optimal mutual noise component/edge component mix model, mutual refining processing is executed for the noise component and the edge component to greatly improve the purity levels of the noise component and edge component. As a result, fine edge enhancement that does not run the risk of noise amplification and does not allow any area to be left with an insufficiently enhanced outline is enabled. At the same time, noise removal with a minimum of outline dulling.

(3-1) In an image processing method adopted when executing edge enhancement for an original image, the original image in an input color space is converted to an image in a work color space assuming specific gradation characteristics, an edge component is extracted through edge detection executed in the work color space, the extracted edge component is added to the original image so as to create an edge-enhanced image based upon the original image, the edge-enhanced image in the work color space is converted to an image in an output color space assuming gradation characteristics different from the gradation characteristics in the work color space, the extracted edge component is amplified or attenuated by designating a specific brightness level as a switch-over point based upon a function for a differential ratio of the gradation characteristics in the output color space and the gradation characteristics in the work color space, which changes in correspondence to the brightness level of the original image.

(3-2) In this image processing method, if the original image is expressed with luminance component data, the extracted edge component is amplified or attenuated by designating a brightness level of the original image corresponding to an exposure reference point or an average luminance level of the original image as the switch-over point.

(3-3) If, on the other hand, the original image is expressed with chrominance component data, the extracted edge component is amplified or attenuated by designating a brightness level of the original image corresponding to a saturation reference point as the switch-over point.

(3-4) In addition, the extracted edge component is further amplified or attenuated based upon an intensity level of the edge component.

(3-5) In an image processing method adopted when executing edge enhancement for an original image, the original image in an input color space is converted to an image in a work color space assuming specific gradation characteristics, an edge component is extracted through edge detection executed in the work color space, the extracted edge component is added to the original image so as to create an edge-enhanced image based upon the original image, the edge-enhanced image in the work color space is converted to an image in an output color space assuming gradation characteristics different from the gradation characteristics in the work color space, the extracted edge component is amplified or attenuated in correspondence to a brightness level of the original image by designating a specific brightness level as a switch-over point based upon a difference between the gradation characteristics in the output color space and the gradation characteristics in the work color space, and the specific brightness level selected in for the original image expressed with luminance component data is different from the specific brightness level selected for the original image expressed with chrominance component data.

(3-6) In this image processing method, if the original image is expressed with luminance component data, the extracted edge component is amplified or attenuated by designating a brightness level of the original image corresponding to an exposure reference point or an average luminance level of the original image as the switch-over point. If, on the other hand, the original image is expressed with chrominance component data, the extracted edge component is amplified or attenuated by designating a brightness level of the original image corresponding to a saturation reference point as the switch-over point.

(3-7) In an image processing method adopted when executing noise removal and edge enhancement for an original image, the original image in an input color space is converted to an image in a work color space assuming specific gradation characteristics, a noise component and an edge component in the original image are extracted in the work color space, image processing is executed for noise removal by subtracting the noise component from the original image and for edge enhancement by adding the edge component, the image having undergone the image processing in the work color space is converted to an image in an output color space assuming gradation characteristics different from the gradation characteristics in the work color space, and the extracted noise component and the extracted edge component are both amplified or attenuated in a similar manner in correspondence to a brightness level of the original image by designating a specific brightness level as a switch-over point based upon a difference between the gradation characteristics in the output color space and the gradation characteristics in the work color space.

(3-8) In this image processing method, the extracted noise component and edge component are also amplified or attenuated based upon an intensity of the edge component.

(3-9) In an image processing method adopted when executing edge enhancement for an original image, the original image in an input color space is converted to an image in a work color space assuming specific gradation characteristics, an edge component is extracted through edge detection executed in the work color space, the extracted edge component is added to the original image so as to create an edge-enhanced image based upon the original image, the edge-enhanced image in the work color space is converted to an image in an output color space assuming gradation characteristics different from the gradation characteristics in the work color space, and the extracted edge component is amplified or attenuated in correspondence to a brightness level of the original image by designating a specific brightness level as a switch-over point based upon the intensity of the edge component and a difference between the gradation characteristics in the output color space and the gradation characteristics in the work color space.

(3-10) In an image processing method adopted when executing edge enhancement for an original image, an edge component is extracted through edge detection executed on the original image and edge enhancement processing is executed by adding to the original image the edge component with the intensity thereof amplified or attenuated in correspondence to the luminance at each pixel in an area where the intensity of the extracted edge component is relatively high.

(3-11) In an image processing method adopted when executing edge enhancement for an original image, an edge component is extracted through edge detection executed on the original image and edge enhancement processing is executed to create an edge-enhanced image by adding to the original image the edge component with an extent of change in the intensity thereof relative to the luminance at each pixel increased by a greater degree in an area where the intensity of the extracted edge component is higher.

(3-12) In this image processing method, the edge enhancement processing is executed so that as the intensity of the edge component becomes lower, the intensity of the edge component is made to change relative to the luminance with more uniformity instead of adjusting the intensity of the edge component to change relative to the luminance to varying extents.

(3-13) In addition, the edge-enhanced image is created by executing edge enhancement in a work color space assuming specific gradation characteristics and then converting the image to an image in an output color space assuming gradation characteristics different from the gradation characteristics in the work color space and the extent of change in the intensity of the edge component relative to the luminance is set based upon a difference between the gradation characteristics in the work color space and the gradation characteristics in the output color space.

(3-14) Through the measures described above, higher performance for edge enhancement processing or edge enhancement processing coupled with noise removal is assured while adhering to the principles thereof.

While the edge component and the noise component are each inevitably present in the other component and they cannot easily be separated from each other, the edge component and the noise component are extracted by projecting the original image into an image processing space assuming gradation characteristics optimal for the separation thereof. Then, before the image having undergone the edge enhancement processing is converted into the output color space, the change occurring in contrast due to the difference between the gradation characteristics in the work color space, i.e., the image processing space, and the gradation characteristics in the output color space is accurately estimated and the extent of edge enhancement is amplified/attenuated in advance so as to minimize the adverse effects of residual impurity remaining in each component, i.e., the adverse effects of the residual noise component remaining in the edge component and maximize the edge enhancement effects.

The visually perceived effects of the edge enhancement and the extent of noise suppression can be maximized by estimating the change in the contrast in advance through dual approaches, i.e., an approach through which the change in contrast is sustained at an average, uniform level over the luminance range of the entire image and an approach through which uniformity is achieved through a local brightness level range in areas near edges without attempting to assure uniformity for the overall image. As a result, more versatile, higher performance edge enhancement is realized.

In addition, since edges are restored by bearing in mind that the noise removal whereby the contrast attributable to the edge component present in the noise removal-target noise component is bound to be lowered through the noise removal, more advanced edge enhancement, more in tune with the characteristics of the noise removal, can be achieved.

(4-1) In an image processing method adopted when executing edge enhancement for an original image, at least one set of band-limited images, made up with a low-frequency band-limited image and a high-frequency band-limited image, is generated from the original image, an edge extraction filter is individually applied to the band-limited images to extract a low-frequency edge component and a high-frequency edge component, a single edge component is generated by combining the low-frequency edge component and the high-frequency edge component, the edge enhancement for the original image is executed based upon the edge component thus generated and a combining ratio with which the low-frequency edge component and the high-frequency edge component are combined is adjusted in correspondence to the intensity of the edge enhancement. The combining ratio is adjusted by varying the weight kei (i=LL, LH, HL, HH) as expressed in expressions 23 and 24 in 10-1.

(4-2) If the original image is expressed with luminance component data, the combining ratio of the low-frequency edge component to the high-frequency edge component is lowered as the intensity of the edge enhancement increases. In expression 23, the weight keLL applied in correspondence to the low-frequency edge component changes by interlocking with $\zeta$ joint, whereas a fixed value of 1 is set for the weights keLH, keHL and keHH applied in correspondence to the high-frequency edge component. Thus, as the intensity ($\zeta$ joint) of the edge enhancement increases, the combining ratio of the low-frequency edge component to the high-frequency edge component is lowered.

(4-3) If the original image is expressed with chrominance component data, the combining ratio of the high-frequency edge component to the low-frequency edge component is lowered as the intensity of the edge enhancement increases. In expression 24, the weights keLH, keHL and keHH applied in correspondence to the high-frequency edge component change by interlocking with $\zeta$ joint, whereas a fixed value of 1 is set for the weight keLL applied in correspondence to the low-frequency edge component. Thus, as the intensity ($\zeta$ joint) of the edge enhancement increases, the combining ratio of the low-frequency edge components to the high-frequency edge component is lowered.

(4-4) As the intensity of the edge enhancement decreases, the combining ratio for the low-frequency edge component and the high-frequency edge component is adjusted so that the low-frequency edge component and the high-frequency edge component are combined at substantially equal rates. Assuming that the edge enhancement intensity $\zeta$ joint changes within a range of $0 \leq \zeta$ joint$\leq 1$ and that the noise removal intensity $\lambda$ joint is also small enough, the value of the combining ratio becomes closer to 1 as the edge enhancement intensity $\lambda$ joint decreases and thus, the weights applied in correspondence to the low-frequency edge component and the high-frequency edge component all become close to 1 in expressions 23 and 24 to allow the low-frequency edge component and the high-frequency edge component to be combined with substantially equal rates.

(4-5) If the edge enhancement is coupled with noise removal executed for the original image based upon a noise component extracted from the original image, the combining ratio for the low-frequency edge component and the high-frequency edge component is further adjusted in correspondence to the intensity of the noise removal. This adjustment is represented by the noise removal rate $\lambda$ joint factored in expressions 23~26 in 10-1.

(4-6) If the original image is expressed with luminance component data, the combining ratio of the low-frequency edge component to the high-frequency edge component is lowered as the intensity of the noise removal increases. For instance, as the value of the noise removal rate $\lambda$ joint is increased within the 0~1 range in expression 23 in 10-1, a smaller value is assumed for keLL, thereby lowering the combining ratio of the low-frequency edge component.

(4-7) If the original image is expressed with chrominance component data, the combining ratio of the high-frequency edge component to the low-frequency edge component is lowered as the intensity of the noise removal increases. For instance, as the value of the noise removal rate $\lambda$ joint is increased within the 0~1 range in expression 24 in 10-1, smaller values are assumed for keLH, keHL, and keHH, thereby lowering the combining ratio of the high-frequency edge component.

(4-8) As the intensity of the noise removal decreases, the combining ratio for the low-frequency edge component and the high-frequency edge component is adjusted so that the low-frequency edge component and the high-frequency edge component are combined at substantially equal rates. Assuming that the noise removal intensity $\lambda$ joint changes within a range of $0 \leq \lambda$ joint$\leq 1$ and that the edge enhancement intensity $\zeta$ joint is also small enough, the value of the combining ratio becomes closer to 1 as the noise removal intensity $\lambda$ joint decreases and thus, the weights applied in correspondence to the low-frequency edge component and the high-frequency edge component all become close to 1 in expressions 23 and 24 to allow the low-frequency edge component and the high-frequency edge component to be combined with substantially equal rates.

(4-9) In an image processing method adopted when executing noise removal for an original image, at least one set of band-limited images, made up with a low-frequency band-limited image and a high-frequency band-limited image, is generated from the original image, a noise removal filter is individually applied to the band-limited images to extract a low-frequency noise component and a high-frequency noise component, a single noise component is generated by combining the low-frequency noise component and the high-frequency noise component, the noise removal for the original image is executed based upon the noise component thus generated and a combining ratio with which the low-frequency noise component and the high-frequency noise component are combined is adjusted in correspondence to the intensity of the noise removal.

(4-10) If the original image is expressed with luminance component data, the combining ratio of the low-frequency noise component to the high-frequency noise component is lowered as the intensity of the noise removal decreases.

(4-11) If the original image is expressed with chrominance component data, the combining ratio of the high-frequency noise component to the low-frequency noise component is lowered as the intensity of the noise removal decreases.

(4-12) In addition, the combining ratio for the low-frequency noise component and the high-frequency noise component is adjusted so that the low-frequency noise component and the high-frequency noise component are combined at substantially equal rates as the noise removal intensity increases.

In an image processing method adopted when executing edge enhancement for an original image, the original image constituted with a plurality of pixels is input, low-frequency images assuming sequentially lowered resolution levels and high-frequency images assuming sequentially lowered resolution levels are generated by decomposing the original input image, a low-frequency edge component and a high-frequency edge component respectively corresponding to the low-frequency images and the high-frequency images are generated by extracting an edge component through an edge extraction filter applied to each of the low-frequency images and the high-frequency images, weights to be applied to the edge component corresponding to different frequency bands are modulated by multiplying at least either the low-frequency edge component or the high-frequency edge component having been generated by a weighting coefficient, the low-frequency edge component and the high-frequency edge component resulting from modulation are combined in sequence so as to generate a single synthesized edge component with the resolution level thereof raised in corresponding sequence, the intensity of the synthesized edge component is adjusted by multiplying the edge component by an edge enhancement rate, edge enhancement for the original image is executed by adding the adjusted edge component to the original image and a value of the weighting coefficient used to modulate the weights applied to the edge component corresponding to the different frequency bands is altered in correspondence to the edge enhancement rate. The weighting coefficient corresponds to the weights mentioned earlier. The term "adjustment" in this context refers to amplification/attenuation of the edge component by an extent corresponding to the edge enhancement rate.

(4-14) The value of the weighting coefficient used to modulate the weights applied to the edge component corresponding to the different frequency bands is adjusted so that a difference between the weights applied to the low-frequency edge component and the high-frequency edge component increases when a greater value is assumed for the edge enhancement rate and that the difference becomes smaller when a smaller value is assumed for the edge enhancement rate. In expression 23, the weight keLL applied in correspondence to the low-frequency edge component changes by interlocking with joint, whereas a fixed value of 1 is set for the weights keLH, keHL and keHH applied in correspondence to the high-frequency edge component. Accordingly, assuming that the edge enhancement rate the $\zeta$ joint changes within a range of $0 \leq \zeta\,joint \leq 1$, the difference between the weights applied to the low-frequency edge component and the high-frequency edge component becomes greater when a greater value is assumed for the edge enhancement rate ($\zeta$ joint) and the difference becomes smaller when a smaller value is assumed for the edge enhancement rate ($\zeta$ joint). A similar principle applies in expression 24.

(4-15) If the original image is expressed with luminance component data, the value of the weighting coefficient used to modulate the weights applied to the edge component corresponding to the different frequency bands is adjusted so that the weight applied to the low-frequency edge component becomes smaller as a greater value is assumed for the edge enhancement rate and that the weight applied to the low-frequency edge component becomes greater as a smaller value is assumed for the edge enhancement rate.

(4-16) If the original image is expressed with chrominance component data, the value of the weighting coefficient used to modulate the weights applied to the edge component corresponding to the different frequency bands is adjusted so that the weight applied to the high-frequency edge component becomes smaller as a greater value is assumed for the edge enhancement rate and that the weight applied to the high-frequency edge component becomes greater as a smaller value is assumed for the edge enhancement rate.

(4-17) In an image processing method adopted when removing noise contained in an original image, the original image constituted with a plurality of pixels is input, low-frequency images assuming sequentially lowered resolution levels and high-frequency images assuming sequentially lowered resolution levels are generated by decomposing the original input image, a low-frequency noise component and a high-frequency noise component respectively corresponding to the low-frequency images and the high-frequency images are generated by extracting a noise component contained in each of the low-frequency images and the high-frequency images, weights to be applied to the noise component corresponding to different frequency bands are modulated by multiplying at least either the low-frequency noise component or the high-frequency noise component having been generated by a weighting coefficient, the low-frequency noise component and the high-frequency noise component resulting from modulation are combined in sequence so as to generate a single synthesized noise component with the resolution thereof raised in corresponding sequence, the intensity of the synthesized noise component is attenuated by multiplying the noise component by a noise removal rate, noise is removed from the original image by subtracting the attenuated noise component from the original image, and a value of the weighting coefficient used to modulate the weights applied to the noise component corresponding to the different frequency bands is altered in correspondence to the noise removal rate.

(4-18) The value of the weighting coefficient used to modulate the weights applied to the noise components corresponding to the different frequency bands is adjusted so that a difference between the weights applied to the low-frequency noise component and the high-frequency noise component increases when a smaller value is assumed for the noise removal rate and that the difference becomes smaller when a greater value is assumed for the noise removal rate.

(4-19) If the original image is expressed with luminance component data, the value of the weighting coefficient used to modulate the weights applied to the noise components corresponding to the different frequency bands is adjusted so that the weight applied to the low-frequency noise component becomes smaller as a smaller value is assumed for the noise removal rate and that the weight applied to the low-frequency noise component becomes greater as a greater value is assumed for the noise removal rate.

(4-20) If the original image is expressed with chrominance component data, the value of the weighting coefficient used to modulate the weights applied to the noise component corresponding to the different frequency bands is adjusted so that the weight applied to the high-frequency noise component becomes smaller as a smaller value is assumed for the noise removal rate and that the weight applied to the high-frequency noise component becomes greater as a greater value is assumed for the noise removal rate.

(4-21) A plurality of band-limited images assuming sequentially lowered resolution levels are generated by filtering an original image, an edge component is extracted from each band-limited image, edge components extracted from the individual band-limited images are combined by weighting the edge components in correspondence to the resolution levels thereof so as to generate a single synthesized edge component, edge enhancement for the original image is executed based upon the synthesized edge component, and a position of a gravitational center of the weights corresponding to the various resolution levels is adjusted in correspondence to the intensity of the edge enhancement. This concept is represented in expressions 27 and 29 in 10-2. In expression 29, $\mu$ changes in correspondence to the edge enhancement intensity and as $\mu$ changes, kej in expression 27 changes. The results of the arithmetic operation executed as expressed in 27 and 29 are provided in expressions 28 and 30. Namely, assuming that the edge enhancement rate $\zeta$ joint changes over a range of $1 \leq \zeta$ joint$\leq \infty$, the position of the gravitational center of the weights changes so as to shift from the control expressed in 28 to the control expressed in 30.

(4-22) In more specific terms, as the edge enhancement intensity increases, the gravitational center position of the weights shifts toward the higher resolution side.

(4-23) In this situation, the edge components in an area with low edge enhancement intensity are combined by weighting the edge components with the gravitational center of the weights set at an intermediate resolution level.

(4-24) As expressed in expression 27, the Poisson's distribution is adopted as the distribution function for the weights corresponding to the different resolution levels.

(4-25) Expressions 27 and 29 indicate that as the edge enhancement intensity increases, distribution characteristics are altered so that the average value of the Poisson's distribution shifts monotonously toward the higher resolution side.

(4-26) If the edge enhancement coupled with noise removal executed for the original image based upon a noise component extracted from the original image, the gravitational center of the weights applied to the edge components corresponding to the various resolution levels is further adjusted in correspondence to the intensity of the noise removal. This concept is represented by $\lambda$ joint factored in expression 29.

(4-27) In this case, the position of the gravitational center of the weights shifts toward the higher resolution side as the noise removal intensity $\lambda$ joint increases as indicated in expressions 27~30.

Through the measures described above, the image achieving the optimal image quality can be provided through simple processing executed by taking into consideration the different effects of the noise removal or the edge enhancement on the low frequency images and the high-frequency images, i.e., how differently the quality of the low-frequency images and the high-frequency images is affected through the noise removal or the edge enhancement.

In particular, the effects of noise removal and edge enhancement on the qualities of low-frequency subbands and high-frequency subbands generated through multiresolution representation are clearly defined and the optimal relationship among parameters that will achieve the best possible overall image quality is incorporated into the processing based upon the noise removal and edge enhancement effects thus clarified, so as to assure better operability for the user by reducing the number of parameters that must be set by the user.

The ratio with which the low-frequency subbands and the high-frequency subbands are utilized in the noise removal is adjusted by interlocking with the noise removal rate. As a result, desirable noise removal effects are maximized and at the same time, the adverse effects of the noise removal are minimized while reducing the number of parameters. Likewise, the ratio at which the low-frequency subbands and the high-frequency subbands are used in the edge enhancement is adjusted by interlocking with the edge enhancement rate with the different manners with which the low-frequency subbands and the high-frequency subbands contribute toward image quality improvement taken into consideration. As a result, a user friendly edge enhancement interface function is provided and edge enhancement processing that assures the maximum image quality restoringings is enabled.

While the invention has been particularly shown and described with respect to preferred embodiments and variations thereof by referring to the attached drawings, the present invention is not limited to these examples and it will be understood by those skilled in the art that various changes in form and detail may be made therein without departing from the spirit, scope and teaching of the invention. It is to be noted that various combinations of the embodiments and the variations described above are also valid as long as they are within the scope of the technical concept of the present invention.

What is claimed is:

1. An image processing method for executing edge enhancement for an original image, comprising:
   extracting a noise component and an edge component based upon the original image;
   estimating a ratio of a residual noise component contained in the edge component to be more significant if an absolute value of the extracted noise component is greater;
   extracting a true edge component by eliminating the estimated residual noise component from the edge component; and
   executing edge enhancement for the original image based upon the corrected true edge component.

2. An image processing method according to claim 1, wherein:
   a plurality of band-limited images having sequentially lowered resolution levels are generated by filtering the original image;
   a noise component and an edge component are extracted in each band-limited image;

a ratio of a residual noise component contained in the extracted edge component is estimated to be more significant if an absolute value of the corresponding extracted noise component is greater, in each band-limited image;

a true edge component is extracted by eliminating the estimated residual noise component from the extracted edge component in each band-limited image;

a true edge component extracted in each band-limited image is synthesized so as to generate an synthesized edge component having a resolution level matching a resolution of the original image; and the edge enhancement is executed for the original image based upon the synthesized true edge component.

3. An image processing method according to claim 2, wherein:

the noise component extracted in each band-limited image is synthesized to generate a synthesized noise component having a resolution level matching a resolution of the original image;

a ratio of a residual noise component contained in the synthesized edge component is estimated to be more significant if an absolute value of the synthesized noise component is greater; a synthesized true edge component is extracted by eliminating the estimated residual noise component from the synthesized edge component; and the edge enhancement for the original image is executed based upon the synthesized true edge component having been extracted.

4. An image processing method according to claim 1, wherein:

a plurality of band-limited images having sequentially lowered resolution levels are generated by filtering the original image;

a noise component and an edge component are extracted in each band-limited image;

the noise component and the edge component having been extracted in each band-limited images are synthesized so as to generate a synthesized noise component and a synthesized edge component having a resolution level matching a resolution of the original image;

a ratio of a residual noise component contained in the synthesized edge component is estimated to be more significant if an absolute value of the synthesized noise component is greater;

a true edge component is extracted by excluding the estimated residual noise component from the synthesized edge component; and the edge enhancement for the original image is executed based upon the extracted true edge components.

5. An image processing method according to claim 4, wherein:

the ratio of the residual noise component contained in the edge component is estimated by comparing the absolute value of the synthesized noise component at each pixel position with a noise fluctuation index value used when extracting the noise component from the original image.

6. An image processing method according to claim 4, wherein:

the plurality of band-limited images include sets of a high-frequency subband image and a low-frequency subband image having sequentially lowered resolution levels and the noise component and the edge component extracted at each resolution level assumed for each of two types of band-limited images are synthesized so as to generate the synthesized noise component and the synthesized edge component.

7. An image processing method according to claim 1 wherein:

a ratio of the true edge component present in the extracted edge component is estimated through a Gaussian distribution function in which an absolute value of the extracted noise component is used as an argument.

8. An image processing method according to claim 1, wherein:

the ratio of the residual noise component contained in the edge component is estimated by comparing the absolute value of the noise component extracted to each pixel position with a noise fluctuation index value used when extracting the noise component from the original image.

9. An image processing method according to claim 1, wherein:

each processing is executed in a uniform noise space or in a uniform color uniform noise space.

10. An image processing apparatus, comprising a control device capable of executing an image processing method according to claim 1.

11. An electronic camera, comprising a control device capable of executing an image processing method according to claim 1.

12. An image processing method for executing edge enhancement for an original image, comprising:

separating the original image into a noise component and a noise-free image;

extracting a true edge component of the original image based upon the noise-free image;

extracting a true edge component by eliminating a residual noise component contained in the edge component from the edge component based upon a level of the noise component; and executing edge enhancement for the original image based upon the true edge component having been extracted.

13. An image processing method according to claim 12, wherein:

a plurality of band-limited images having sequentially lowered resolution levels are generated by filtering the original image;

each band-limited image is separated into a noise component and a noise-free image;

an edge component of each band-limited image is extracted from the corresponding noise-free band-limited image having undergone noise removal;

the noise component having been separated from the each band-limited image is synthesized to generate a synthesized noise component having a resolution level matching a resolution of the original image;

the edge component having been extracted from the each band-limited image is synthesized to generate a synthesized edge component having a resolution level matching the resolution of the original image;

a true edge component is extracted by eliminating a residual noise component contained in the synthesized edge component from the synthesized edge component based upon a level of the synthesized noise component; and the edge enhancement from the original image is executed based upon the extracted true edge component.

14. An image processing method for executing noise removal and edge enhancement for an original image, comprising:

extracting a noise component and an edge component based upon the original image;

extracting a true noise component by excluding a residual edge component contained in the noise component from the noise component based upon the extracted edge component and extracting a true edge component by eliminating a residual noise component contained in the edge component from the edge component based upon the extracted noise component; and executing noise removal and edge enhancement for the original image based upon the extracted true noise component and the extracted true edge component.

15. An image processing method according to claim 14, wherein:

a plurality of band-limited images having sequentially lowered resolution levels are generated by filtering the original image;

a noise component and an edge component are extracted in each band-limited image;

the noise component and the edge component having been extracted in each band-limited image are synthesized so as to generate a synthesized noise component and a synthesized edge component having a resolution level matching a resolution of the original image;

a true noise component is extracted by excluding a residual edge component contained in the synthesized noise component from the synthesized noise component based upon the synthesized edge component and a true edge component is extracted by eliminating a residual noise component contained in the synthesized edge component from the synthesized edge component based upon the synthesized noise component; and the noise removal and the edge enhancement for the original image are executed based upon the extracted true noise component and the extended true edge component.

16. A non-transitory computer-readable medium comprising instructions that when executed by a computer cause an image processing apparatus to perform the following method steps:

extracting a noise component and an edge component based upon the original image;

estimating a ratio of a residual noise component contained in the edge component to be more significant if an absolute value of the extracted noise component is greater;

extracting a true edge component by eliminating the estimated residual noise component from the edge component; and executing edge enhancement for the original image based upon the corrected true edge component.

* * * * *